US010272839B2

(12) United States Patent
Lynam et al.

(10) Patent No.: US 10,272,839 B2
(45) Date of Patent: *Apr. 30, 2019

(54) REAR SEAT OCCUPANT MONITORING SYSTEM FOR VEHICLE

(71) Applicant: MAGNA ELECTRONICS INC., Auburn Hills, MI (US)

(72) Inventors: Niall R. Lynam, Holland, MI (US); John O. Lindahl, Fruitport, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/638,662

(22) Filed: Jun. 30, 2017

(65) Prior Publication Data
US 2017/0297490 A1    Oct. 19, 2017

Related U.S. Application Data

(60) Continuation of application No. 15/161,707, filed on May 23, 2016, now Pat. No. 9,694,749, which is a
(Continued)

(51) Int. Cl.
*B60R 1/00* (2006.01)
*B60K 35/00* (2006.01)
(Continued)

(52) U.S. Cl.
CPC .................. *B60R 1/00* (2013.01); *B60D 1/36* (2013.01); *B60D 1/58* (2013.01); *B60K 35/00* (2013.01);
(Continued)

(58) Field of Classification Search
CPC .......... B60D 1/36; B60D 1/58; B60Q 1/2665; B60Q 1/323; B60Q 2500/00; B60Q 3/258;
(Continued)

(56) References Cited

U.S. PATENT DOCUMENTS

| 1,096,452 A | 5/1914 | Perrin |
| 1,563,258 A | 11/1925 | Cunningham |

(Continued)

FOREIGN PATENT DOCUMENTS

| AU | A-40317/95 | 2/1995 |
| CN | 1189224 | 7/1998 |

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

(Continued)

*Primary Examiner* — Thai Q Tran
*Assistant Examiner* — Stephen R Smith
(74) *Attorney, Agent, or Firm* — Honigman LLP

(57) ABSTRACT

A rear seat occupant monitoring system for a vehicle includes a video display screen disposed in the vehicle cabin so as to be viewable by a driver of the vehicle. A camera is disposed a dome light or an overhead console. The dome light or overhead console includes first and second illumination sources that, when operated, illuminate a rear seat area within the field of view of the camera. The first illumination source principally emits visible light when electrically powered, and the second illumination source principally emits non-visible light when electrically powered. The camera captures image data representative of the rear seat area when the rear seat area is illuminated by at least one of the first and second illumination sources. Image data captured by the camera is provided to the video display screen for displaying video images for viewing by the driver of the vehicle.

20 Claims, 32 Drawing Sheets

Related U.S. Application Data continuation of application No. 14/181,778, filed on Feb. 17, 2014, now Pat. No. 9,352,623, which is a continuation of application No. 13/309,915, filed on Dec. 2, 2011, now Pat. No. 8,653,959, which is a continuation of application No. 12/609,329, filed on Oct. 30, 2009, now Pat. No. 8,072,318, which is a continuation of application No. 12/061,372, filed on Apr. 2, 2008, now Pat. No. 7,619,508, which is a continuation of application No. 12/043,567, filed on Mar. 6, 2008, now Pat. No. 7,731,403, which is a division of application No. 11/623,997, filed on Jan. 17, 2007, now Pat. No. 7,344,284, which is a continuation of application No. 10/054,633, filed on Jan. 22, 2002, now Pat. No. 7,195,381, which is a continuation-in-part of application No. 09/793,002, filed on Feb. 26, 2001, now Pat. No. 6,690,268.

(60) Provisional application No. 60/346,733, filed on Jan. 7, 2002, provisional application No. 60/263,680, filed on Jan. 23, 2001, provisional application No. 60/271,466, filed on Feb. 26, 2001, provisional application No. 60/315,384, filed on Aug. 28, 2001.

(51) Int. Cl.
| | |
|---|---|
| *B60K 37/06* | (2006.01) |
| *B60Q 1/26* | (2006.01) |
| *B60Q 1/32* | (2006.01) |
| *B60R 1/12* | (2006.01) |
| *B60R 11/02* | (2006.01) |
| *B60R 11/04* | (2006.01) |
| *B60D 1/36* | (2006.01) |
| *B60D 1/58* | (2006.01) |
| *H04N 7/18* | (2006.01) |
| *G09G 3/34* | (2006.01) |
| *G09G 3/36* | (2006.01) |
| *H04N 5/374* | (2011.01) |
| *B60Q 3/64* | (2017.01) |
| *B60Q 3/258* | (2017.01) |
| *B60Q 3/82* | (2017.01) |
| *B60Q 3/74* | (2017.01) |
| *B60R 1/04* | (2006.01) |
| *G06K 9/00* | (2006.01) |
| *G06K 9/78* | (2006.01) |
| *H04N 5/225* | (2006.01) |
| *H04N 5/232* | (2006.01) |
| *H04N 5/235* | (2006.01) |
| *H04N 5/33* | (2006.01) |
| *B60R 11/00* | (2006.01) |
| *G02B 6/00* | (2006.01) |
| *G02B 27/01* | (2006.01) |

(52) U.S. Cl.
CPC ............ *B60K 37/06* (2013.01); *B60Q 1/2665* (2013.01); *B60Q 1/323* (2013.01); *B60Q 3/258* (2017.02); *B60Q 3/64* (2017.02); *B60Q 3/74* (2017.02); *B60Q 3/82* (2017.02); *B60R 1/003* (2013.01); *B60R 1/04* (2013.01); *B60R 1/12* (2013.01); *B60R 1/1207* (2013.01); *B60R 11/0235* (2013.01); *B60R 11/04* (2013.01); *G06K 9/00771* (2013.01); *G06K 9/00838* (2013.01); *G06K 9/78* (2013.01); *G09G 3/3406* (2013.01); *G09G 3/3648* (2013.01); *H04N 5/2256* (2013.01); *H04N 5/2354* (2013.01); *H04N 5/23293* (2013.01); *H04N 5/332* (2013.01); *H04N 5/374* (2013.01); *H04N 7/183* (2013.01); *B60K 2350/1024* (2013.01); *B60K 2350/1028* (2013.01); *B60Q 2500/00* (2013.01); *B60R 2001/1253* (2013.01); *B60R 2011/0026* (2013.01); *B60R 2011/0033* (2013.01); *B60R 2011/0082* (2013.01); *B60R 2011/0084* (2013.01); *B60R 2011/0089* (2013.01); *B60R 2011/0282* (2013.01); *B60R 2011/0288* (2013.01); *B60R 2011/0294* (2013.01); *B60R 2300/10* (2013.01); *B60R 2300/20* (2013.01); *B60R 2300/308* (2013.01); *B60R 2300/8006* (2013.01); *B60R 2300/808* (2013.01); *G02B 6/00* (2013.01); *G02B 2027/012* (2013.01); *G02B 2027/0118* (2013.01); *G09G 2320/0626* (2013.01); *G09G 2380/10* (2013.01); *Y10S 362/80* (2013.01)

(58) Field of Classification Search
CPC .... B60Q 3/64; B60Q 3/74; B60Q 3/82; B60R 11/0235; B60R 11/04; B60R 1/00; B60R 1/003; B60R 1/04; B60R 1/12; B60R 1/1207; B60R 2001/1253; B60R 2011/0026; B60R 2011/0033; B60R 2011/0082; B60R 2011/0084; B60R 2011/0089; B60R 2011/0282; B60R 2011/0288; B60R 2011/0294; B60R 2300/10; B60R 2300/00; B60R 2300/308; B60R 2300/8006; B60R 2300/808; G02B 2027/0118; G02B 2027/012; G02B 6/00; G06K 9/00771; G06K 9/00838; G06K 9/78; G09G 2320/0626; G09G 2380/10; G09G 3/3406; G09G 3/3648; H04N 5/2256; H04N 5/23293; H04N 5/2354; H04N 5/332; H04N 5/374; H04N 7/183; Y10S 362/80
USPC ...................... 348/148; 701/45, 36; 180/313
See application file for complete search history.

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |

(56) References Cited

U.S. PATENT DOCUMENTS

| | | |
|---|---|---|
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Gilia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |
| 4,521,079 A | 6/1985 | Leenhouts et al. |
| 4,524,941 A | 6/1985 | Wood et al. |
| 4,538,063 A | 8/1985 | Bulat |
| 4,546,551 A | 10/1985 | Franks |
| 4,555,694 A | 11/1985 | Yanagishima et al. |
| 4,561,625 A | 12/1985 | Weaver |
| 4,572,619 A | 2/1986 | Reininger et al. |
| 4,580,196 A | 4/1986 | Task |
| 4,580,875 A | 4/1986 | Bechtel et al. |
| 4,581,827 A | 4/1986 | Higashi |
| 4,588,267 A | 5/1986 | Pastore |
| 4,603,946 A | 8/1986 | Kato et al. |
| 4,623,222 A | 11/1986 | Itoh et al. |
| 4,625,210 A | 11/1986 | Sagl |
| 4,626,850 A | 12/1986 | Chey |
| 4,630,040 A | 12/1986 | Haertling |
| 4,630,109 A | 12/1986 | Barton |
| 4,630,904 A | 12/1986 | Pastore |
| 4,634,835 A | 1/1987 | Suzuki |
| 4,635,033 A | 1/1987 | Inukai et al. |
| 4,636,782 A | 1/1987 | Nakamura et al. |
| 4,638,287 A | 1/1987 | Umebayashi et al. |
| 4,646,210 A | 2/1987 | Skogler et al. |
| 4,652,090 A | 3/1987 | Uchikawa et al. |
| 4,655,549 A | 4/1987 | Suzuki et al. |
| 4,665,311 A | 5/1987 | Cole |
| 4,665,430 A | 5/1987 | Hiroyasu |
| 4,669,827 A | 6/1987 | Fukada et al. |
| 4,671,615 A | 6/1987 | Fukada et al. |
| 4,671,619 A | 6/1987 | Kamimori et al. |
| 4,678,281 A | 7/1987 | Bauer |
| 4,679,906 A | 7/1987 | Brandenburg |
| 4,682,083 A | 7/1987 | Alley |
| 4,692,798 A | 9/1987 | Seko et al. |
| 4,694,295 A | 9/1987 | Miller et al. |
| 4,697,883 A | 10/1987 | Suzuki et al. |
| 4,701,022 A | 10/1987 | Jacob |
| 4,702,566 A | 10/1987 | Tukude et al. |
| 4,704,740 A | 11/1987 | McKee et al. |
| 4,711,544 A | 12/1987 | Iino et al. |
| 4,712,879 A | 12/1987 | Lynam et al. |
| 4,713,685 A | 12/1987 | Nishimura et al. |
| RE32,576 E | 1/1988 | Pastore |
| 4,718,756 A | 1/1988 | Lancaster |
| 4,721,364 A | 1/1988 | Itoh et al. |
| 4,729,068 A | 3/1988 | Ohe |
| 4,729,076 A | 3/1988 | Masami et al. |
| 4,731,669 A | 3/1988 | Hayashi et al. |
| 4,733,335 A | 3/1988 | Serizawa et al. |
| 4,733,336 A | 3/1988 | Skogler et al. |
| 4,740,838 A | 4/1988 | Mase et al. |
| 4,761,061 A | 8/1988 | Nishiyama et al. |
| 4,773,740 A | 9/1988 | Kawakami et al. |
| 4,780,752 A | 10/1988 | Angerstein et al. |
| 4,781,436 A | 11/1988 | Armbruster |
| 4,789,904 A | 12/1988 | Peterson |
| 4,793,690 A | 12/1988 | Gahan et al. |
| 4,793,695 A | 12/1988 | Wada et al. |
| 4,794,261 A | 12/1988 | Rosen |
| D299,491 S | 1/1989 | Masuda |
| 4,799,768 A | 1/1989 | Gahan |
| 4,803,599 A | 2/1989 | Trine et al. |
| 4,807,096 A | 2/1989 | Skogler et al. |
| 4,820,933 A | 4/1989 | Hong et al. |
| 4,825,232 A | 4/1989 | Howdle |
| 4,826,289 A | 5/1989 | Vandenbrink et al. |
| 4,827,086 A | 5/1989 | Rockwell |
| 4,837,551 A | 6/1989 | Iino |
| 4,842,378 A | 6/1989 | Flasck et al. |
| 4,845,402 A | 7/1989 | Smith |
| 4,847,772 A | 7/1989 | Michalopoulos et al. |
| 4,855,161 A | 8/1989 | Moser et al. |
| 4,855,550 A | 8/1989 | Schultz, Jr. |
| 4,859,813 A | 8/1989 | Rockwell |
| 4,859,867 A | 8/1989 | Larson et al. |
| 4,860,171 A | 8/1989 | Kojima |
| 4,862,594 A | 9/1989 | Schierbeek et al. |
| 4,871,917 A | 10/1989 | O'Farrell et al. |
| 4,872,051 A | 10/1989 | Dye |
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |

(56) References Cited

U.S. PATENT DOCUMENTS

| | | |
|---|---|---|
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jerkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nashihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinama et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,257,168 A | 10/1993 | Davenport |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |

(56) References Cited

U.S. PATENT DOCUMENTS

| | | |
|---|---|---|
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| 5,461,471 A | 10/1995 | Sommerfeld |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,519,621 A | 5/1996 | Worthman |
| 5,521,744 A | 5/1996 | Mazurek |
| 5,521,760 A | 5/1996 | DeYoung et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenck et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |
| 5,587,236 A | 12/1996 | Agrawal et al. |
| 5,587,699 A | 12/1996 | Faloon et al. |
| 5,593,221 A | 1/1997 | Evanicky et al. |
| 5,594,222 A | 1/1997 | Caldwell |
| 5,594,560 A | 1/1997 | Jelley et al. |
| 5,594,615 A | 1/1997 | Spijkerman et al. |
| 5,602,542 A | 2/1997 | Widmann et al. |
| 5,602,670 A | 2/1997 | Keegan |
| 5,602,948 A | 2/1997 | Currie |
| 5,603,104 A | 2/1997 | Phelps, III et al. |
| 5,608,550 A | 3/1997 | Epstein et al. |
| 5,609,652 A | 3/1997 | Yamada et al. |
| 5,610,380 A | 3/1997 | Nicolaisen |
| 5,610,756 A | 3/1997 | Lynam et al. |
| 5,611,966 A | 3/1997 | Varaprasad et al. |
| 5,614,885 A | 3/1997 | Van Lente et al. |
| 5,615,023 A | 3/1997 | Yang |
| 5,615,857 A | 4/1997 | Hook |
| 5,617,085 A | 4/1997 | Tsutsumi et al. |
| 5,619,374 A | 4/1997 | Roberts |
| 5,619,375 A | 4/1997 | Roberts |
| 5,626,800 A | 5/1997 | Williams et al. |
| 5,631,089 A | 5/1997 | Center, Jr. et al. |
| 5,631,638 A | 5/1997 | Kaspar et al. |
| 5,631,639 A | 5/1997 | Hibino et al. |
| 5,632,092 A | 5/1997 | Blank et al. |
| 5,632,551 A | 5/1997 | Roney et al. |
| 5,634,709 A | 6/1997 | Iwama |
| 5,640,216 A | 6/1997 | Hasegawa et al. |
| 5,642,238 A | 6/1997 | Sala |
| 5,644,851 A | 7/1997 | Blank et al. |
| 5,646,614 A | 7/1997 | Abersfelder et al. |
| 5,649,756 A | 7/1997 | Adams et al. |
| 5,649,758 A | 7/1997 | Dion |
| 5,650,765 A | 7/1997 | Park |
| 5,650,929 A | 7/1997 | Potter et al. |
| 5,661,455 A | 8/1997 | Van Lente et al. |
| 5,661,651 A | 8/1997 | Geschke et al. |
| 5,661,804 A | 8/1997 | Dykema et al. |
| 5,662,375 A | 9/1997 | Adams et al. |
| 5,666,157 A | 9/1997 | Aviv |
| 5,667,289 A | 9/1997 | Akahane et al. |
| 5,668,663 A | 9/1997 | Varaprasad et al. |
| 5,668,675 A | 9/1997 | Fredricks |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield |
| 5,671,996 A | 9/1997 | Bos et al. |
| 5,673,994 A | 10/1997 | Fant, Jr. et al. |
| 5,673,999 A | 10/1997 | Koenck |
| 5,677,598 A | 10/1997 | De Hair et al. |
| 5,679,283 A | 10/1997 | Tonar et al. |
| 5,680,123 A | 10/1997 | Lee |
| 5,680,245 A | 10/1997 | Lynam |
| 5,680,263 A | 10/1997 | Zimmermann et al. |
| 5,686,975 A | 11/1997 | Lipton |
| 5,686,979 A | 11/1997 | Weber et al. |
| 5,689,241 A | 11/1997 | Clark, Sr. et al. |
| 5,689,370 A | 11/1997 | Tonar et al. |
| 5,691,848 A | 11/1997 | Van Lente et al. |
| 5,692,819 A | 12/1997 | Mitsutake et al. |
| 5,696,529 A | 12/1997 | Evanicky et al. |
| 5,696,567 A | 12/1997 | Wada et al. |
| 5,699,044 A | 12/1997 | Van Lente et al. |
| 5,699,188 A | 12/1997 | Gilbert et al. |
| 5,703,568 A | 12/1997 | Hegyi |
| 5,708,410 A | 1/1998 | Blank et al. |
| 5,708,415 A | 1/1998 | Van Lente et al. |
| 5,708,857 A | 1/1998 | Ishibashi |
| 5,715,093 A | 2/1998 | Schierbeek et al. |
| 5,724,187 A | 3/1998 | Varaprasad et al. |
| 5,724,316 A | 3/1998 | Brunts |
| 5,729,194 A | 3/1998 | Spears et al. |
| 5,737,226 A | 4/1998 | Olson et al. |
| 5,741,966 A | 4/1998 | Handfield et al. |
| 5,744,227 A | 4/1998 | Bright et al. |
| 5,745,050 A | 4/1998 | Nakagawa |
| 5,745,266 A | 4/1998 | Smith |

(56) References Cited

U.S. PATENT DOCUMENTS

| | | |
|---|---|---|
| 5,748,172 A | 5/1998 | Song et al. |
| 5,748,287 A | 5/1998 | Takahashi et al. |
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,346 A | 9/1999 | Suzuki |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,029,105 A * | 2/2000 | Schweizer ............ B60N 2/002 280/734 |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |

(56) References Cited

U.S. PATENT DOCUMENTS

| | | |
|---|---|---|
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |
| 6,072,391 A | 6/2000 | Suzukie et al. |
| 6,074,077 A | 6/2000 | Pastrick et al. |
| 6,074,777 A | 6/2000 | Reimers et al. |
| 6,076,948 A | 6/2000 | Bukosky et al. |
| 6,078,355 A | 6/2000 | Zengel |
| 6,078,865 A | 6/2000 | Koyanagi |
| D428,372 S | 7/2000 | Todd et al. |
| D428,373 S | 7/2000 | Todd et al. |
| 6,082,881 A | 7/2000 | Hicks |
| 6,084,700 A | 7/2000 | Knapp et al. |
| 6,086,131 A | 7/2000 | Bingle et al. |
| 6,086,229 A | 7/2000 | Pastrick |
| 6,087,012 A | 7/2000 | Varaprasad et al. |
| 6,087,953 A | 7/2000 | DeLine et al. |
| 6,091,343 A | 7/2000 | Dykema et al. |
| 6,093,976 A | 7/2000 | Kramer et al. |
| 6,094,618 A | 7/2000 | Harada |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,097,316 A | 8/2000 | Liaw et al. |
| 6,099,131 A | 8/2000 | Fletcher et al. |
| 6,099,155 A | 8/2000 | Pastrick et al. |
| 6,102,546 A | 8/2000 | Carter |
| 6,102,559 A | 8/2000 | Nold et al. |
| 6,104,552 A | 8/2000 | Thau et al. |
| 6,106,121 A | 8/2000 | Buckley et al. |
| 6,111,498 A | 8/2000 | Jobes, I et al. |
| 6,111,683 A | 8/2000 | Cammenga et al. |
| 6,111,684 A | 8/2000 | Forgette et al. |
| 6,111,685 A | 8/2000 | Tench et al. |
| 6,111,696 A | 8/2000 | Allen et al. |
| 6,115,086 A | 9/2000 | Rosen |
| 6,115,651 A | 9/2000 | Cruz |
| 6,116,743 A | 9/2000 | Hoek |
| 6,118,219 A | 9/2000 | Okigami et al. |
| 6,122,597 A | 9/2000 | Saneyoshi et al. |
| 6,122,921 A | 9/2000 | Brezoczky et al. |
| 6,124,647 A | 9/2000 | Marcus et al. |
| 6,124,886 A | 9/2000 | DeLine et al. |
| 6,127,919 A | 10/2000 | Wylin |
| 6,127,945 A | 10/2000 | Mura-Smith |
| 6,128,576 A | 10/2000 | Nishimoto et al. |
| 6,130,421 A | 10/2000 | Bechtel et al. |
| 6,130,448 A | 10/2000 | Bauer et al. |
| 6,132,072 A | 10/2000 | Turnbull et al. |
| 6,137,620 A | 10/2000 | Guarr et al. |
| 6,139,171 A | 10/2000 | Waldmann |
| 6,139,172 A | 10/2000 | Bos et al. |
| 6,140,933 A | 10/2000 | Bugno et al. |
| 6,142,656 A | 11/2000 | Kurth |
| 6,146,003 A | 11/2000 | Thau |
| 6,147,934 A | 11/2000 | Arikawa et al. |
| 6,148,261 A | 11/2000 | Obradovich et al. |
| 6,149,287 A | 11/2000 | Pastrick et al. |
| 6,150,014 A | 11/2000 | Chu et al. |
| 6,151,065 A | 11/2000 | Steed et al. |
| 6,151,539 A | 11/2000 | Bergholz et al. |
| 6,152,551 A | 11/2000 | Annas |
| 6,152,590 A | 11/2000 | Fürst et al. |
| 6,154,149 A | 11/2000 | Tyckowski et al. |
| 6,154,306 A | 11/2000 | Varaprasad et al. |
| 6,157,294 A | 12/2000 | Urai et al. |
| 6,157,418 A | 12/2000 | Rosen |
| 6,157,424 A | 12/2000 | Eichenlaub |
| 6,157,480 A | 12/2000 | Anderson et al. |
| 6,158,655 A | 12/2000 | DeVries, Jr. et al. |
| 6,161,865 A | 12/2000 | Rose et al. |
| 6,164,564 A | 12/2000 | Franco et al. |
| 6,166,625 A | 12/2000 | Teowee et al. |
| 6,166,629 A | 12/2000 | Hamma et al. |
| 6,166,834 A | 12/2000 | Taketomi et al. |
| 6,166,847 A | 12/2000 | Tench et al. |
| 6,166,848 A | 12/2000 | Cammenga et al. |
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinama et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,457 B1 | 4/2001 | Mills |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 | 6/2001 | DeLine et al. |
| 6,244,716 B1 | 6/2001 | Steenwyk et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |

(56) References Cited

U.S. PATENT DOCUMENTS

| | | |
|---|---|---|
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 | 8/2001 | DeLine et al. |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Ragan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 | 12/2001 | Heslin et al. |
| 6,326,900 B2 | 12/2001 | DeLine et al. |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B2 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Fürst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,359,737 B1 | 3/2002 | Stringfellow |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,411,867 B1 | 6/2002 | Sakiyama |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |
| 6,418,376 B1 | 7/2002 | Olson |
| 6,419,300 B1 | 7/2002 | Pavao et al. |
| 6,420,036 B1 | 7/2002 | Varaprasad et al. |
| 6,420,800 B1 | 7/2002 | LeVesque et al. |
| 6,420,975 B1 | 7/2002 | DeLine et al. |
| 6,421,081 B1 | 7/2002 | Markus |
| 6,424,272 B1 | 7/2002 | Gutta et al. |
| 6,424,273 B1 | 7/2002 | Gutta et al. |
| 6,424,786 B1 | 7/2002 | Beeson et al. |
| 6,424,892 B1 | 7/2002 | Matsuoka |
| 6,426,492 B1 | 7/2002 | Bos et al. |
| 6,426,568 B2 | 7/2002 | Turnbull et al. |
| 6,427,349 B1 | 8/2002 | Blank et al. |
| 6,428,172 B1 | 8/2002 | Hutzel et al. |
| 6,433,676 B2 | 8/2002 | DeLine et al. |
| 6,433,680 B1 | 8/2002 | Ho |
| 6,433,914 B1 | 8/2002 | Lomprey et al. |
| 6,437,688 B1 | 8/2002 | Kobayashi |
| 6,438,491 B1 | 8/2002 | Farmer |
| 6,439,755 B1 | 8/2002 | Fant, Jr. et al. |
| 6,441,872 B1 | 8/2002 | Ho |
| 6,441,943 B1 | 8/2002 | Roberts et al. |
| 6,441,963 B2 | 8/2002 | Murakami et al. |
| 6,441,964 B1 | 8/2002 | Chu et al. |
| 6,445,287 B1 | 9/2002 | Schofield et al. |
| 6,447,128 B1 | 9/2002 | Lang et al. |
| 6,449,082 B1 | 9/2002 | Agrawal et al. |
| 6,452,533 B1 | 9/2002 | Yamabuchi et al. |
| 6,452,572 B1 | 9/2002 | Fan et al. |
| 6,462,795 B1 | 10/2002 | Clarke |
| 6,463,369 B2 | 10/2002 | Sadano et al. |
| 6,466,701 B1 | 10/2002 | Ejiri et al. |
| 6,471,362 B1 | 10/2002 | Carter et al. |
| 6,472,977 B1 | 10/2002 | Pöchmüller |
| 6,472,979 B2 | 10/2002 | Schofield et al. |
| 6,473,001 B1 | 10/2002 | Blum |
| 6,474,853 B2 | 11/2002 | Pastrick et al. |
| 6,476,731 B1 | 11/2002 | Miki et al. |
| 6,477,460 B2 | 11/2002 | Kepler |
| 6,477,464 B2 | 11/2002 | McCarthy et al. |
| 6,483,429 B1 | 11/2002 | Yasui et al. |
| 6,483,438 B2 | 11/2002 | DeLine et al. |
| 6,483,613 B1 | 11/2002 | Woodgate et al. |
| 6,487,500 B2 | 11/2002 | Lemelson et al. |
| 6,494,602 B2 | 12/2002 | Pastrick et al. |
| 6,498,620 B2 | 12/2002 | Schofield et al. |
| 6,501,387 B2 | 12/2002 | Skiver et al. |
| 6,509,832 B1 | 1/2003 | Bauer |
| 6,512,203 B2 | 1/2003 | Jones et al. |
| 6,512,624 B2 | 1/2003 | Tonar et al. |
| 6,513,252 B1 | 2/2003 | Schierbeek et al. |
| 6,515,378 B2 | 2/2003 | Drummond et al. |
| 6,515,581 B1 | 2/2003 | Ho |
| 6,515,582 B1 | 2/2003 | Teowee |
| 6,515,597 B1 | 2/2003 | Wada et al. |
| 6,516,664 B2 | 2/2003 | Lynam |
| 6,518,691 B1 | 2/2003 | Baba |
| 6,519,209 B1 | 2/2003 | Arikawa et al. |
| 6,520,667 B1 | 2/2003 | Mousseau |
| 6,522,451 B1 | 2/2003 | Lynam |
| 6,522,969 B2 | 2/2003 | Kannonji |
| 6,525,707 B1 | 2/2003 | Kaneko et al. |
| 6,534,884 B2 | 3/2003 | Marcus et al. |
| 6,538,709 B1 | 3/2003 | Kurihara et al. |
| 6,539,306 B2 | 3/2003 | Turnbull et al. |
| 6,542,085 B1 | 4/2003 | Yang |
| 6,542,182 B1 | 4/2003 | Chautorash |

(56) References Cited

U.S. PATENT DOCUMENTS

| | | | |
|---|---|---|---|
| 6,543,163 B1 | 4/2003 | Ginsberg | |
| 6,545,598 B1 | 4/2003 | de Villeroche | |
| 6,549,253 B1 | 4/2003 | Robbie et al. | |
| 6,549,335 B1 | 4/2003 | Trapani et al. | |
| 6,550,949 B1 | 4/2003 | Bauer et al. | |
| 6,552,326 B2 | 4/2003 | Turnbull | |
| 6,552,653 B2 | 4/2003 | Nakaho et al. | |
| 6,553,308 B1 | 4/2003 | Uhlmann et al. | |
| 6,559,902 B1 | 5/2003 | Kusuda et al. | |
| 6,560,004 B2 | 5/2003 | Theiste et al. | |
| 6,560,027 B2 | 5/2003 | Meine | |
| 6,566,821 B2 | 5/2003 | Nakatsuka et al. | |
| 6,567,060 B1 | 5/2003 | Sekiguchi | |
| 6,567,708 B1 | 5/2003 | Bechtel et al. | |
| 6,568,839 B1 | 5/2003 | Pastrick et al. | |
| 6,572,233 B1 | 6/2003 | Northman et al. | |
| 6,573,957 B1 | 6/2003 | Suzuki | |
| 6,573,963 B2 | 6/2003 | Ouderkirk et al. | |
| 6,575,582 B2 | 6/2003 | Tenmyo | |
| 6,575,643 B2 | 6/2003 | Takashashi | |
| 6,578,989 B2 | 6/2003 | Osumi et al. | |
| 6,580,373 B1 * | 6/2003 | Ohashi | B60R 1/00 340/425.5 |
| 6,580,479 B1 | 6/2003 | Sekiguchi et al. | |
| 6,580,562 B2 | 6/2003 | Aoki et al. | |
| 6,581,007 B2 | 6/2003 | Hasegawa et al. | |
| 6,583,730 B2 | 6/2003 | Lang et al. | |
| 6,591,192 B2 | 7/2003 | Okamura et al. | |
| 6,592,230 B2 | 7/2003 | Dupay | |
| 6,593,565 B2 | 7/2003 | Heslin et al. | |
| 6,593,984 B2 | 7/2003 | Arakawa et al. | |
| 6,594,065 B2 | 7/2003 | Byker et al. | |
| 6,594,067 B2 | 7/2003 | Poll et al. | |
| 6,594,090 B2 | 7/2003 | Kruschwitz et al. | |
| 6,594,583 B2 | 7/2003 | Ogura et al. | |
| 6,594,614 B2 | 7/2003 | Studt et al. | |
| 6,595,649 B2 | 7/2003 | Hoekstra et al. | |
| 6,597,489 B1 | 7/2003 | Guarr et al. | |
| 6,606,183 B2 | 8/2003 | Ikai et al. | |
| 6,611,202 B2 | 8/2003 | Schofield et al. | |
| 6,611,227 B1 | 8/2003 | Nebiyeloul-Kifle et al. | |
| 6,611,759 B2 | 8/2003 | Brosche | |
| 6,612,723 B2 | 9/2003 | Futhey et al. | |
| 6,614,387 B1 | 9/2003 | Deadman | |
| 6,614,419 B1 | 9/2003 | May | |
| 6,614,579 B2 | 9/2003 | Roberts et al. | |
| 6,615,438 B1 | 9/2003 | Franco et al. | |
| 6,616,313 B2 | 9/2003 | Fürst et al. | |
| 6,616,764 B2 | 9/2003 | Krämer et al. | |
| 6,618,672 B2 | 9/2003 | Sasaki et al. | |
| 6,621,616 B1 | 9/2003 | Bauer et al. | |
| 6,624,936 B2 | 9/2003 | Kotchick et al. | |
| 6,627,918 B2 | 9/2003 | Getz et al. | |
| 6,630,888 B2 | 10/2003 | Lang et al. | |
| 6,636,190 B2 | 10/2003 | Hirakata et al. | |
| 6,636,258 B2 | 10/2003 | Strumolo | |
| 6,638,582 B1 | 10/2003 | Uchiyama et al. | |
| 6,639,360 B2 | 10/2003 | Roberts et al. | |
| 6,642,840 B2 | 11/2003 | Lang et al. | |
| 6,642,851 B2 | 11/2003 | DeLine et al. | |
| 6,646,697 B1 | 11/2003 | Sekiguchi et al. | |
| 6,648,477 B2 | 11/2003 | Hutzel et al. | |
| 6,650,457 B2 | 11/2003 | Busscher et al. | |
| 6,657,607 B1 | 12/2003 | Evanicky et al. | |
| 6,661,482 B2 | 12/2003 | Hara | |
| 6,661,830 B1 | 12/2003 | Reed et al. | |
| 6,663,262 B2 | 12/2003 | Boyd et al. | |
| 6,665,592 B2 | 12/2003 | Kodama | |
| 6,669,109 B2 | 12/2003 | Ivanov et al. | |
| 6,669,285 B1 | 12/2003 | Park et al. | |
| 6,670,207 B1 | 12/2003 | Roberts | |
| 6,670,910 B2 | 12/2003 | Delcheccolo et al. | |
| 6,670,941 B2 | 12/2003 | Albu et al. | |
| 6,671,080 B2 | 12/2003 | Poll et al. | |
| 6,672,731 B2 | 1/2004 | Schnell et al. | |
| 6,672,734 B2 | 1/2004 | Lammers | |
| 6,672,744 B2 | 1/2004 | DeLine et al. | |
| 6,672,745 B1 | 1/2004 | Bauer et al. | |
| 6,674,370 B2 | 1/2004 | Rodewald et al. | |
| 6,675,075 B1 | 1/2004 | Engelsburg et al. | |
| 6,678,083 B1 | 1/2004 | Anstee | |
| 6,678,614 B2 | 1/2004 | McCarthy et al. | |
| 6,679,608 B2 | 1/2004 | Bechtel et al. | |
| 6,683,539 B2 | 1/2004 | Trajkovic et al. | |
| 6,683,969 B1 | 1/2004 | Nishigaki et al. | |
| 6,685,348 B2 | 2/2004 | Pastrick et al. | |
| 6,690,262 B1 | 2/2004 | Winnett | |
| 6,690,268 B2 | 2/2004 | Schofield et al. | |
| 6,690,413 B1 | 2/2004 | Moore | |
| 6,690,438 B2 | 2/2004 | Sekiguchi | |
| 6,693,517 B2 | 2/2004 | McCarthy et al. | |
| 6,693,518 B2 | 2/2004 | Kumata et al. | |
| 6,693,519 B2 | 2/2004 | Keirstead | |
| 6,693,524 B1 | 2/2004 | Payne | |
| 6,700,692 B2 | 3/2004 | Tonar et al. | |
| 6,709,136 B2 | 3/2004 | Pastrick et al. | |
| 6,713,783 B1 | 3/2004 | Mase et al. | |
| 6,717,109 B1 | 4/2004 | MacHer et al. | |
| 6,717,610 B1 | 4/2004 | Bos et al. | |
| 6,717,712 B2 | 4/2004 | Lynam et al. | |
| 6,719,215 B2 | 4/2004 | Droulliard | |
| 6,724,446 B2 | 4/2004 | Motomura et al. | |
| 6,726,337 B2 | 4/2004 | Whitehead et al. | |
| 6,727,807 B2 | 4/2004 | Trajkovic et al. | |
| 6,727,808 B1 | 4/2004 | Uselmann et al. | |
| 6,727,844 B1 | 4/2004 | Zimmermann et al. | |
| 6,731,332 B1 | 5/2004 | Yasui et al. | |
| 6,734,807 B2 | 5/2004 | King | |
| 6,736,526 B2 | 5/2004 | Matsuba et al. | |
| 6,737,629 B2 | 5/2004 | Nixon et al. | |
| 6,737,630 B2 | 5/2004 | Turnbull | |
| 6,737,964 B2 | 5/2004 | Samman et al. | |
| 6,738,088 B1 | 5/2004 | Uskolovsky et al. | |
| 6,742,904 B2 | 6/2004 | Bechtel et al. | |
| 6,744,353 B2 | 6/2004 | Sjönell | |
| 6,746,775 B1 | 6/2004 | Boire et al. | |
| 6,747,716 B2 | 6/2004 | Kuroiwa et al. | |
| 6,748,211 B1 | 6/2004 | Isaac et al. | |
| 6,749,308 B1 | 6/2004 | Niendorf et al. | |
| 6,755,542 B2 | 6/2004 | Bechtel et al. | |
| 6,756,912 B2 | 6/2004 | Skiver et al. | |
| 6,757,039 B2 | 6/2004 | Ma | |
| 6,757,109 B2 | 6/2004 | Bos | |
| D493,131 S | 7/2004 | Lawlor et al. | |
| D493,394 S | 7/2004 | Lawlor et al. | |
| 6,759,113 B1 | 7/2004 | Tang | |
| 6,759,945 B2 | 7/2004 | Richard | |
| 6,760,157 B1 | 7/2004 | Allen et al. | |
| 6,765,480 B2 | 7/2004 | Tseng | |
| 6,773,116 B2 | 8/2004 | De Vaan et al. | |
| 6,774,356 B2 | 8/2004 | Heslin et al. | |
| 6,774,810 B2 | 8/2004 | DeLine et al. | |
| 6,778,904 B2 | 8/2004 | Iwami et al. | |
| 6,779,900 B1 | 8/2004 | Nolan-Brown | |
| 6,781,738 B2 | 8/2004 | Kikuchi et al. | |
| 6,782,718 B2 | 8/2004 | Lingle et al. | |
| 6,784,129 B2 | 8/2004 | Seto et al. | |
| 6,797,396 B1 | 9/2004 | Liu et al. | |
| 6,800,871 B2 | 10/2004 | Matsuda et al. | |
| 6,801,127 B2 | 10/2004 | Mizusawa et al. | |
| 6,801,244 B2 | 10/2004 | Takeda et al. | |
| 6,801,283 B2 | 10/2004 | Koyama et al. | |
| 6,805,474 B2 | 10/2004 | Walser et al. | |
| 6,806,452 B2 | 10/2004 | Bos et al. | |
| 6,806,922 B2 | 10/2004 | Ishitaka | |
| 6,810,323 B1 | 10/2004 | Bullock et al. | |
| 6,812,463 B2 | 11/2004 | Okada | |
| 6,812,907 B1 | 11/2004 | Gennetten et al. | |
| 6,819,231 B2 | 11/2004 | Berberich et al. | |
| 6,823,261 B2 | 11/2004 | Sekiguchi | |
| 6,824,281 B2 | 11/2004 | Schofield et al. | |
| 6,831,268 B2 | 12/2004 | Bechtel et al. | |
| 6,832,848 B2 | 12/2004 | Pastrick | |
| 6,834,969 B2 | 12/2004 | Bade et al. | |

(56) References Cited

U.S. PATENT DOCUMENTS

| | | |
|---|---|---|
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wong |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |
| 7,063,893 B2 | 6/2006 | Hoffman |
| 7,064,882 B2 | 6/2006 | Tonar et al. |
| 7,068,289 B2 | 6/2006 | Satoh et al. |
| 7,074,486 B2 | 7/2006 | Boire et al. |
| 7,081,810 B2 | 7/2006 | Henderson et al. |
| 7,085,633 B2 | 8/2006 | Nishira et al. |
| 7,092,052 B2 | 8/2006 | Okamoto et al. |
| 7,095,432 B2 | 8/2006 | Nakayama et al. |
| 7,095,567 B2 | 8/2006 | Troxell et al. |
| 7,106,213 B2 | 9/2006 | White |
| 7,106,392 B2 | 9/2006 | You |
| 7,108,409 B2 | 9/2006 | DeLine et al. |
| 7,110,021 B2 | 9/2006 | Nobori et al. |
| 7,114,554 B2 | 10/2006 | Bergman et al. |
| 7,121,028 B2 | 10/2006 | Shoen et al. |
| 7,125,131 B2 | 10/2006 | Olczak |
| 7,130,727 B2 | 10/2006 | Liu et al. |
| 7,132,064 B2 | 11/2006 | Li et al. |
| 7,136,091 B2 | 11/2006 | Ichikawa et al. |
| 7,138,974 B2 | 11/2006 | Hirakata et al. |
| 7,149,613 B2 | 12/2006 | Stam et al. |
| 7,150,552 B2 | 12/2006 | Weidel |
| 7,151,515 B2 | 12/2006 | Kim et al. |
| 7,151,997 B2 | 12/2006 | Uhlmann et al. |
| 7,153,588 B2 | 12/2006 | McMan et al. |
| 7,154,657 B2 | 12/2006 | Poll et al. |
| 7,158,881 B2 | 1/2007 | McCarthy et al. |
| 7,160,017 B2 | 1/2007 | Lee et al. |
| 7,161,567 B2 | 1/2007 | Homma et al. |
| 7,167,796 B2 | 1/2007 | Taylor et al. |
| 7,168,830 B2 | 1/2007 | Pastrick et al. |
| 7,175,291 B1 | 2/2007 | Li |
| 7,176,790 B2 | 2/2007 | Yamazaki |
| 7,184,190 B2 | 2/2007 | McCabe et al. |
| 7,185,995 B2 | 3/2007 | Hatanaka et al. |
| 7,187,498 B2 | 3/2007 | Bengoechea et al. |
| 7,188,963 B2 | 3/2007 | Schofield et al. |
| 7,193,764 B2 | 3/2007 | Lin et al. |
| 7,195,381 B2 | 3/2007 | Lynam et al. |
| 7,199,767 B2 | 4/2007 | Spero |
| 7,202,987 B2 | 4/2007 | Varaprasad et al. |
| 7,206,697 B2 | 4/2007 | Olney et al. |
| 7,209,277 B2 | 4/2007 | Tonar et al. |
| 7,215,238 B2 | 5/2007 | Buck et al. |
| 7,215,473 B2 | 5/2007 | Fleming |
| 7,221,363 B2 | 5/2007 | Roberts et al. |
| 7,224,324 B2 | 5/2007 | Quist et al. |
| 7,227,472 B1 | 6/2007 | Roe |
| 7,230,523 B2 | 6/2007 | Harter, Jr. et al. |
| 7,232,231 B2 | 6/2007 | Shih |
| 7,233,304 B1 | 6/2007 | Aratani et al. |
| 7,235,918 B2 | 6/2007 | McCullough et al. |
| 7,241,030 B2 | 7/2007 | Mok et al. |
| 7,241,037 B2 | 7/2007 | Mathieu et al. |
| 7,245,207 B1 | 7/2007 | Dayan et al. |
| 7,245,231 B2 | 7/2007 | Kiefer et al. |
| 7,245,336 B2 | 7/2007 | Hiyama et al. |
| 7,248,283 B2 | 7/2007 | Takagi et al. |
| 7,248,305 B2 | 7/2007 | Ootsuta et al. |
| 7,249,860 B2 | 7/2007 | Kulas et al. |
| 7,251,079 B2 | 7/2007 | Capaldo et al. |
| 7,253,723 B2 | 8/2007 | Lindahl et al. |
| 7,255,451 B2 | 8/2007 | McCabe et al. |
| 7,255,465 B2 | 8/2007 | DeLine et al. |
| 7,259,036 B2 | 8/2007 | Borland et al. |

(56) References Cited

U.S. PATENT DOCUMENTS

| | | |
|---|---|---|
| 7,262,406 B2 | 8/2007 | Heslin et al. |
| 7,262,916 B2 | 8/2007 | Kao et al. |
| 7,265,342 B2 | 9/2007 | Heslin et al. |
| 7,268,841 B2 | 9/2007 | Kasajima et al. |
| 7,269,327 B2 | 9/2007 | Tang |
| 7,269,328 B2 | 9/2007 | Tang |
| 7,271,951 B2 | 9/2007 | Weber et al. |
| 7,274,501 B2 | 9/2007 | McCabe et al. |
| 7,281,491 B2 | 10/2007 | Iwamaru |
| 7,286,280 B2 | 10/2007 | Whitehead et al. |
| 7,287,868 B2 | 10/2007 | Carter et al. |
| 7,289,037 B2 | 10/2007 | Uken et al. |
| 7,290,919 B2 | 11/2007 | Pan et al. |
| 7,292,208 B1 | 11/2007 | Park et al. |
| 7,300,183 B2 | 11/2007 | Kiyomoto et al. |
| 7,302,344 B2 | 11/2007 | Olney et al. |
| 7,304,661 B2 | 12/2007 | Ishikura |
| 7,308,341 B2 | 12/2007 | Schofield et al. |
| 7,310,177 B2 | 12/2007 | McCabe et al. |
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki et al. |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Schofield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 * | 12/2009 | Rademacher ......... B66F 17/003 348/148 |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |

(56) References Cited

U.S. PATENT DOCUMENTS

| | | | |
|---|---|---|---|
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | DeLine et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | DeLine et al. |
| 8,106,347 B2 | 1/2012 | Drummond et al. |
| 8,653,959 B2 | 2/2014 | Lynam et al. |
| 9,014,966 B2 | 4/2015 | Taylor et al. |
| 9,352,623 B2 | 5/2016 | Lynam et al. |
| 9,694,749 B2 | 7/2017 | Lynam et al. |
| 2001/0026316 A1 | 10/2001 | Senatore |
| 2001/0035853 A1 | 11/2001 | Hoelen et al. |
| 2002/0005778 A1 | 1/2002 | Breed |
| 2002/0032510 A1* | 3/2002 | Turnbull ............. B60R 1/12 701/49 |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0130786 A1 | 9/2002 | Weindorf |
| 2002/0133144 A1 | 9/2002 | Chan et al. |
| 2002/0149727 A1 | 10/2002 | Wang |
| 2002/0154007 A1 | 10/2002 | Yang |
| 2002/0154379 A1 | 10/2002 | Tonar |
| 2002/0196201 A1* | 12/2002 | Rosen ............. B60K 35/00 345/7 |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minuado et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittlemann et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0064108 A1 | 3/2007 | Haler |
| 2007/0080585 A1 | 4/2007 | Lyu |
| 2007/0183037 A1 | 8/2007 | De Boer et al. |
| 2007/0262732 A1 | 11/2007 | Shen |
| 2008/0030311 A1 | 2/2008 | Dayan et al. |
| 2008/0068520 A1 | 3/2008 | Minikey, Jr. et al. |
| 2008/0231704 A1 | 9/2008 | Schofield et al. |
| 2008/0266389 A1 | 10/2008 | DeWind et al. |
| 2009/0002491 A1 | 1/2009 | Haler |
| 2009/0040778 A1 | 2/2009 | Takayanagi et al. |
| 2009/0052003 A1 | 2/2009 | Schofield et al. |
| 2009/0085729 A1 | 4/2009 | Nakamura et al. |
| 2009/0096937 A1 | 4/2009 | Bauer et al. |
| 2009/0184904 A1 | 7/2009 | S. et al. |
| 2009/0201137 A1 | 8/2009 | Weller et al. |
| 2009/0243824 A1 | 10/2009 | Hook et al. |
| 2009/0262192 A1 | 10/2009 | Schofield et al. |
| 2009/0296190 A1 | 12/2009 | Anderson et al. |
| 2010/0045899 A1 | 2/2010 | Ockerse |
| 2010/0110523 A1 | 5/2010 | Varaprasad et al. |
| 2010/0110553 A1 | 5/2010 | Anderson et al. |
| 2010/0194890 A1 | 8/2010 | Weller et al. |
| 2010/0195226 A1 | 8/2010 | Heslin et al. |
| 2010/0201896 A1 | 8/2010 | Ostreko et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1 | 11/2010 | Hwang et al. |
| 2012/0327239 A1 | 12/2012 | Inoue |

FOREIGN PATENT DOCUMENTS

| | | |
|---|---|---|
| DE | 941408 | 4/1956 |
| DE | 944531 | 7/1956 |
| DE | 7323996 | 11/1973 |
| DE | 3248511 A1 | 7/1984 |
| DE | 3301945 | 7/1984 |
| DE | 3614882 | 11/1987 |
| DE | 3720848 | 1/1989 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |

(56) References Cited

FOREIGN PATENT DOCUMENTS

| | | |
|---|---|---|
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1193773 | 3/2002 |
| EP | 1256833 | 11/2002 |
| EP | 0899157 | 10/2004 |
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-208530 | 12/1982 |
| JP | 58-020954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 02-122844 | 10/1990 |
| JP | 03-28947 | 3/1991 |
| JP | 03-028947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-267129 | 9/2003 |
| JP | 2004-182156 | 7/2004 |
| JP | 2005-148119 | 6/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| WO | WO 1982/002448 | 7/1982 |
| WO | WO 1986/006179 | 10/1986 |
| WO | WO 1994/019212 | 9/1994 |
| WO | WO 1996/021581 | 7/1996 |
| WO | WO 1998/014974 | 4/1998 |
| WO | WO 1998/038547 | 9/1998 |
| WO | WO 1999/015360 | 4/1999 |
| WO | WO 2000/023826 | 4/2000 |
| WO | WO 2000/052661 | 9/2000 |
| WO | WO 2000/055685 | 9/2000 |
| WO | WO 2001/001192 | 1/2001 |
| WO | WO 2002/018174 | 3/2002 |
| WO | WO 2002/049881 | 6/2002 |

(56) References Cited

FOREIGN PATENT DOCUMENTS

| | | |
|---|---|---|
| WO | WO 2003/021343 | 3/2003 |
| WO | WO 2003/078941 | 9/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cros/A_0319/article.html.
Kobe, Gerry; 42 Volts Goes Underhood; Mar. 2000; Automotive Industries; Cahners Publishing Company; www.findarticles.com/p/articles/mi_m3012/is_3_180/ai_61361677.
Jewett, Dale; Aug. 2000; Automotive Industries; Cahners Publising Company; www.findarticles.com/p/articles/mi_m3012/is_8_180ai_64341779.
National Semiconductor, LM78S40, Universal Switching Regulator Subsystem, National Semiconductor Corporation, Apr. 1996, P.6.
Dana H. Ballard and Christopher M. Brown, Computer Vision, Prentice-Hall, Englewood Cliffs, New Jersey, 5 pages, 1982.
G. Wang, D. Renshaw, P.B. Denyer and M. Lu, CMOS Video Cameras, article, 1991, 4 pages, University of Edinburgh, UK.

* cited by examiner

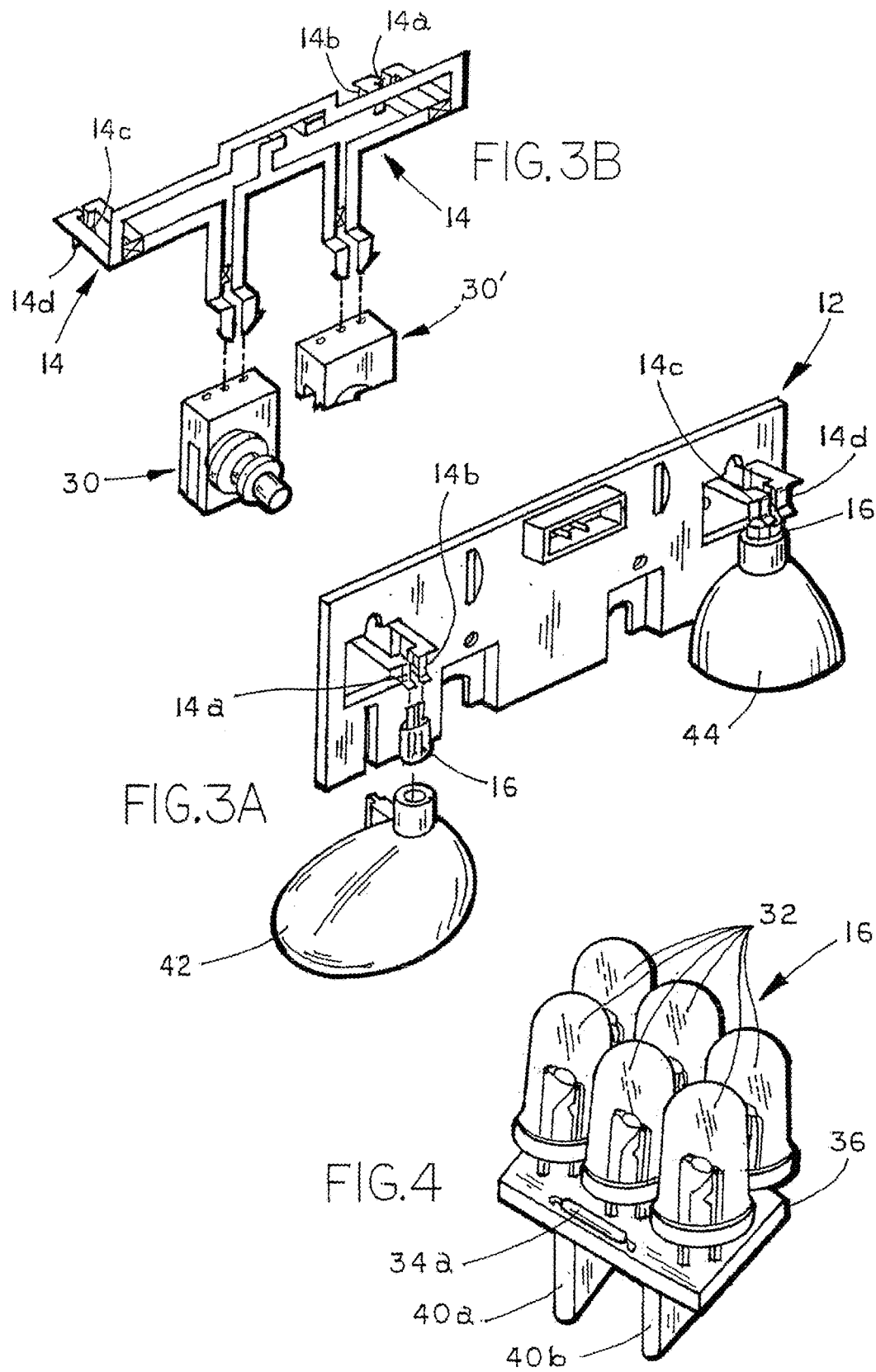

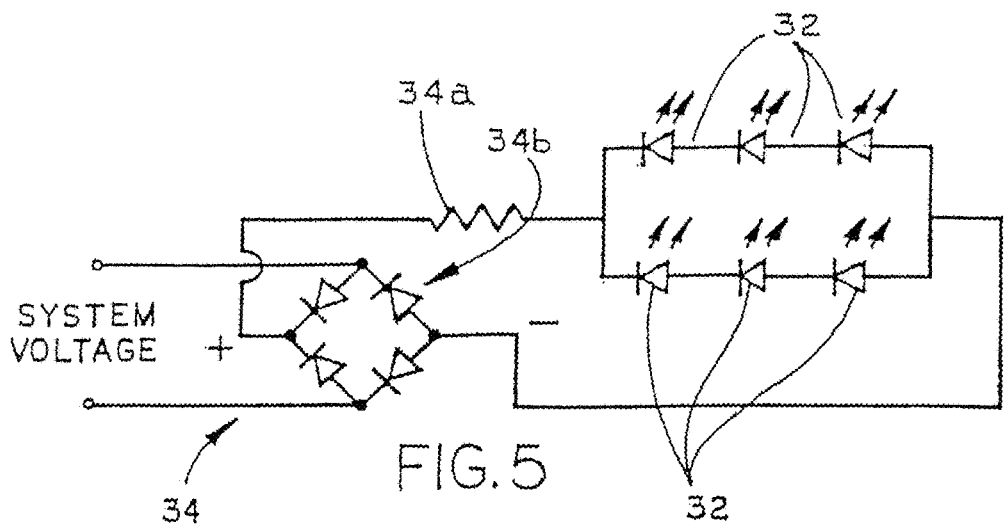
FIG.5
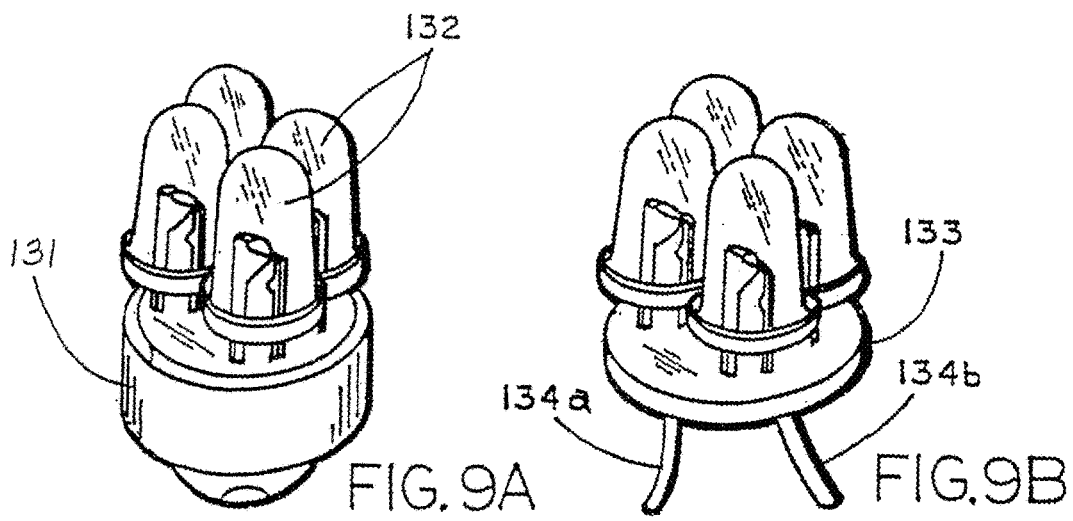
FIG.9A
FIG.9B
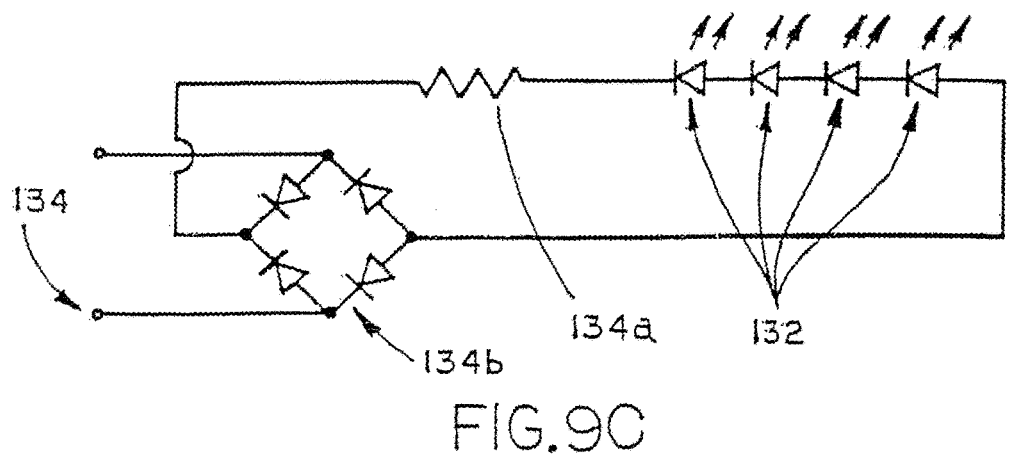
FIG.9C

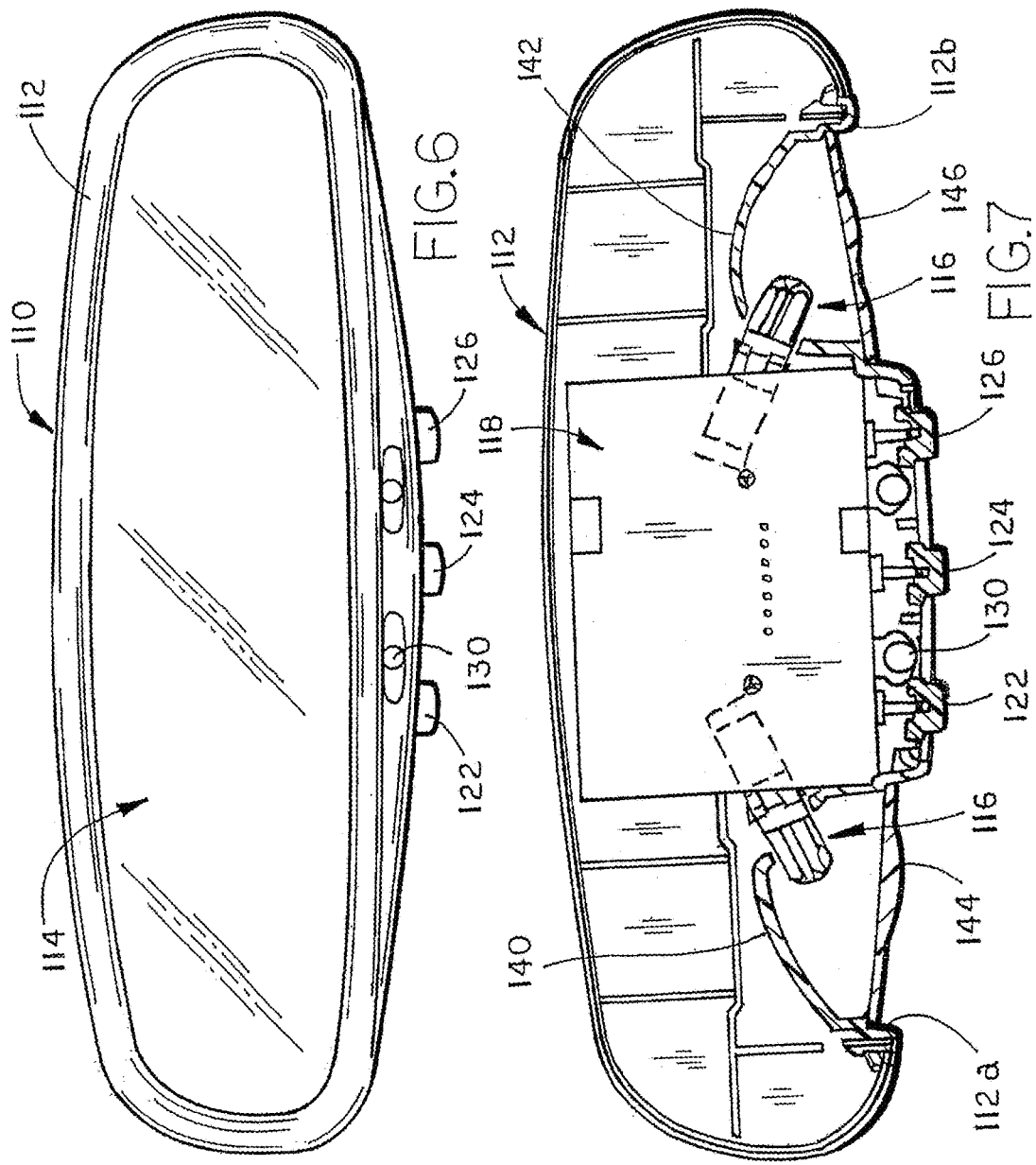

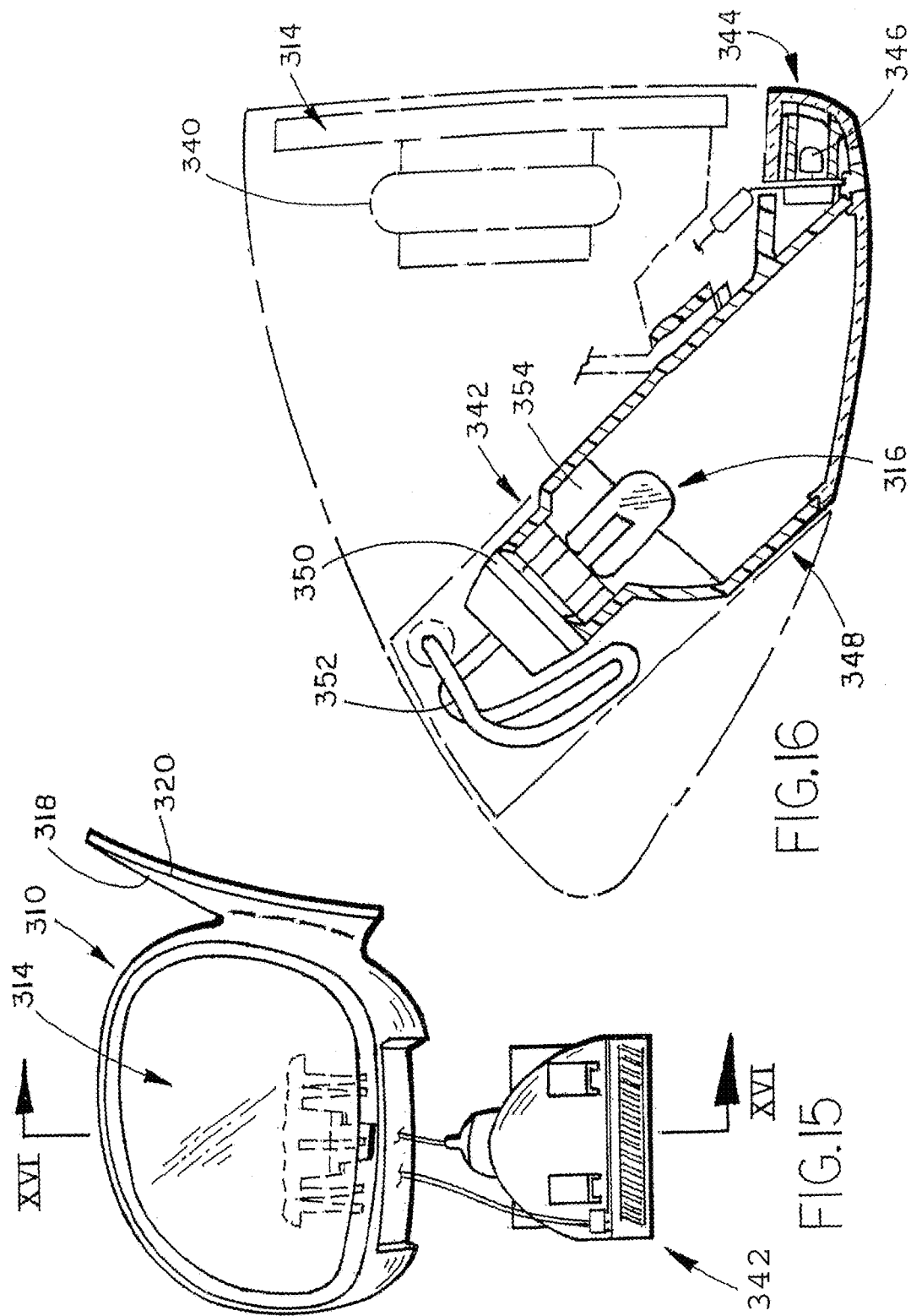

REAR SEAT OCCUPANT MONITORING SYSTEM FOR VEHICLE

CROSS REFERENCE TO RELATED APPLICATIONS

This application is a continuation of U.S. patent application Ser. No. 15/161,707, filed May 23, 2016, now U.S. Pat. No. 9,694,749, which is a continuation of U.S. patent application Ser. No. 14/181,778, filed Feb. 17, 2014, now U.S. Pat. No. 9,352,623, which is a continuation of U.S. patent application Ser. No. 13/309,915, filed Dec. 2, 2011, now U.S. Pat. No. 8,653,959, which is a continuation of U.S. patent application Ser. No. 12/609,329, filed Oct. 30, 2009, now U.S. Pat. No. 8,072,318, which is a continuation of U.S. patent application Ser. No. 12/061,372, filed Apr. 2, 2008, now U.S. Pat. No. 7,619,508, which is a continuation of U.S. patent application Ser. No. 12/043,567, filed Mar. 6, 2008, now U.S. Pat. No. 7,731,403, which is a division of U.S. patent application Ser. No. 11/623,997, filed Jan. 17, 2007, now U.S. Pat. No. 7,344,284, which is a continuation of U.S. patent application Ser. No. 10/054,633, filed Jan. 22, 2002, now U.S. Pat. No. 7,195,381, which claims priority from and incorporates by reference herein in their entireties U.S. provisional applications, Ser. No. 60/346,733, filed Jan. 7, 2002; Ser. No. 60/263,680, filed Jan. 23, 2001; Ser. No. 60/271,466, filed Feb. 26, 2001; and Ser. No. 60/315,384, filed Aug. 28, 2001, and U.S. patent application Ser. No. 10/054,633 is a continuation-in-part of U.S. patent application Ser. No. 09/793,002, filed Feb. 26, 2001, now U.S. Pat. No. 6,690,268.

TECHNICAL FIELD AND BACKGROUND OF THE INVENTION

The present invention relates to automotive lighting, more specifically to lighted mirrors for a vehicle, such as an automobile, sports utility vehicle, truck or similar road transportation vehicle. More particularly, the present invention relates to a lighting system that incorporates at least one non-incandescent light source, such as a light emitting diode (LED) light source, including a high intensity LED light source, and especially to a vehicular lighting system for a vehicular accessory such as a lighted interior mirror assembly, a lighted exterior mirror assembly, and a lighted accessory module.

Mirror manufacturers have developed a wide variety of incandescent-based lighting products for use in mirrors. Typically, prior art lighted mirror assemblies that use incandescent lighting have a mirror case, a mirror reflector, and wiring that carries circuitry for powering the various components in the mirror assembly, including the incandescent light source, which typically comprises a filament light bulb. In some applications, a lighted mirror assembly may incorporate a carrier, such as disclosed in U.S. Pat. Nos. 5,669,698 and 6,124,886, which are commonly assigned, the entire disclosures of which are herein incorporated by reference. The carrier provides a mounting surface for various electrical/electronic devices housed in the mirror assembly, including a circuit for an incandescent light source or other light sources. The mirror assembly also typically includes a reflector element and a lens, which are configured to direct the light from the incandescent light source in a desired light pattern. In addition, most, if not all of these mirror assemblies, incorporate a way to service the incandescent light source. For example, these incandescent light sources are typically mounted in a socket, such as screw type sockets, a wedge type socket, a cartridge type socket (which typically includes two spaced apart clips), a bayonet type socket, a bi-pin socket, or the like, such as disclosed in U.S. Pat. Nos. 5,178,448; 5,649,756; 5,673,994; 5,813,745 and 6,042,253, the entire disclosures of which are incorporated by reference herein, which permits the bulb or lamp to be retrieved for replacement. When the incandescent light source is plugged into its respective connector, it is normally connected to a switched line which when thrown, directs current from the ignition line/battery of the vehicle to the light source.

However more recently, non-incandescent light sources, such as light emitting diodes (LEDs), have been incorporated into mirror assemblies, such as disclosed in U.S. Pat. Nos. 5,371,659 and 5,671,996, which are commonly assigned and U.S. Pat. No. 6,152,590, which are incorporated by reference herein in their entireties. Other examples of the use of LEDs in vehicular interior and exterior mirror assemblies are disclosed in U.S. Pat. Nos. 6,280,069; 6,276,821; 6,176,602; 6,152,590; 6,149,287; 6,139,172; 6,086,229; 5,938,321; 5,868,116; 5,497,306; 6,132,072; 5,803,579; 5,671,996 and 5,497,305; International Publication Nos. WO 2000/055914 and WO 2000/055685; and European Pat. Application EP917734, and of the use of LEDs as warning lights such as in taillights are disclosed in U.S. Pat. Nos. 6,016,035; 6,286,984; 6,102,559; 6,276,822; 5,975,715 and 5,765,940, all of which patents and patent applications are hereby incorporated herein by reference in their entireties.

LEDs are desirable in certain applications since they typically produce less heat than incandescent light sources and are more compact. In addition, LEDs produce directional light. As a result, the light from the LEDs can be directed or manipulated by merely selective positioning or orienting of the LEDs. Hence, the various optical devices associated with incandescent light sources, such as reflectors and optical lenses, can be optionally simplified and even eliminated, saving material costs and assembly time.

However, most vehicular battery/ignition systems operate at around 12 volts nominal (although ignition voltages can vary from about 9 volts to about 16 volts during vehicular use) whereas most LED units typically operate at a lower voltage; typically less than about 5 volts (and in or around 1.5 volts to 2.5 volts being common). Because of the different circuit requirements for LEDs, LED applications typically require specialized tooling of the mirror assemblies. Some manufacturers are slower to retool existing incandescent lighted mirror assembles to accommodate LEDs and, as a result, have and will continue to have a large inventory of mirror assemblies that are tooled for incandescent light sources. Other manufactures may have already retooled their mirror assemblies as hybrid mirror assemblies that have some LED applications, such as console lighting, while other lights in the mirror assemblies remain as incandescent based light applications, such as map lights. In which case, these mirror assemblies may have one circuit for the LED application and another circuit for the incandescent light application.

Heretofore, therefore, lighted mirror assemblies have required application-specific circuitry to power the light sources because of the different current and voltage needs of these various light sources (incandescent or LED). When mirror assemblies are tooled for incandescent light sources, these mirror assemblies have heretofore been limited to using incandescent-light-source replacements for the incandescent light sources. Therefore, mirror manufacturers that have their current production of mirror assemblies tooled for incandescent light source applications have not been able to take full advantage of the recent developments in the use of non-incandescent light sources.

Also, LED reading/map lights used in lighted interior mirror assemblies, and in turn-signal and security-lighted exterior mirror assemblies, often use a plurality of LEDs in order to provide the desired light intensity across the zone desired illuminated.

Consequently, there is need for an improved non-incandescent lighting system, including a way to incorporate a non-incandescent light source in a mirror assembly that has been tooled to receive an incandescent light source.

Use of a non-incandescent LED light source as a source of illumination in a vehicle such as in a lighted interior or a lighted exterior mirror assembly is known, such as is disclosed in U.S. Pat. Nos. 6,280,069; 6,276,821; 6,176,602; 6,152,590; 6,149,287; 6,139,172; 6,086,229; 5,938,321; 5,868,116; 5,497,306; 6,132,072; 5,803,579; 5,671,996 and 5,497,305; International Publication Nos. WO 2000/055914 and WO 2000/055685; and European Pat. Application EP917734, all of which patents and patent applications are hereby incorporated herein by reference. Such LED-lighted interior and exterior mirror systems work well for their intended purpose. However, most vehicular battery/ignition systems operate at around 12 volts nominal (although ignition voltages can vary from about 9 volts to about 16 volts during vehicular use) whereas most LED units typically operate at a lower voltage; typically less than about 5 volts (and in or around 1.5 volts to 2.5 volts being common). Also, LED reading/map lights used in lighted interior mirror assemblies, and in turn-signal and security-lighted exterior mirror assemblies, often use a plurality of LEDs in order to provide the desired light intensity across the zone desired illuminated.

Therefore, there is a need for an improved LED lighting system such as an improved LED lighted mirror system.

SUMMARY OF THE INVENTION

Accordingly, the present invention provides for a non-incandescent light unit/module that can be used as a direct replacement for an incandescent light source in a mirror assembly that has been tooled for the incandescent light source.

In one form of the invention, a non-incandescent light source unit includes a non-incandescent light source assembly with at least one non-incandescent light source and a non-incandescent light source circuit. The non-incandescent light source circuit is electrically coupled to the non-incandescent light source and includes a pair of electrical connectors for connecting the non-incandescent light source circuit to a light source circuit of a mirror assembly. The non-incandescent light source assembly is adapted to releasably establish mechanical connection and electrical connection with the mirror assembly.

In one aspect, the non-incandescent light source circuit includes a current limiting element or device, such as a resistor or a non-light emitting diode, for controlling the current flowing to the non-incandescent light source. In other aspects, the non-incandescent light source preferably comprises a light emitting diode (although other light sources such as fluorescent sources or neon sources or electroluminescent sources may optionally be used). In a further aspect, the light source unit includes a plurality of light emitting diodes. For example, the light emitting diodes may be connected wherein their total additive forward operating voltage is greater than about 2 volts. Alternately, their total additive forward operating voltage may be greater than about 4 volts or in a range of about 2 to 16 volts. For vehicles equipped with a 42 volt ignition/battery source, their total additive forward operating voltage may be greater than about 16 volts or in a range of about 16 to about 42 volts.

In yet other aspects the light source unit includes at least two light emitting diodes electrically connected in series. Optionally, the unit may include at least four emitting diodes connected in series.

In another aspect, the light source unit may include two or more groups of light emitting diodes electrically connected in parallel. Furthermore, each group of the light emitting diodes may include at least two light emitting diodes connected in series and, more preferably, at least three light emitting diodes connected in series.

In yet another aspect, the non-incandescent light source assembly includes at least one polarity indicator associated with at least one of the connectors. For example, the polarity indicator may comprise either an indentation or a projection. In addition, the respective connector may include the polarity indicator.

In another aspect, the non-incandescent light source circuit further includes a polarity rectifier, such as a diode bridge rectifier, which eliminates the polarity of the light source module. In this manner, the light source unit can be plugged in with the connectors in either orientation without a need for a polarity indicator.

In another form of the invention, a non-incandescent light source unit includes a modular package having an electrical component such as a resistor or a non-light emitting diode, preferably on a circuit board, at least one non-incandescent light source, and an interface, preferably including at least one electrical and/or mechanical connector connecting to a non-incandescent light source circuit and/or socket. The non-incandescent light source interface/circuit of the non-incandescent light source unit is electrically connected to the non-incandescent light source and preferably includes a pair of electrical connectors for connecting the non-incandescent light source circuit to the light source circuit of the mirror assembly.

In one aspect, the non-incandescent light source of the non-incandescent light source unit comprises a plurality of light emitting diodes. For example, the circuit of the non-incandescent light source unit may include a silicon wafer or similar microelectronic chip element having the light emitting diodes established as junctions on the chip surface, as is known in the light emitting diode (LED) art. The chip may include a plurality of individual junctions forming the individual light emitting diodes. Optionally, the light emitting diodes are enclosed in a surround that functions both as an encapsulant to protect the LED junctions from environmental and mechanical damage and as an optical element (such as a lens and/or a diffuser) for light emitted by the LED junctions on the chip surface.

In another aspect, the non-incandescent light source circuit includes a current limiting device, such as at least one resistor, for limiting the current flowing to the non-incandescent light source.

In further aspects, the modular package includes a base, which includes a ground contact and a power contact for electrically coupling to the circuit of the mirror assembly. The connectors are electrically coupled to the contacts to thereby power the light sources. For example, the base may comprise a threaded base. In another aspect, the connectors comprise pins.

In another aspect, the modular package includes an elongated body with the electrical connectors positioned at opposed ends portions of the elongate body. For example, the connectors may comprise looped connectors that project outwardly from the elongate body.

In an alternate aspect, the modular package includes an elongated body and includes contacts positioned at opposed ends portions of the elongate body, with the connectors electrically coupled to the contacts. For example, the contacts may comprise frusto-conical shaped contacts.

According to yet another form of the invention, a vehicle mirror assembly includes a mirror housing having a reflective element and a non-incandescent light source unit. The mirror housing includes a light source circuit with a pair of contacts for receiving a light source. The non-incandescent light source unit includes at least one non-incandescent light source and a non-incandescent light source circuit. The non-incandescent light source circuit electrically couples the non-incandescent light sources to a pair of electrical connectors, which connect the non-incandescent light source circuit to the contacts of the light source circuit of the mirror housing. The receiving contacts of the incandescent light source circuit receive the corresponding contacts of the non-incandescent light source circuit of the non-incandescent light source unit preferably to form both electrical interconnection and mechanical connection whereby the non-incandescent light source unit is securely retained, preferably releasably retained, in the vehicle mirror assembly.

In one aspect, the non-incandescent light source circuit includes a current limiting element or device for controlling the current flowing to the non-incandescent light source.

In another aspect, the non-incandescent light source comprises a plurality of light emitting diodes. In a further aspect, the light emitting diodes are connected wherein their total additive forward operating voltage is greater than about 2 volts.

In yet another aspect, the light emitting diodes are mounted on a circuit board. In a further aspect, the circuit board includes a microelectronic chip having the light emitting diodes as junctions thereon. For example, the chip may include a plurality of junctions forming the light emitting diodes.

According to yet another aspect, the non-incandescent light source unit comprises a modular package with a non-incandescent light source and non-incandescent light circuit. The package includes a base, with the base including a ground contact and a power contact for electrically coupling to a light source circuit of the vehicle accessory, such as the mirror assembly. The electrical connectors of the non-incandescent light source circuit are electrically coupled to the contacts. For example, the base may comprise a threaded base. Alternately, the modular package includes an elongated body with the electrical connectors positioned at opposed ends portions of the elongate body.

According to yet another aspect of the present invention, a non-incandescent light source module is connectable to a power source of a vehicle and includes a non-incandescent light source, a heat dissipating element or heat sink, and a light directing element. The heat dissipating element functions to dissipate heat generated by the non-incandescent light source when the non-incandescent light source is energized. The light directing element is operable to direct the light emitted by the non-incandescent light source toward a targeted area at, within, or exteriorly of the vehicle. In one form, the non-incandescent light source module is suitable for use at an interior rearview mirror assembly, such as for use as a map reading light or the like. In another form, the non-incandescent light source is suitable for use at an exterior rearview mirror assembly, such as for a turn signal indicator, security light, or the like.

Optionally, the heat dissipating element further includes a reflective surface for reflecting light emitted by the non-incandescent light source toward the light directing element. The light directing element may include a reflector, a light pipe or conduit member, and/or a lens element for directing light toward the targeted area.

Optionally, the module may include an electrically resistive portion in series connection with the non-incandescent light source. The electrically resistive portion may be operable to limit the current or drop the voltage that is applied to the non-incandescent light source by the power source.

According to another aspect of the present invention, an exterior rearview mirror includes a primary or principal reflective element and an auxiliary reflective element and a bezel frame element. The bezel frame element includes a frame element portion which separates and demarcates the auxiliary reflective element from the principal reflective element. At least one light source is positioned at or along the frame element portion for providing illumination. The light source may comprise a turn signal indicator or a security light or the like.

According to other aspects of the present invention, the present invention provides a vehicular lighting system, and in particular, a lighted vehicular mirror system that utilizes a lighting assembly comprising, preferably, no more than three light emitting diode light sources (more preferably, no more than two light emitting diode light sources, and most preferably, a single light emitting diode light source) to provide intense illumination (preferably with a light intensity of at least about 3 lux, more preferably at least about 25 lux, most preferably at least about 50 lux) over a zone of area at least about 1 square foot in dimension, more preferably at least about 3 square feet in dimension, and most preferably at least about 5 square feet in dimension. Such a zone of intense (and preferably uniform) illumination provided by the present invention preferably comprises the lap area of a front seat occupant of a vehicle (such as that of a driver of the vehicle or of a front passenger of the vehicle), with the lighting assembly of the invention being positioned as part of an interior mirror assembly (attached to a front windshield of the vehicle or to a header of the vehicle, as known in the automotive mirror art, such as described in U.S. Pat. Nos. 6,139,172; 6,042,253; 5,938,321; 5,813,745; 5,673,994; 5,671,996; 5,649,756; 5,178,448; 4,807,096; 4,733,336 and 4,646,210, all of which are hereby incorporated herein by reference). Alternately, such a zone of intense (and preferably uniform) illumination provided by the present invention preferably comprises a ground area adjacent a front door (and, more preferably, a front door and a rear door) exterior to and at a driver-side of the vehicle or exterior to and at a passenger-side of the vehicle, with the lighting assembly of the invention being positioned as part of the exterior mirror assembly mounted to the side of the vehicle at which the ground is being illuminated in order to establish a lighted security zone at that side and adjacent the exterior of the vehicle when it is parked and when approached by a person desiring to enter the vehicle, such as disclosed in U.S. Pat. Nos. 6,280,069; 6,276,821; 6,176,602; 6,152,590; 6,149,287; 6,139,172; 6,086,229; 5,938,321; 5,671,996 and 5,497,305; and U.S. patent application Ser. No. 09/866,398, filed May 25, 2001, now U.S. Pat. No. 6,416,208, and Ser. No. 09/690,048, filed Oct. 16, 2000, now U.S. Pat. No. 6,568,839, all of which are hereby incorporated herein by reference.

The present invention includes use of a direct current (DC) step-down voltage conversion element in order to allow a single high-intensity power LED (or at most two or three individual LEDs connected electrically in series or a plurality of individual LEDs connected electrically in parallel) be efficiently powered with maximum power transfer efficiency between the powering DC source (typically the vehicle battery or ignition system) and the LED being powered, and with minimum need to dissipate power as heat in a resistive element (such as a series power resistor capable of dissipating power of the level of about 1 watt and higher, and sometimes in conjunction with a heat sink/heat dissipater) and/or to use the like of pulse width modulation or similar circuitry to vary the duty cycle being applied to the individual LED being powered.

Accordingly, these and other objects, advantages, and features will become more apparent from a review of the specification and drawings, which follow.

BRIEF DESCRIPTION OF THE DRAWINGS

FIG. 3A is an enlarged perspective view of the carrier assembly of FIG. 2;

FIG. 3B is a perspective view of the incandescent light source circuit of the carrier of FIG. 3A;

FIG. 4 is an enlarged view of the non-incandescent light source unit/module of the present invention;

FIG. 5 is a schematic drawing of the non-incandescent light source circuit of the light source unit/module;

FIG. 6 is a front elevation view of a second embodiment of an interior rearview assembly housing incorporating a non-incandescent light source unit/module of the present invention;

FIG. 7 is a front elevation view of the mirror assembly of FIG. 6 with the bezel and reflective element removed;

FIG. 9A is an enlarged view of another embodiment of the non-incandescent light source unit/module of the present invention;

FIG. 9B is a perspective view of the non-incandescent light sources and carrier of the light source unit of FIG. 9A;

FIG. 9C is a schematic view of the non-incandescent light source circuit of the light source unit of FIG. 9A;

FIG. 15 is a front partial exploded elevation of an exterior rearview mirror assembly incorporating a non-incandescent light source module of the present invention;

FIG. 16 is a cross section view taken along line XVI-XVI of FIG. 15;

DETAILED DESCRIPTION OF THE PREFERRED EMBODIMENTS

Figure 1:
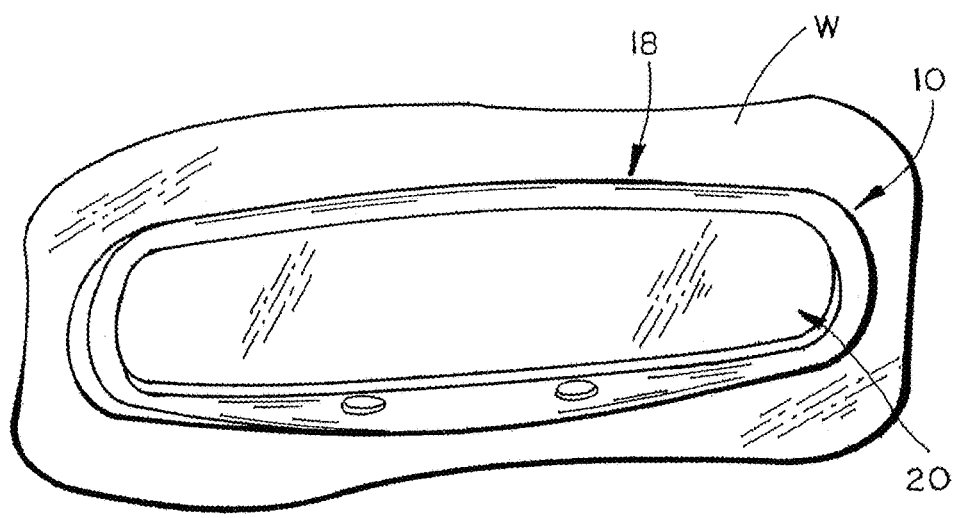
FIG. 1 is a front elevation view of a mirror assembly incorporating a non-incandescent light source unit/module of the present invention.

Referring to FIG. 1, the numeral 10 generally designates an interior rearview mirror assembly which incorporates at least one non-incandescent light source unit/module 16 of the present invention. As will be more fully described below, rearview mirror assembly 10 includes a carrier 12 with an incandescent light source circuit member 14 (FIG. 4) to which non-incandescent light source unit/module 16 is electrically coupled in an incandescent light source socket (formed by contact elements 14*a*, 14*b* or 14*c*, 14*d*). Thus, non-incandescent light source unit 16 provides a replacement for a conventional incandescent light source, such as a filament light bulb. Alternatively, light source unit 16 may be electrically coupled via connections or contacts to corresponding connectors or contacts of other circuits that are connected to the vehicle ignition battery. In this manner, light source unit 16 provides a compact and serviceable light source that can be used in a wide variety of applications.

Referring to FIG. 3, in the illustrated embodiment mirror assembly 10 includes a pair of non-incandescent light source units/modules 16, which are adapted to be electrically powered by incandescent light source circuit member 14 and, further, to be mechanically held (preferably releasably held to assist insertion and removal such as during assembly or in service) in sockets formed by arms or contact elements 14*a*, 14*b*, 14*c* and 14*d* of circuit member 14. The incandescent light source circuit of mirror assembly 10 (that preferably includes an ON/OFF and/or a rheostat switch such as driver-side switch 30 or passenger-side switch 30') connects the vehicle ignition/vehicle battery line of the vehicle to, for example, contact element 14*a* and vehicle ground to contact element 14*c*, as illustrated in FIG. 3B, so that vehicle ignition voltage (typically 12 volts nominal but it can be in the 9 volt to 16 volt range, or higher or lower depending on the vehicle type) is applied across contact elements 14*a*, 14*b* when switch 30 is closed (such as by actuation by a driver of the vehicle or when a door opens). Non-incandescent light source unit 16 preferably comprises a light emitting diode light source unit or module, which produces less heat than conventional incandescent light sources and, further, which preferably provides directional light. The directional light characteristic of light source unit 16 enables the manufacturer of the mirror assembly to simplify or eliminate light directing elements, such as reflectors and/or optical lenses, which are typically required in association with incandescent light sources. As understood by those skilled in the art, incandescent light sources, such as a heated filament, project light radially outward in many directions and are, therefore, generally non-directional light sources.

Figure 2:
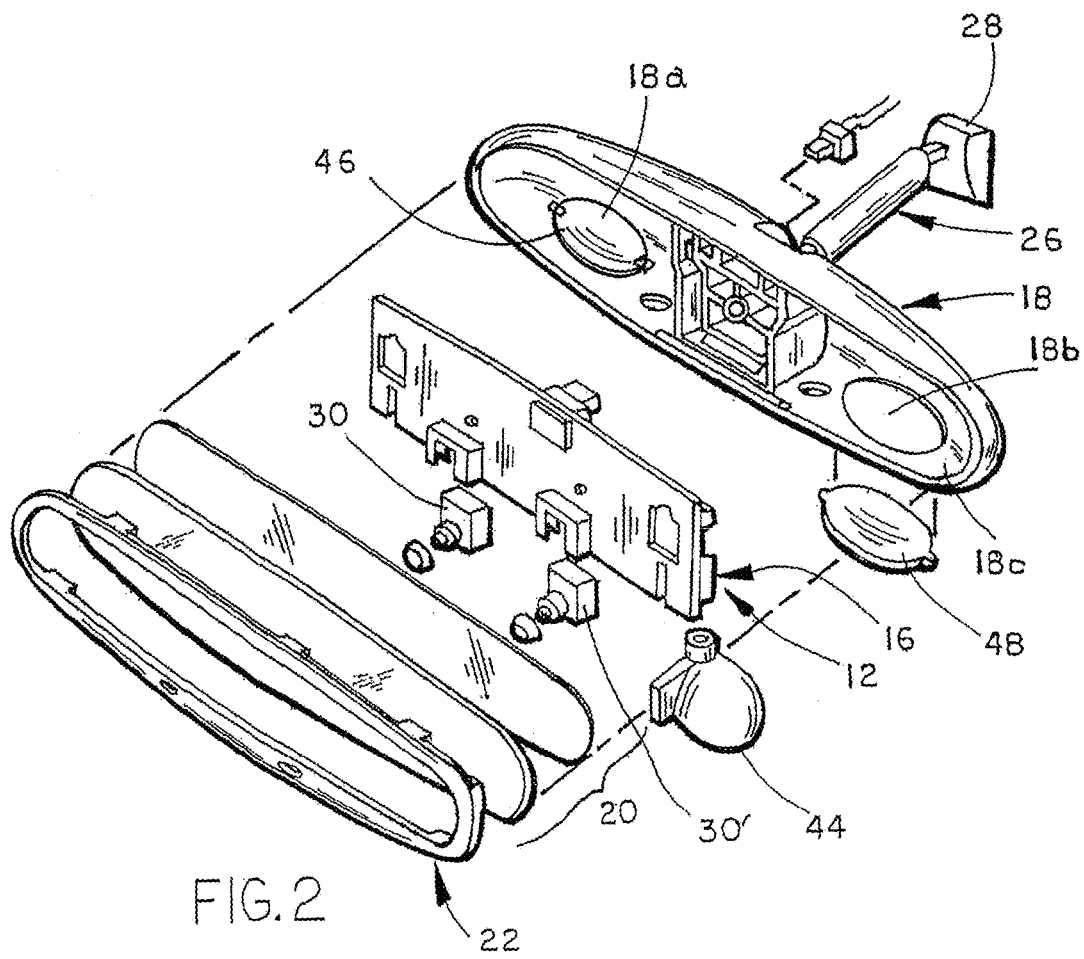
FIG. 2 is an exploded perspective view of the mirror assembly of FIG. 1.

Referring to FIG. 2, mirror assembly 10 includes a casing 18 and a reflective element assembly 20, which includes a fixed reflectance reflective element (such as a metallic reflector mirror, for example a chrome mirror) or a variable reflectance reflective element, such as a prismatic reflective element or an electrochromic reflective element. Suitable electrochromic mediums are described in commonly assigned U.S. Pat. Nos. 5,140,455 and 5,151,816, or in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), the disclosures of which are hereby incorporated by reference herein in their entireties. Other suitable electrochromic reflectors are described in U.S. Pat. Nos. 5,567,360; 5,525,264; 5,610,756; 5,406,414; 5,253,109; 5,076,673; 5,073,012 or 5,117,346, which are all commonly assigned, the disclosures of which are herein incorporated by reference in their entireties. Mirror assembly 10 further includes a bezel or a retaining rim 22 which mounts to and forms the peripheral portion of casing 18 and preferably, retains reflective element assembly 20 in mirror casing 18.

In the illustrated embodiment, mirror assembly 10 comprises a prismatic mirror assembly and includes a toggle or actuator 24 that changes the orientation of reflective element assembly 20 by pivoting mirror casing 18 about a mirror support 26. In addition, support 26 preferably comprises a dual-ball mount support, which provides adjustment for the orientation of mirror casing 18. For further details of suitable toggles or actuators, reference is made to U.S. patent application Ser. No. 09/533,127, filed Mar. 23, 2000, now U.S. Pat. No. 6,318,870, which is incorporated herein by referenced in its entirety. Support 26 further includes a channel shaped mirror mount 28 which provides a break-away connection for support 26 to a mirror mounting button that is adhered to the inner surface of the windshield by an adhesive, as is commonly known in the art. For further details of suitable mounting brackets or mounting arrangements, reference is made to U.S. Pat. Nos. 5,478,522; 5,671,996; 5,813,745; 5,673,994; 5,820,097; 5,708,410; 5,576,687; 5,521,760; 5,527,354; 5,330,149; 5,100,095; 5,058,851; 4,930,742; 4,936,533; 4,436,371; 4,524,941; 4,435,042 and 4,646,210, all commonly assigned, the entire disclosures of which are herein incorporated by reference herein.

As previously noted, mirror assembly 10 includes a carrier 12, which supports incandescent light source circuit member 14. In addition, carrier 12 may support one or more electrical/electronic components, including for example switches 30, 30' for actuating light source units/modules 16 and other electrical devices, such as described below. Referring to FIG. 4, each light source module 16 includes one or more non-incandescent light sources 32, such as LEDs, and preferably at least two light sources, more preferably at least three light sources, and most preferably more than four light sources. The number of the LEDs will depend on the application and, further, on the type of LED that is chosen.

Referring to FIG. 5, in the illustrated embodiment, light source module 16 includes six LEDs, which are interconnected such that their total cumulative forward operating voltage is greater than about 2 volts in one form, greater than about 4 volts in another form, greater than about 6 volts in yet another form, and preferably in a range of about 2 volts to 16 volts. In another form, the total cumulative forward operating voltage equals approximately the system voltage of the vehicle, for example for a 12-volt ignition voltage the total voltage could be 12 volts. It should be understood where the ignition voltage of a vehicle increases, the total cumulative voltage of the light sources may correspondingly increase. Optionally, light module 16 includes two groups of LEDs, which are connected in parallel, with each group having for example three LEDs connected in series. It should be understood that the number of groups of LEDs in parallel and the number of LEDs in each group may be varied, again depending on the application and the type of LEDs that are chosen. LEDs typically have forward operating voltages in a range of about 1.7 volts to 7 volts or more, with brighter LEDs typically having a forward operating voltage in a range of about 3 volts to about 7 volts. In addition, LEDs sources typically have a diameter dimension greater than 1 mm but less than about 7 mm, and more typically in a range from about 2-5 mm. One suitable light-emitting diode, at 25 degrees C. or thereabouts, operates at a forward voltage of about 2 volts to about 5 volts and passes a current in a range from about 20-50 milliamps.

In the illustrated embodiment, light sources 32 are interconnected by a non-incandescent light source circuit 34 and commonly mounted on a circuit board 36. Circuit 34 includes or is electrically coupled to electrical contact elements 40a and 40b, which form contacts. Contact elements 40a, 40b preferably comprise "male" plug connectors (that are optionally integrally molded with circuit board 36) which are adapted so that the module 16 may be plugged into the corresponding "female" socket connector or connectors (formed by electrical contact elements 14a, 14b or 14c, 14d) provided on the incandescent light source circuit member 14. It should be understood that module 16 may include female connectors, with circuit member 14 incorporating male connectors. Contact elements 40a, 40b preferably are directly connected to circuit board 36. Where the contact elements are separate elements, the contact elements are interconnected with circuit 34, such as by solder via, for example, a wire interconnect. Referring back to FIG. 4, when light source unit 16 is coupled to circuit member 14, electrical contact elements 40a and 40b are engaged by arms or electrical contact elements 14a, 14b or 14c, 14d of circuit member 14. This engagement provides both a mechanical connection and an electrical connection that is secure but releasable to allow coupling or decoupling of light source unit 16.

In order to limit the current through the LEDs, circuit 34 optionally includes one or more current limiting elements or devices 34a, such as a resister or non-light emitting diode or the like, and further optionally includes a polarity rectifier 34b, such as a diode bridge rectifier, to eliminate the polarity of light source module 16. In this manner light source module 16 can be "plugged" in with the contacts in either orientation. Since non-incandescent light sources, such as LEDs, are typically polar (meaning that the correct polarity of powering applied voltage must be used), non-incandescent light sources, such as a heated filament light bulb, typically are not polar. Provision of a polarity rectifier eliminates the need to use a particular orientation when plugging light source module 16 into mirror assembly 10, thus easing the assembly task. The current limiting device or devices, for example, may have a total voltage drop in a range of 0.5 volts to 14 volts or more, again depending on the application. As an alternate to the use of a polarity rectifier element, a polarity indicator element (such as an indent or a mark or a sizing/shaping of one contact compared to another) can be used to guide the polarity-correct connection of light source module 16 into mirror assembly 10.

In the illustrated embodiment, mirror assembly 10 includes openings 18a and 18b in a bottom wall 18c of casing through which light source modules 16 direct light to form map lights or the like. Mirror assembly 10 also includes a pair of surrounds 42 and 44, which are mounted to carrier 12 and positioned over light source modules 16 in a similar fashion to conventional reflectors. Surrounds 42 and 44 can be provided merely for aesthetic reasons so that the inside of the interior rearview mirror assembly cannot be viewed through openings 18a and 18b of casing 18. However, in a post-assembly replacement situation, surrounds 42 and 44 may comprise reflectors. It should be understood that reflectors may not be needed for light source module 16, since light sources 32 are directional light sources. In contrast to incandescent light sources, the orientation of light sources 32 dictates the light pattern generated by light sources 32. However, when retro-fitting an existing mirror assembly in which the direction of the light module 16 does not produce the desired light pattern, surrounds 42 and 44 may have reflective surfaces to direct the light in the desired light pattern. Alternatively or in addition, surrounds 46 and 48, which are positioned in openings 18a and 18b, may comprise optical surrounds to direct the light in a desired light pattern. The light pattern from any one of the individual LEDs, such as in light module 16, may be directed to generally impinge or generally not impinge on the respective surround 46, 48. Also, a light transmitting surround (preferably a diffuser and/or an optical lens (refractive and/or diffractive)) can be disposed in mirror assembly 10 such that light emitted by light module 16 passes through the surround, and thus be directed/modified by interaction with the surround.

Alternately, light module 16 may incorporate a microelectronic element, such as an integrated circuit chip, including a die-on-board chip (as known in the LED art), on which typically a plurality of at least two light emitting diode junctions are created on a semiconductor substrate (such as a silicon wafer element) to form the LEDs. In this application, the light module may include a single large transparent surround or lens over the entire group of LEDs. The lens could be a clear lens, a Fresnel lens, a binary optic, a refractive optic, a holographic optic, or a diffusing optic. In a preferred embodiment, the lens is a clear lens made from a polymeric light transmitting material, such as an optical acrylic or an optical epoxy material. It should be understood that the number of LEDs and the size of the LEDs may be varied and, further, may be packaged using surface mount technology (SMT), which reduces the size of the light module.

Alternately, the individual light sources comprising the light module may be interconnected and directly connected, such as by molding, to the connectors, such as brass stampings, to provide a more compact unit or module, thus eliminating the need for a circuit board. Furthermore, separate surrounds 42 and 44 may be eliminated altogether, with light module 16 incorporating a surround or shroud as part of the module thereby simplifying the installation process.

It should be understood from the forgoing that the present invention provides a non-incandescent light source unit/ module that provides a one-for-one replacement for an incandescent light source in a vehicle accessory, such as a lighted interior mirror assembly or a lighted exterior mirror assembly, including a ground illumination exterior mirror assembly, or an exterior mirror assembly incorporating a signal light, and in other interior lighting applications, such as dome lights, rail lights, reading lights, or vanity lighting in a sun visor. The unit is provided as a single or modular assembly that can be directly and releasably plugged into a socket of an incandescent light source circuit, and be powered thereby. Alternately, the light source unit/module of the present invention can be "plugged" into other circuits that are connected to the vehicle ignition voltage supply. Furthermore, since LEDs do not typically generate the heat associated with incandescent light sources, more sensitive electronics which have either been heretofore relegated to exterior locations of the interior rearview mirror assembly, or to less desirable locations within the mirror assembly may be located at more optimal positions within the mirror casing. Moreover, the mirror casing space proximate to the light source unit may be used to house heat sensitive devices, such as electronics.

Suitable LEDs for the light source unit of the present invention include a white light emitting light emitting diode, such as described in U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Jul. 21, 2000; Ser. No. 60/218,336, filed Jul. 14, 2000; and Ser. No. 60/186,520, filed Mar. 2, 2000, which are herein incorporated by reference in their entireties, and U.S. utility applications, filed Feb. 26, 2001, now U.S. Pat. No. 6,690,268, and Ser. No. 09/585,379, filed Jun. 1, 2000, including a thermostable LED, which emits the same color light even when the temperature varies. Thus, regardless of the interior or exterior temperature of the vehicle and/or of the accessory equipped with the thermostable non-incandescent light emitting diode source, the same color light is radiated. Such a thermostable white light emitting non-incandescent light emitting diode source can incorporate a trio of red, green, and blue fluorescent materials that together create white light when struck by 380 nm wavelength light from a gallium-nitride LED, and is available from Toyoda Gosei Co. and Toshiba Corp of Nagoya, Japan.

One suitable white light emitting diode (LED) that is thermostable is available from Toshiba America Electronic Components, Inc. of Irvine, Calif., Part No.: TLWA1100. The thermostable white-light LED integrates multiple colored phosphors and a short peak wavelength (preferably, approximately 380 nanometers (nm) in peak spectral output intensity) light-emitting diode junction in a phosphor-mixed transparent resin package to achieve a high luminosity, low power consumption light source. Such thermostable LEDs adopt a technological approach differing from that used in conventional LEDs. Light emission in the visible wavelength band is controlled by excited phosphors, not by using temperature changes in the LED to achieve a change in color output. The fact that the LED emission does not directly determine the color brings advantages in overall controllability and wavelength stability. Incorporated in vehicular accessories, such as those disclosed above, the thermostable diode achieves improved tonic reproduction and enhanced color durability during temperature shifts. Such thermostable LEDs utilize a short wavelength light source by reducing the indium in an indium-doped GaN emission layer. This excites red, green, and blue (RGB) phosphors in the transparent resin of the device package to output white light. The RGB balance of the phosphor layer determines the output color, and different colored output can be achieved through modified phosphor balance. The emission light from the LED itself does not directly contribute to the white color. The phosphors used in the new LED offer excellent performance in terms of operating temperature range and color yield. Specifications of such thermostable white LEDs include a compact package (3.2×2.8 millimeter), provided in a Surface Mount Device (SMD). Luminosity is typically about 100 millicandela (mcd) at 20 mA and luminous flux/electrical watt is about 4.5-5.0 lumens per watt at 20 mA. Correlated color temperature is about 6,500-9,000K. Operating temperature is about −40° Celsius-100° Celsius and storage temperature is about −40°-100° Celsius.

Also, high brightness LEDS are available from Uniroyal Technology Corporation of Saratoga, Fla. under the trade name POWER-Ga(I)™ High Brightness InGaN LEDs which comprise high brightness, high luminous efficiency short wavelength LEDs utilizing a power ring n-Contact and a centralized p-Pad design feature. 450 nm and 470 nm high brightness blue LED die products are available that have a minimum power output of 2 milliwatts in die form which, when conventionally packaged, can result in packaged lamp power levels between 4 and 5 milliwatts. Such LEDs combine indium gallium nitride (InGaN) materials on sapphire substrates in order to produce higher efficiencies. GaN LEDs can be produced by MOCVD epitaxy on Sapphire (aluminum oxide) or can be produced on silicon carbide substrates. Ultraviolet light emitting LEDs can be produced, and such can find application in the lighting of the present invention.

Depending on the application, LEDs emitting a colored light can be used, such as high intensity amber and reddish orange light emitting diode sources, such as solid state light emitting diode LED sources utilizing double hydro junction AlGaAs/GaAs Material Technology, such as very high intensity red LED lamps (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue can be used, or a combination of individual different colored diodes, such as red, blue, white, green, amber, orange etc. can be used with color mixing thereof to form a desired color or to deliver a desired local intensity of illumination as noted above. Other suitable white emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, filed Nov. 24, 1999, now U.S. Pat. No. 6,329,925, and in U.S. patent application Ser. No. 09/244,726, filed Feb. 5, 1999, now U.S. Pat. No. 6,172,613, the entire disclosures of which are hereby incorporated by reference herein. A variety of constructions are used including GaAsP on GaP substrate, gallium aluminum phosphide, indium gallium nitride, and GaN on a SiC substrate. Optionally, a plurality of LEDs such as a cluster of two, three, four, six, eight or the like LEDs (each of the same color or the cluster comprising different colored LEDs) can be used to target and illuminate a local area for higher illumination at that area, such as may be useful in a map light or as a reading light or as an interior light or as an illumination source for an interior vehicle cabin-mounted and monitoring camera (most preferably illuminating the target area with white light). Such a cluster of high efficiency LEDs can be mounted at the mirror mount so as to project an intense pattern of light generally downwardly into the vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. Pat. No. 6,152,590, the entire disclosure of which is hereby incorporated by reference herein.

Other suitable LEDs may include high-intensity, high current capability light emitting diodes such as the high-flux power LEDs available from LumiLeds Lighting, U.S., LLC of San Jose, Calif. under the SunPower Series High-Flux LED trade name. Such high-intensity power LEDs comprise a power package allowing high current operation of at least about 100 milliamps forward current, more preferably at least about 250 milliamps forward current, and most preferably at least about 350 milliamps forward current through a single LED. Such high current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high intensity power LEDs are available in blue, green, blue-green, red, amber, yellow and white light emitting forms, as well as other colors. Such high-intensity LEDs can provide a wide-angle radiation pattern, such as an about 30 degree to an about 160 degree cone. Such high-intensity power LEDs, when normally operating, emit a luminous flux of at least about 1 lumen, more preferably at least about 5 lumens and most preferably at least about 10 lumens. For certain applications such as ground illumination from lighted exterior mirror assemblies and interior mirror map lights, such high-intensity power LEDs preferably conduct at least about 250 milliamps forward current when operated at a voltage in the about 2 volts to about 5 volts range, and emit a luminous flux of at least about 10 lumens, more preferably at least about 15 lumens and most preferably at least about 25 lumens, preferably emitting white light. Typically, such high-intensity power LEDs are fabricated using Indium Gallium Nitride technology. However, to maintain the low temperatures associated with lower-intensity LEDs, for example below about 130 degrees Celsius, more preferably below about 100° Celsius, and most preferably below about 70 degrees Celsius, a heat sink can be incorporated into incandescent light source unit 16. Preferably such a heat sink comprises a metal heat dissipater (such as an aluminum metal heat sink) with a surface area dissipating heat of at least about 1 square inch, more preferably of at least about 2.5 square inches, and most preferably of at least about 3.5 square inches. Further details of suitable heat sinks are described below in reference to the embodiments depicted in FIGS. 25-27 and 30-33. When used as, for example, a map/reading light assembly for an interior mirror assembly (such as in the mirror housing or in a pod attaching to the mirror mount to the vehicle), a single high-intensity power LED (for example, a single white light emitting power LED passing about 350 mA and emitting white light with a luminous efficiency of at least about 3 lumens per watt, and with a light pattern of about 120 degrees or so) can be used. As noted above, though not required, such a light source may be combined with a reflector element and a lens to form a high-intensity power LED interior light module capable of directing an intense white light beam of light from the interior mirror assembly to the lap area of a driver or a front-seat passenger in order to allow a reading function, such as a map reading function and/or to provide courtesy or theatre lighting within the vehicle cabin.

In the illustrated embodiment, circuit member 14 comprises a preformed circuit member which is stamped from a metal, such as brass or UNS-C26000 ¾ hard brass having a thickness of about 0.025 inches. Circuit member 14 includes a series of bus strips 15 which extend and distribute electricity to light source holders or connectors formed by electrical contact elements 14a, 14b and 14c, 14d. Alternately, rigid or flexible metallic wire can also be used. For further details of circuit member 14, reference is made to U.S. Pat. No. 6,124,886, which is incorporated by reference in its entirety.

As noted above, mirror assembly 10 may incorporate a wide variety of electronics/electrical devices and or accessories such as disclosed in U.S. patent application Ser. No. 09/449,121, filed Nov. 24, 1999, now U.S. Pat. No. 6,428,172, the entire disclosure of which is hereby incorporated by reference herein. For example, the interior rearview mirror assembly may incorporate accessories that can be docked to the assembly for purpose of storage, battery charging, electrical powering, data input and/or output, and similar functions. Such dockable features are detachable by a user of the vehicle from the mirror assembly and are optionally removable from the vehicle for use outside the vehicle. For example, a dockable feature may comprise a light assembly, such as a flashlight assembly, or may comprise a cellular phone, a phone module, pager, INTERNET connector, or the like. In the case of docking a telecommunication device, such as a phone or a pager, the interior mirror assembly is preferably adapted to connect to the telecommunication device, such as a phone, in a manner such that the vehicle control system will recognize the phone and, optionally, direct incoming phone calls to speakers, which may be located in the mirror assembly or elsewhere in the vehicle. In this manner, the dockable phone may provide removable hands-free phone function. Furthermore, in one form, the phone may automatically be activated by the occupant's voice or a switch or by the docking of the phone onto the mirror assembly. In this manner, the phone may be removed when the occupant exits the car for normal remote use or may be docked for hands-free use.

Preferably, the interior rearview mirror assembly includes a power source, such as a recharger that recharges the battery or batteries in any dockable accessory, which is stored or attached thereto. As previously noted, such dockable accessories can include pagers, cellular phones, flash lights, or the like. In this manner, the dockable accessory can be docked for recharging. In the case of the light assembly, the light assembly can be docked for use as a map reading light or the like. When undocked, the light assembly (which includes internal batteries) may be used as a flashlight, as previously noted.

Alternately, the phone module of a cellular or digital phone may be docked on the interior mirror assembly such that the vehicle system couples the phone module to the speakers and microphones to provide a hands-free phone system. In this manner, the module can be quickly and easily docked and, further, removed for replacement into the phone housing. Furthermore, a hands-free phone system may be coupled to one or more of the video screens incorporated into the interior rearview mirror assembly to form a teleconferencing system, with the video screen displaying images of the one or more of the parties. Optionally, the interior rearview mirror assembly may incorporate a camera so that bi-directional teleconferencing can be achieved. It should be understood, that any one of the microphones, speakers, video cameras, and the video screen may be incorporated into the mirror casing (the movable portion of the mirror assembly), the mounting bracket, a pod mounted to the mounting bracket (the fixed portion of the mirror assembly), or a header. In preferred form, however, as described in reference to the previous embodiments, the video screen or screens are preferably incorporated into the mirror assembly casing. Reference for such video-telephone applications is made to U.S. patent application Ser. No. 08/918,772, filed Aug. 25, 1997, now U.S. Pat. No. 6,124,886, which is commonly assigned, the disclosure of which is herein incorporated by reference in its entirety. For further details of suitable locations of the video screens reference is made to U.S. patent application Ser. No. 09/793,002, filed Feb. 26, 2001, now U.S. Pat. No. 6,690,268.

In addition, when either the phone or phone module is docked, as cell phone calls become traceable through a global positioning system (GPS), emergency phone calls may be forwarded or routed to the correct emergency agency for that location. Since each phone has a unique identifier, GPS can identify a phone and, further, identify the location of that phone. For example, the phone or mirror assembly may include a separate emergency button which can be activated by an occupant of the vehicle to notify local emergency agencies that an occupant of the vehicle is in need for emergency assistance. For example, tracing of the phone may be incorporated into or used in conjunction with a vehicle navigation system, such as described in U.S. provisional application Ser. No. 60/131,593, filed Apr. 29, 1999, which is herein incorporated by reference in its entirety. Where the vehicle is equipped with a GPS system, the GPS system can monitor the movement of the vehicle, and by knowing that the vehicle has moved from one location to another, and because the GPS knows the geographic position of both locations relative to each other, the navigation system can determine the directional heading of the vehicle, and furnish this as a compass heading signal for display as a compass display such as at the interior mirror assembly.

A variety of electrical and electronic features can be incorporated into the interior rearview mirror assembly (or into an accessory module assembly, such as a windshield electronics module assembly), such as those disclosed in U.S. patent application Ser. No. 09/433,467, filed Nov. 4, 1999, now U.S. Pat. No. 6,326,613, commonly assigned, which is herein incorporated by reference in its entirety. For example, a microphone or a plurality of microphones may be incorporated, preferably to provide hands-free input to a wireless telecommunication system such as the ONSTAR® system in use in General Motors vehicles. Most preferably such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein. Microphones, sound processing systems, and other accessories suitable to use in the mirror systems of the present invention are disclosed in co-assigned U.S. patent application Ser. No. 09/466,010, filed Dec. 17, 1999, now U.S. Pat. No. 6,420,975; Ser. No. 09/396,179, filed Sep. 14, 1999, now U.S. Pat. No. 6,278,377; Ser. No. 09/382,720, filed Aug. 25, 1999, now U.S. Pat. No. 6,243,003; Ser. No. 09/449,121, filed Nov. 24, 1999, now U.S. Pat. No. 6,428,172; Ser. No. 09/433,467, filed Nov. 4, 1999, now U.S. Pat. No. 6,326,613; and Ser. No. 09/448,700, filed Nov. 24, 1999, now U.S. Pat. No. 6,329,925, the entire disclosures of all of which are hereby incorporated by reference herein.

In this regard it may be desirable to use audio processing techniques such as digital sound processing, to ensure that vocal inputs to the vehicular audio system are clearly distinguished from cabin ambient noise, such as from wind noise, HVAC, and the like. Also, noise cancellation techniques, such as destructive interference, can advantageously be used whereby the signal as picked up by the microphone is processed, the human vocal signal is distinguished from the noise signal, and whereby the noise signal is fed back 180 degrees out of phase with itself in order to cancel out the noise by destructive interference and so enhance the vocal signal to background noise ratio.

Preferably the microphone interfaces to an audio system that includes an analog to digital converter and/or a digital to analog converter for the purpose of converting the analog output of the microphone to a digital signal for input to a digital sound processor and for conversion of the digital output of a digital sound processor to an analog signal for wireless transmission to a remote transceiver. Digital sound processing techniques may be used to enhance the vocal signal to background noise discrimination ratio. Also, both analog and digital audio filtering techniques can be used to enhance the vocal to background noise ratio, and so assist clarity of transmission and/or receipt at a remote receiver and so improve accuracy in voice recognition mode. Also, physical techniques such as sound insulation, acoustic wave guides, angling of microphones to selectively detect speech versus background noise, and/or use of a directed microphone directed to a potential human speaker in conjunction with a more omnidirectional microphone intended to detect background noise can be used. An adaptive signal processing system can be used to enhance vocal to noise ratio. Mechanical cancellation of ambient noise can be provided, as can a noise canceling pressure gradient microphone, preferably in conjunction with acoustic ports including voice and noise ports. Such a system is disclosed in World Pat. Publication WO 9817046 to D. Andrea of Apr. 23, 1998, the disclosure of which is hereby incorporated by reference in its entirety.

For example, mirror assembly 10 may include circuitry for mirror mounted video cameras, which are used to visually detect the presence of moisture on the windshield and actuate windshield wipers accordingly, such as described in U.S. patent application Ser. No. 08/621,863, filed Mar. 25, 1996, now U.S. Pat. No. 5,796,094, or mirror mounted cameras for vehicle internal cabin monitoring disclosed in U.S. Pat. Nos. 5,877,897 and 5,760,962, both commonly assigned, which are hereby incorporated herein by reference in their entireties, or mirror mounted cameras for rear vision systems as disclosed in U.S. Pat. Nos. 5,959,367; 5,929,786; 5,949,331; 5,914,815; 5,786,772; 5,798,575; 5,670,935; and U.S. patent application Ser. No. 09/304,201, filed May 3, 1999, now U.S. Pat. No. 6,198,409; Ser. No. 09/375,315, filed Aug. 16, 1999, now U.S. Pat. No. 6,175,164; Ser. No. 09/199,907 filed Nov. 25, 1998, now U.S. Pat. No. 6,717,610; Ser. No. 09/361,814, filed Jul. 27, 1999, now U.S. Pat. No. 6,201,642; Ser. No. 09/372,915, filed Aug. 12, 1999, now U.S. Pat. No. 6,396,397; Ser. No. 09/300,201, filed May 3, 1999; and Ser. No. 09/313,139, filed May 17, 1999, now U.S. Pat. No. 6,222,447, which are all commonly assigned, the disclosures of which are herein incorporated by reference in their entireties. Additional features and accessories that may be incorporated into the mirror assembly include: A trip computer, an intrusion detector, displays indicating, for example passenger air bag status, including information displays such as a PSIR (Passenger Side Inflatable Restraint) display, an SIR (Side-Airbag Inflatable Restraint), compass/temperature display, a tire pressure status display or other desirable displays and the like, such as those described in U.S. patent application Ser. No. 09/244,726, filed Feb. 5, 1999, now U.S. Pat. No. 6,172,613, the disclosure of which is hereby incorporated by reference herein. For example, rearview mirror assembly 10 (or an accessory module assembly such as a windshield electronics module assembly), may include: antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. application Ser.

No. 09/244,726, filed Feb. 5, 1999, now U.S. Pat. No. 6,172,613; blind spot detection systems, such as disclosed in U.S. Pat. No. 5,929,786 or U.S. Pat. No. 5,786,772; transmitters and/or receivers, such as garage door openers, a digital network, such as described in U.S. Pat. No. 5,798, 575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433,467, now U.S. Pat. No. 6,326,613; a remote keyless entry receiver; microphones and/or speakers, such as disclosed in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610; a compass, such as disclosed in U.S. Pat. No. 5,924,212; seat occupancy detector; a trip computer; an ONSTAR® System or the like, with all of the referenced patents and applications being commonly assigned, the disclosures of which are herein incorporated by reference in their entireties.

Interior rearview mirror assembly 10 may also include a compass/temperature and a clock display, fuel level display, and other vehicle status and other information displays. The interior rearview mirror assembly may also include a compass/temperature and a clock display, fuel level display, and other vehicle status and other information displays. Furthermore, information displays may be incorporated which provide information to the driver or occupants of the vehicle, such as warnings relating to the status of the passenger airbag. In commonly assigned application Ser. No. 09/244,726, filed by Jonathan E. DeLine and Niall R. Lynam, on Feb. 5, 1999, now U.S. Pat. No. 6,172,613, information displays are provided which include information relating to a vehicle or engine status, warning information, and the like such as information relating to oil pressure, fuel remaining, time, temperature, compass headings for vehicle direction, and the like, the disclosure of which is incorporated herein by reference in its entirety. The passenger side air bag on/off signal may be derived from various types of seat occupancy detectors such as by video surveillance of the passenger seat as disclosed in commonly assigned PCT Pat. Application No. PCT/US94/01954, filed Feb. 25, 1994, published Sep. 1, 2004 as PCT Publication No. WO/1994/019212, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user-operated switch operated with the ignition key of the vehicle in which the mirror assembly is mounted as described in commonly assigned U.S. patent application Ser. No. 08/799,734, filed Feb. 12, 1997, now U.S. Pat. No. 5,786,772, the disclosure of which is incorporated by reference herein in its entirety. In addition, the interior rearview mirror assemblies may include electronic and electric devices, including a blind spot detection system, such as the type disclosed in U.S. patent application Ser. No. 08/799,734, filed Feb. 12, 1997, now U.S. Pat. No. 5,786,772, or rain sensor systems, for example rain sensor systems which include windshield contacting rain sensors such as described in U.S. Pat. No. 4,973,844 or non-windshield contacting rain sensors, such as described in PCT International Application PCT/US94/05093, published as WO 94/27262 on Nov. 24, 1994, the disclosures of which are hereby incorporated by reference herein in their entireties.

In addition, the mirror assembly (or an accessory module assembly such as a windshield electronics module assembly) may incorporate one or more video screens or video display assemblies, such as disclosed in U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 29, 2000; Ser. No. 60/234,412, filed Sep. 21, 2000; Ser. No. 60/218,336, filed Jul. 14, 2000; and Ser. No. 60/186,520, filed Mar. 2, 2000, all commonly assigned, the entire disclosures of which are herein incorporated by reference in their entireties.

The video screen may be used for a baby minder system, such as the vehicle interior monitoring system described in U.S. Pat. Nos. 5,877,897 and 5,760,962 or the rear vision system described in U.S. patent application Ser. No. 09/361,814, filed Jul. 27, 1999, now U.S. Pat. No. 6,201,642, and Ser. No. 09/199,907 filed Nov. 25, 1998, now U.S. Pat. No. 6,717,610, and U.S. patent application Ser. No. 09/433,467, filed Nov. 4, 1999, now U.S. Pat. No. 6,326,613, all of which are incorporated by reference in their entireties herein. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger, such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources (both organic and inorganic), and the like, and most preferably such non-incandescent sources are low power and are directed low intensity sources, such as described in U.S. Pat. No. 5,938,321 and application Ser. No. 09/287,926, filed Apr. 7, 1999, now U.S. Pat. No. 6,139,172, which are incorporated herein by reference in their entireties. The baby minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source, such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status. Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, filed Jul. 27, 1999, now U.S. Pat. No. 6,201,642, and in U.S. patent application Ser. No. 09/199,907, filed Nov. 25, 1998, now U.S. Pat. No. 6,717,610, and in U.S. patent application Ser. No. 09/313,139, filed May 17, 1999, now U.S. Pat. No. 6,222,447, the disclosures of which are hereby incorporated by reference herein. For example, when the driver selects a reverse gear, a view of the back-seat of the vehicle is automatically replaced with a view rearward of the vehicle provided by the rearward-facing reverse-aid camera (typically mounted at the vehicle rear license plate area or the like) and when reverse gear is disengaged, the view of the back-seat is once again displayed at the display screen visible to the driver in the interior cabin of the vehicle (such as at, on, or in the interior rearview mirror assembly). Also, when a baby is small, a rear-facing child seat is preferred (i.e. the child faces the rear of the vehicle cabin) whereas as the child grows, a forward-facing child seat is preferred. In order to cater for forward-facing child seats versus rearward-facing child seats, two cameras can be mounted such as in the roof area of the vehicle. One forward viewing camera (i.e. viewing forward of the vehicle relative to the direction of forward motion of the vehicle) can be mounted at a roof location (such as above the vehicle rear window) to view a baby seated in a rear-facing baby seat and a second rearward viewing camera (i.e. viewing rearward of the vehicle relative to the direction of forward motion of the vehicle) can be mounted at a roof location (such as above the vehicle front windshield or as part of the interior mirror assembly) to view a child seated in a forward-facing baby seat. A switch can be provided to allow the driver to choose to use any one of the forward viewing camera and the rearward viewing camera. Optionally and preferably from a cost viewpoint, a single camera module can be provided that can connect to and/or dock into two or more spaced and separate camera module receiving stations. One (i.e. a first) camera module receiving station can be high-mounted at a forward location in the vehicle cabin (such as in a header console above and adjacent the front windshield or in the headliner above and adjacent the front windshield or as part of the interior rearview mirror assembly) and a second camera module receiving station can be located at a rearward location in the vehicle cabin (such as above and adjacent to the rear window, or at a position in the headliner of the vehicle that is located above and rearward of the rear seat, or as part of a dome lamp or other interior lighting assembly, preferably a lighting assembly comprising a plurality of light emitting diodes, and most preferably a lighting assembly comprising a plurality of light emitting diodes comprising at least one white light emitting diode) that is spaced and separate from the location of the first camera receiving station. A single camera module can be provided that plugs into, and electrically/electronically connects to, any one of the two camera receiving stations provided. When the camera module is plugged into the first camera receiving station, the camera field of view is directed rearwardly in the vehicle cabin to monitor a back seat area and thus monitor a child strapped in a forwardly-facing child seat and the like. The camera receiving station provides power to the camera and receives video signals generated by the camera. If, however, a rearward-facing baby seat was mounted on the rear seat, the driver can unplug the camera module from the first camera receiving station and plug it into the second camera receiving station. When plugged into the second camera receiving station, the camera lens faces forwardly in the cabin and its field of view is directed to capture and hence display the rearward-facing baby strapped in the rearwardly-facing baby (or child) seat. Optionally, a plurality of camera receiving stations (such as three or four or more) can be provided to allow a single camera be mounted at a plurality of locations in a vehicle cabin with its field of view selected to be directed to a specific portion of the vehicle cabin by plugging the camera module into a specific one of the available plurality of camera receiving stations. This allows a "plug and view" capability for the vehicle user. As an alternate, or as a supplement, to a plurality of camera receiving stations, a camera can be movably mounted on a rail that also functions as a power strip that is affixed to an interior vehicular cabin structure such as a headliner of the vehicle or to a window of a vehicle (such as is disclosed in U.S. patent application Ser. No. 08/895,729, filed Jul. 17, 1997, now U.S. Pat. No. 6,019,411, the entire disclosure of which is hereby incorporated by reference herein). Thus, for example, a camera can move along a channel in a rail attached to a vehicle cabin roof headliner. When stopped at a particular position along the rail, the camera module can receive power input from, and deliver signal output to, the rail such as via conductive brush connectors, such as carbon brushes. Alternately, the camera module can transmit video image data wirelessly within the cabin, such as by infrared or by radio-frequency transmission (such as part of a short range, local RF broadcast network operating under a BLUETOOTH protocol available from Motorola of Schaumberg Ill., or via the IEEE 802.11a wireless local area network standard that preferably uses a 5

Gigahertz frequency band and with a data transfer rate of at least about 10 Mb/sec and more preferably at least about 30 Mb/sec), to a cabin-mounted receiver (or externally of the vehicle to a remote receiver such as might be used in a cabin security monitoring camera-based system that, for example, monitors the interior vehicle cabin while the vehicle is parked in order to detect intrusion by an unauthorized party). Optionally, the camera module mounted in the vehicle cabin is detachably mounted so that it can be removed from the vehicle both as an anti-theft device and in order to allow the camera to be used outside the vehicle such as in a child's crib in a home. In this regard, a video camera (such as the detachable vehicle camera module) can be mounted at a distance from the vehicle such as in the like of a child's bedroom in a house to monitor, for example, a child sleeping in a crib, and its video image can be wirelessly transmitted (such as by radio-frequency transmission) or transmitted via a wireless INTERNET linkage to the vehicle so the driver and/or other occupants of the vehicle can view the video image of the child in the crib at home on a vehicular video screen, preferably on a screen mounted at, on or in the interior mirror assembly, while the vehicle is located and operating at a distance from the location of the home where the camera generating the video image is located. Also, the camera used in the applications described above and below can be an autofocusing and/or autoexposure camera using an autofocusing lens system and/or an autoexposure system (such as via an automatically adjustable iris system). Also, optionally, the field of view of the lens of the camera can be adjusted to view a multitude of locations in the vehicle cabin such as by a joystick-control or the like.

Note that a driver may not want to continually view a baby or infant or child being monitored by the baby camera system of the present invention. Thus, optionally, the image of the baby/infant/child, as displayed by a video display of this present invention, can deactivate after a determined time interval (for example, after about 1 minute of display) and be reactivated by the driver actuating an input button/stalk/ touch screen and/or issuing a voice command. Also, optionally, the baby camera only actuates when the baby seat belt is clasped (as otherwise monitoring an empty seat may be distracting and wasteful). Alternately, the baby minder system may automatically display an image of the baby seat whenever the baby seat clasp in not clasped or if the baby seat itself is improperly installed to provide an alert to the driver that an unsafe condition may exist (such as may exist should a child unclasp a baby seat safety belt while the vehicle is in motion).

Light emitting sources, such as light emitting diodes, can be used to provide lighting for any camera that feeds an image to the mirror-mounted video screen (or feeds an image to an accessory module assembly such as a windshield electronics module assembly). Light emitting diodes can be used to provide illumination in various colors, such as white, amber, yellow, green, orange red, blue, or their combination, or the like, may be used. Alternately, other light emitting elements can be used to provide illumination for any camera that feeds an image to the mirror-mounted video screen, such as incandescent sources, fluorescent sources, including cold-cathode fluorescent sources, electroluminescent sources (both organic and inorganic), such as described in U.S. Pat. No. 5,938,321, and application Ser. No. 09/287,926, filed Apr. 7, 1999, now U.S. Pat. No. 6,139,172, which are incorporated herein by reference in their entireties, and in such as is disclosed in co-assigned U.S. patent application Ser. No. 09/466,010, filed Dec. 17, 1999, now U.S. Pat. No. 6,420,975, the entire disclosure of which is hereby incorporated by reference herein, and in co-assigned U.S. patent application Ser. No. 09/449,121, filed Nov. 24, 1999, now U.S. Pat. No. 6,428,172, and U.S. patent application Ser. No. 09/585,379, filed Jun. 1, 2000, the entire disclosures of which are hereby incorporated by reference herein.

The mirror-mounted video screen can display the output from a rear vision back-up camera, such as disclosed in application Ser. No. 09/199,907, filed Nov. 25, 1998, now U.S. Pat. No. 6,717,610, and Ser. No. 09/361,814, filed Jul. 27, 1999, now U.S. Pat. No. 6,201,642, commonly assigned, the disclosures of which are herein incorporated by reference in their entireties, along with vehicle instrument status, such as a vehicle information display, such as information relating to fuel gauge levels, speed, climate control setting, GPS directional instructions, tire pressure status, instrument and vehicle function status, and the like.

Also, and especially for a mirror assembly incorporating a video screen that is incorporated as part of an interior electro-optic (such as electrochromic) mirror assembly, a common circuit board and/or common electronic components and sub-circuitry can be utilized to control the electro-optic activity of the reflective element and to control the image displayed by the video screen, thus achieving economy of design and function, and for operating other electrical or electronic functions supported in the interior rearview assembly. For example, a circuit board of the interior mirror assembly may support, for example, light emitting diodes (LEDs) for illuminating indicia on display elements provided on a chin or eyebrow portion of the bezel region of the interior mirror casing. Reference is made to U.S. Pat. Nos. 5,671,996 and 5,820,245, the disclosures of which are herein incorporated by reference in their entireties. It should be understood that one or more of these buttons or displays may be located elsewhere on the mirror assembly or separately in a module, for example of the type disclosed in U.S. patent application Ser. No. 09/244,726, now U.S. Pat. No. 6,172,613, and may comprise the touch-sensitive displays as disclosed in U.S. Pat. Application Ser. No. 60/192,721, filed Mar. 27, 2000, the disclosures of which are herein incorporated by reference in their entireties. Note that button inputs can be provided along the lower bezel region of the interior mirror assembly such that, when actuated, a display appears within the mirror reflector region of the mirror reflective element. Preferably, the display appears local to the physical location of the particular button accessed by the driver or vehicle occupant (typically, immediately above it) so that the person accessing the mirror associates the appearance and information of the display called up by that individual button with the user's actuation of the button. Multiple actuations of that button can cause the display to scroll through various menu items/data displays, allowing the user to access a wide range of information. The button and associated circuitry can be adapted to recognize when a particular menu item is desired selected (such as holding down a particular input button for longer than a prescribed period, for example longer than about 1 second or longer than about 2 seconds or the like; if the button is held down for less than the prescribed period, the display scrolls to the next menu item). Preferably, whatever information is being displayed is displayed by a substantially reflecting and substantially transmitting reflective/ transmissive reflector of the mirror reflective element such as the display on demand constructions disclosed in U.S. Pat. No. 5,724,187, the entire disclosure of which is hereby incorporated by reference. Also, these features can be provided for any non-mirror video display of the present invention.

Optionally, one or more of the cameras of the vehicle may be equipped with infrared LED light emitting sources, such as are disclosed in U.S. patent application Ser. No. 09/025,712, filed Feb. 18, 1998, now U.S. Pat. No. 6,087,953, and U.S. patent application Ser. No. 09/244,726, filed Feb. 5, 1999, now U.S. Pat. No. 6,172,613, and in U.S. patent application Ser. No. 09/561,023, filed Apr. 28, 2000, now U.S. Pat. No. 6,553,308, and in U.S. patent application Ser. No. 09/466,010, filed Dec. 17, 1999, now U.S. Pat. No. 6,420,975, which are all incorporated by reference herein in their entireties, in order to light up an area in or around the vehicle when it is dark. When an intrusion detector such as a motion detector (preferably a pyrodetector-based intrusion detection system such as is disclosed in commonly assigned U.S. patent application Ser. No. 08/901,929, filed Jul. 29, 1997, now U.S. Pat. No. 6,166,625, and commonly assigned U.S. patent application Ser. No. 09/516,831, filed Mar. 1, 2000, now U.S. Pat. No. 6,390,529, and U.S. patent application Ser. No. 09/275,565, filed Mar. 24, 1999, now U.S. Pat. No. 6,086,131, the disclosures of which are herein incorporated by reference in their entireties) is triggered by, for example, someone attempting to break into the vehicle or steal the vehicle, the vehicle-based security system triggers images captured by the vehicular camera(s) to be downloaded to the telemetry system which then forwards by wireless telecommunication (such as by radio frequency or by microwave transmission) the images (or a security alert signal derived from an in-vehicle image analysis of the captured images) to a security service, a mobile device in the possession of the driver of the vehicle when he/she is remote from the parked vehicle (such as a key-fob or a Palm Pilot™ PDA), the cell phone of the vehicle owner, the home computer of the vehicle owner or the police or the like that is remote and distant from the vehicle where the security condition is being detected. Preferably, the in-vehicle camera-based security system silently and secretly records the events occurring in and/or around the vehicle while it is operating (such as when idling in traffic or moving on a highway or stopped at a traffic light) and provides a "black box" recording of activities in the interior of the vehicle or exterior of the vehicle. For example, the security system may be used to record or document vehicle status including speed, brake activation, vehicle control status signals (for example, whether the turn signal has been actuated, vehicle traction, tire pressures, yaw and roll, geographic location, time and date) and other vehicle information as well as record visual images detected by the cameras. In an accident, such vehicle performance/function data in combination with a visual recording of the interior and/or exterior vehicular scene (and optionally, a microphone recording of sounds/voices interior and/or exterior to the vehicle) can help insurance and police investigators establish the causes and conditions of an accident. The camera-based vehicle performance/function recording system of the vehicle preferably records data onto a recording medium (such as onto electronic memory or onto digital recording tape) that is rugged and protected from the consequences of an accident so as to survive the impact forces, shocks, fires and other events possible in an automobile accident. Preferably, any electronic memory utilized is non-volatile memory that is non-erasing in the event of electrical power loss in the vehicle. For example, the camera-based in-vehicle security system may include an electronic memory recording medium and/or a video tape (preferably a digital) recording medium so that a pre-determined period of operation of the vehicle, such as up to the last about 1 minute of vehicle operation, more preferably up to the last about 5 minutes of vehicle operation, most preferably up to the last about 15 minutes of vehicle operation, or even greater, is continuously recorded (such as on a closed-loop tape or electronic recording that continually records the most recent events inside and/or outside the road transportation vehicle). The camera-based in-vehicle security system can maintain the stored images and/or vehicle data in the vehicle for downloading when desired such as after an accident. Alternately, the camera-based in-vehicle security system can transmit the images and/or vehicle data by wireless communication to a remote receiver such as a receiver distant and remote from the vehicle (such as at a security system or a telematic service such as ONSTAR® or RESCU™ or at the vehicle owners home or at a car rental center). This can occur continuously while the vehicle is being operated, so that in the event an accident occurs, retrieval and analysis of the recorded information is not impeded such as by damage or even loss of the vehicle in the accident. Also, the remote receiver of the information can alert authorities (such as a police, fire and/or ambulance service) of an accident immediately when such accident occurs (and thus potentially speed aid to any accident victims and/or dispatch the correct medical aid for the type of accident/injuries recorded by the camera(s)). The recorded information can include the gear in which the driver is operating the vehicle, the activation of the brakes, the speed at which the driver is traveling, the rate of acceleration/deceleration, the time, date and geographic location, the atmospheric conditions including lighting conditions—basically, the system can record what happened during a collision whereby the system provides an information recordation function. For example, when the system is used to record an accident when the vehicle is operating, the cameras may record scenes, vehicle instrument/function status, or the like which are kept on a tape or non-volatile electronic, solid-state memory, for example a continuous loop tape or electronic memory. Alternately, this information can be continuously transmitted or downloaded. For example, the information can be downloaded in response to a selected stimuli or trigger, such as when the brakes are activated, the air bag or bags are activated, when the horn is operated, or when the car de-accelerates, or the like. For example, the system may use accelerometers such as disclosed in U.S. patent application Ser. No. 09/440,497, filed Nov. 15, 1999, now U.S. Pat. No. 6,411,204, and, furthermore, may be combined with the deceleration based anti-collision safety light control system described in the aforementioned application, the disclosure of which is incorporated by reference in its entirety herein. This information recordation function can be used, as noted above, to record both interior activities and exterior activities and, therefore, can be used as noted above as a security system as well. When the system is used as a security system, the telemetry system may contact the security base who in turn can scroll through the camera images to determine whether the alarm is a true or false alarm. In this manner, various existing systems that are provided in the vehicle may be optionally used individually to provide one or more functions or collectively to provide even further or enhanced functions.

Examples of camera locations where vehicular cameras included in a vehicular camera-based accident recording system can be located include interior and exterior mirror assembly locations, roof areas such as a headliner or header console, front, side and rear exterior body areas such as front grilles, rear doors/trunk areas, side doors, side panels, door handles, CHMSL units, interior body pillars (such as an A-, B- or C-interior pillar) and seat backs, and such as are disclosed in commonly assigned U.S. Provisional Applications, Ser. No. 60/187,961, filed Mar. 9, 2000; Ser. No. 60/192,721, filed Mar. 27, 2000; and Ser. No. 60/186,520, filed Mar. 1, 2000; and in U.S. Pat. Nos. 5,877,897; 5,760,962; 5,959,367; 5,929,786; 5,949,331; 5,914,815; 5,786,772; 5,798,575 and 5,670,935; and U.S. patent application Ser. No. 09/304,201, filed May 3, 1999, now U.S. Pat. No. 6,124,886; Ser. No. 09/375,315, filed Aug. 16, 1999, now U.S. Pat. No. 6,175,164; Ser. No. 09/199,907, filed Nov. 25, 1998, now U.S. Pat. No. 6,717,610; Ser. No. 09/361,814, filed Jul. 27, 1999, now U.S. Pat. No. 6,201,642; Ser. No. 09/372,915, filed Aug. 12, 1999, now U.S. Pat. No. 6,396,397; Ser. No. 09/304,201, filed May 3, 1999, now U.S. Pat. No. 6,198,409; and Ser. No. 09/313,139, filed May 17, 1999, now U.S. Pat. No. 6,222,447, which are all commonly assigned, the disclosures of which are herein incorporated by reference in their entireties. For example, a camera, preferably a solid-state CMOS video camera, can be located within the interior cabin of the vehicle (and preferably located at, on or within the interior rearview mirror assembly or at or in an A-pillar), and adapted to capture a surveillance image of the front and rear occupants of the vehicle. In this regard, locating the interior cabin surveillance camera at, on or within the interior rearview mirror assembly is preferred as this location provides the camera with a good rearward field of view that captures an image of all front and rear seat occupants. Preferably, the vehicle is also equipped with the in-vehicle portion of a wireless communication telematic system such as an ONSTAR® or RESCU™ system, and the geographic location of the vehicle can also be established by a navigational system, such as an in-vehicle GPS system. Images of the interior vehicle cabin (including images of the various vehicle occupants) can be captured by the in-vehicle image capture device, preferably an interior mirror-mounted video camera, and this information, in conjunction with the geographic location of the vehicle provided by a position locator such as a GPS system, along with various vehicle information/function data such as the state of activation of any air bag in the vehicle, can be communicated by wireless telecommunication to an external service remote from the vehicle such as an ONSTAR® or RESCU™ service. Such communication can be periodic (such as when the ignition is first turned on during a particular trip, or initially when the ignition is first turned on and intermittently thereafter, such as every about 1 minute or so) or continuous during operation of the vehicle with its engine turned on. Should the receiver at the remote service be alerted that an accident has occurred (such as by receiving from the vehicle via wireless telematic communication an accident alert signal indicative that an air bag has activated), the remote receiver (which can be an ONSTAR® operator or an automatic computer-based image analyzer or an emergency service such as a "911" service provider) can count, via the video imaged relayed from the vehicle, the number of occupants in the vehicle and can accordingly alert emergency services as to the location of the accident and the number of victims involved (thus ensuring that the appropriate number of, for example, ambulances are dispatched to deal with the actual number of potential victims in the vehicle at the time of the crash). Optionally, the owner/driver of the vehicle can register/notify the remote telematic service of any special medical needs, blood types and the likes of the likely driver(s) and/or likely occupants (such as family members) along with any next-of-kin information, insurance coverage and the like so that, in the event the like of an ONSTAR® or RESCU™ telematic service or telematically-linked "911" emergency response service determines an accident has occurred, medical and emergency relief specific to the likely/actual occupants of the vehicle can be dispatched. Likewise, should an in-vehicle fire be detected such as by visual determination via image analysis of video images telematically transmitted and/or by an in-vehicle temperature probe transmitting data telematically, then the fire brigade can be automatically sent to the crash site and/or an in-vehicle fire extinguisher can be activated to put out any fire (either by remote, wireless activation by the telematic service of the in-vehicle fire extinguisher or by automatic in-vehicle image analysis of the image recorded by an interior or exterior camera of the vehicle that, upon in-vehicle image analysis determining that a fire has occurred in the vehicle, causes a vehicular on-board fire extinguisher to actuate to put out the fire). Also, either remotely or via in-vehicle image analysis, the engine of the vehicle can be turned off after an accident has been detected via the vehicular camera system, A variety of other electrical and electronic features can be incorporated into the assemblies of the present invention, such as those disclosed in U.S. patent application Ser. No. 09/433,467, filed Nov. 4, 1999, now U.S. Pat. No. 6,326,613, commonly assigned, which is herein incorporated by reference in its entirety. For example, a microphone or a plurality of microphones may be incorporated, preferably to provide hands-free input to a wireless telecommunication system such as the ONSTAR® system in use in General Motors vehicles. Most preferably, such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003, the disclosure of which is hereby incorporated by reference herein.

In this regard it may be desirable to use audio processing techniques, such as digital sound processing, to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865 (the disclosure of which incorporated by reference herein), are particularly useful to enhance clarity of vocal signal detection when a single microphone is used, located in the interior mirror assembly such as in the mirror casing that houses the interior mirror reflective element, as part of a vehicular wireless communication system such as General Motors' ONSTAR® system. Use of digital signal processing and a single mirror-mounted microphone (such as is described in U.S. patent application Ser. No. 09/396,179, filed Sep. 14, 1999, now U.S. Pat. No. 6,278,377, the disclosure of which is incorporated by reference herein) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region or in an accessory module assembly such as a windshield electronics module assembly), digital sound processing is also beneficial when multiple microphones are used, and preferably when at least two and more preferably at least four microphones are used.

As previously described, connection and communication between the video displays and/or the cameras and/or other electronic accessories of the present invention can be by wired connection (including multi-element cables, wired multiplex links and fiber-optic cables) and/or by wireless connection/communication (such as by infrared communication and/or by radio frequency communication such as via BLUETOOTH, described below).

For example, any of the video displays of the present invention may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and, more preferably, a reconfigurable display) can be provided within the vehicle cabin, and preferably displayed by a video display of the present invention, and readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle are wired together. Thus, for example, an interior electrochromic mirror and an exterior electrochromic mirror is connected by at least one wire in order to transmit control signal and the like. With BLUETOOTH and similar systems such as the IEEE 802.11a protocol which is a wireless local area network standard that preferably uses a 5 Gigahertz frequency band and with a data transfer rate of at least about 10 Mb/sec and more preferably at least about 30 Mb/sec, control commands can be broadcast between the interior mirror and the exterior mirror (and vice versa) or between a camera capturing an image in a horse box (or any other towed trailer) being towed by a vehicle and a video display located at the windshield or at the interior rearview mirror or at or adjacent to an A-pillar of that vehicle that is viewable by the vehicle driver without the need for physical wiring interconnecting the two. Likewise, for example, the two exterior mirror assemblies on the vehicle can exchange, transmit and/or receive control commands/signals (such as of memory position or the like such as is described in U.S. Pat. No. 5,798,575, the disclosure of which is hereby incorporated by reference herein) via an in-vehicle short-range radio local network such as BLUETOOTH. Similarly, tire pressure sensors in the wheels can transmit via BLUETOOTH to a receiver in the interior mirror assembly, and tire pressure status (such as described in U.S. patent application Ser. No. 09/513,941, filed Feb. 28, 2000, now U.S. Pat. No. 6,294, 989, which is incorporated by reference herein in its entirety) can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the mirror case, such as in the mirror reflector itself, or such as in a pod attached to the interior mirror assembly), or can be displayed on any video display of the present invention. More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like) and thereby provide a vehicle speed control function. Thus, for example, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior mirror assembly or on any video display of the present invention, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview mirror assembly (or the exterior side view mirror assembly) or any video display of the present invention. Also, the interior rearview mirror and/or the exterior side view mirrors and/or any video display of the present invention can function as transceivers/display locations/interface locations for intelligent vehicle highway systems, using protocols such as the BLUETOOTH protocol. Protocols such as BLUETOOTH and the IEEE 802.11a wireless local area network standard that preferably uses a 5 Gigahertz frequency band and with a data transfer rate of at least about 10 Mb/sec and more preferably at least about 30 Mb/sec, as known in the telecommunications art, can facilitate voice/ data, voice over data, digital and analog communication and vehicle/external wireless connectivity, preferably using the interior and/or exterior mirror assemblies as transceiver/ display/user-interaction sites. Electronic accessories to achieve the above can be accommodated in any of the video displays/video mirrors/camera assemblies of the present invention, and/or in the interior mirror assembly (such as in the housing disclosed in U.S. patent application Ser. No. 09/433,467, filed Nov. 4, 1999, now U.S. Pat. No. 6,326, 613.

Furthermore, information displays may be incorporated which provide information to the driver or occupants of the vehicle, such as warnings relating to the status of the passenger airbag or a train approaching warning. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. One suitable train control system is described in U.S. patent application Ser. No. 09/561,023, filed Apr. 28, 2000, now U.S. Pat. No. 6,553,308, the entire disclosure of which is incorporated by reference herein in its entirety. Vehicle to road-side communication antennas can be attached to railroad signs, crossing barriers, and the like and can transmit to antennas mounted in the vehicle located such as within the interior rearview mirror of the vehicle or within an interior cabin trim item or side exterior rearview mirror assembly. One such track side communication system is available from Dynamic Vehicle Safety Systems of Amarillo, Tex., which detects signals from trains approaching a crossing and transmits these signals along the road to forewarn of a railroad crossing ahead.

In commonly assigned application Ser. No. 09/244,726, filed on Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like, the disclosure of which is incorporated herein by reference in its entirety. The passenger side air bag on/off signal may be derived from various types of seat occupancy detectors such as by video surveillance of the passenger seat as disclosed in commonly assigned PCT Pat. Application No. PCT/US94/01954, filed Feb. 25, 1994, published Sep. 1, 2004 as PCT Publication No. WO/1994/019212, the disclosure of which is hereby incorporated by reference, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which assembly 10 is mounted as described in commonly assigned U.S. patent application Ser. No. 08/799,734, filed Feb. 12, 1997, now U.S. Pat. No. 5,786,772, the disclosure of which is incorporated by reference herein in its entirety.

In addition, the interior rearview mirror assembly may include a blind spot detection system, such as the type disclosed in U.S. patent application Ser. No. 08/799,734, filed Feb. 12, 1997, now U.S. Pat. No. 5,786,772, or rain sensor systems, for example rain sensor systems which include windshield contacting rain sensors, such as described in U.S. Pat. No. 4,973,844 or non-windshield contacting rain sensors, such as described in PCT International Application PCT/US94/05093, published as WO 94/27262 on Nov. 24, 1994, the disclosures of which are hereby incorporated by reference herein in their entireties.

The interior rearview mirror assembly may also incorporate one or more user actuatable buttons or the like for activating the various accessories housed in the assembly, for example an ONSTAR® system, HOMELINK® system, a remote transaction system, or the like. For example, one or more user actuatable buttons may be mounted at the chin area or eyebrow area for actuating, for example a video screen, or for selecting or scrolling between displays or for activating, for example, a light, including a map light which may be incorporated into the mirror casing. Furthermore, a dimming switch may be incorporated into the casing to provide adjustment to the brightness of the video screen.

Figure 9:
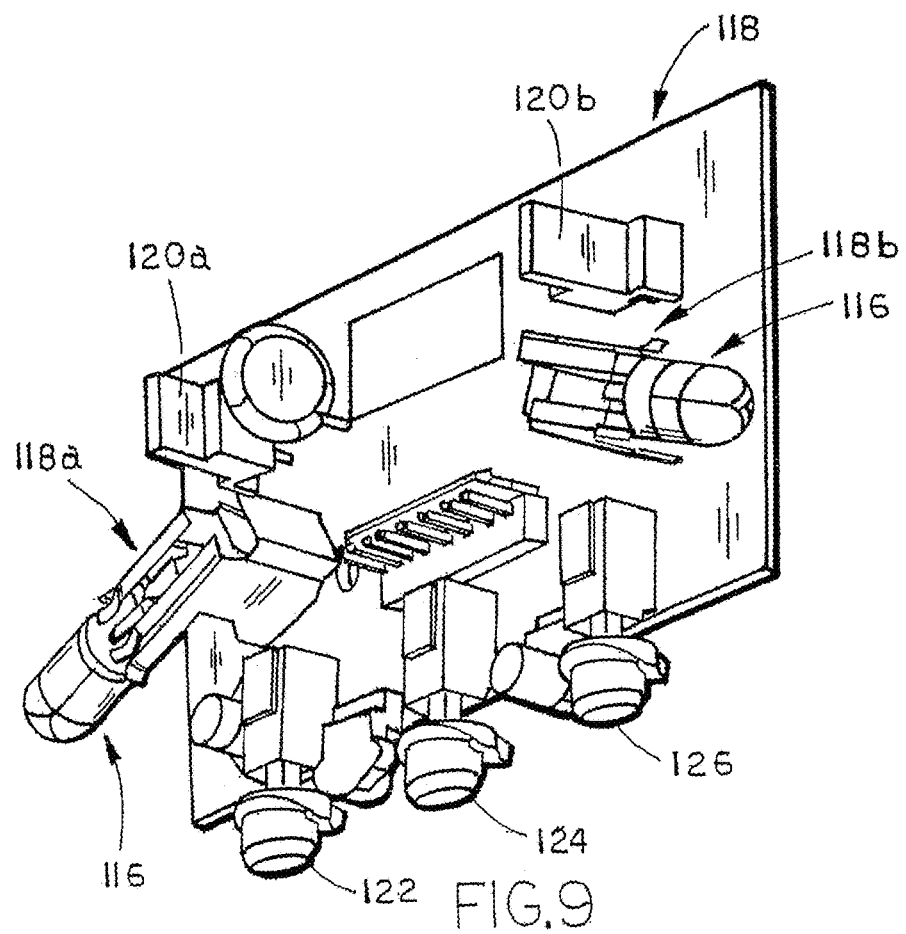
FIG. 9 is a rear perspective view of the carrier of FIG. 7.
Figure 10:
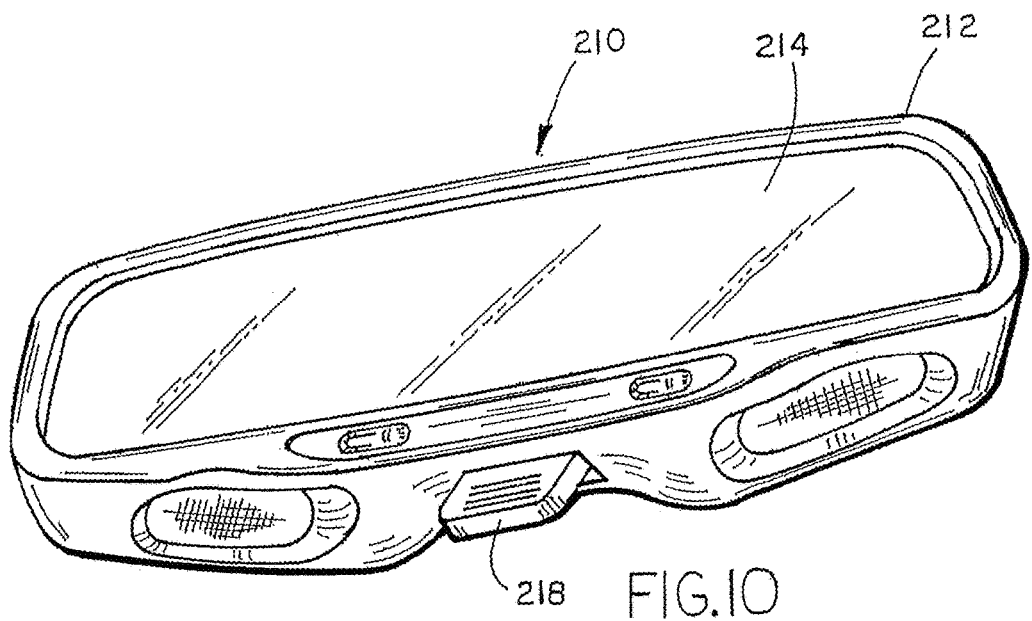
FIG. 10 is a bottom perspective view of another embodiment of an interior rearview mirror assembly incorporating a non-incandescent light source unit/module of the present invention.

Referring to FIG. 6, the numeral 110 generally designates another embodiment of an interior rearview mirror assembly that incorporates a pair of non-incandescent light source units/modules 116 of the present invention. Similar to the previous embodiment, interior rearview mirror assembly 110 includes a casing 112 and a reflective element assembly 114, which is housed in casing 112. Referring to FIG. 7, supported in casing 112 is a carrier 118, such as a circuit board. Carrier 118 includes a pair of incandescent bulb holders 118a and 118b, which in the illustrated embodiment comprise sockets. In addition, carrier 118 includes projecting electrical connectors 120 which are adapted to connect to the vehicle electrical system for powering the various components supported on carrier 118. As best seen in FIG. 9, carrier 118 also include a plurality of user actuatable buttons 122, 124, 126. For example, user actuator buttons 122 and 126 may be used to control light source modules 116. User actuator button 124 may be used for other functions, such as for controlling the mirror or an LED 130, which is also mounted to carrier 118. For further details of LED 130 and carrier 118 reference is made to U.S. Pat. No. 5,820,245, which is incorporated hereby reference in its entirety.

Light source modules 116 are of similar construction to light source modules 16, with each light source module 116 including one or more non-incandescent light sources 132, such as LEDs. As noted previously, bulb holders 118a, 118b comprise socket type holders. Therefore, in this application each light source module 116 includes a base 131, similar in shape and size to a conventional incandescent bulb so that light source unit 116 can be plugged directly into holders 118a and 118b. Light sources 132 are electrically connected together such that their total forward operating voltage is at least 2 volts, more preferably at least 4 volts, and most preferably in a range of 2 volts to 16 volts.

Referring to FIG. 9B, light sources 132 are mounted on a circuit board 133 which include a non-incandescent light source circuit 134 with projecting electrical connectors 134a and 134b, such as leads, which couple to base 131. Lead 134a comprises a ground lead which couples the ground contact of base 131 and lead 134b comprises a power lead that couples to the power contact of base 131.

Figure 8:
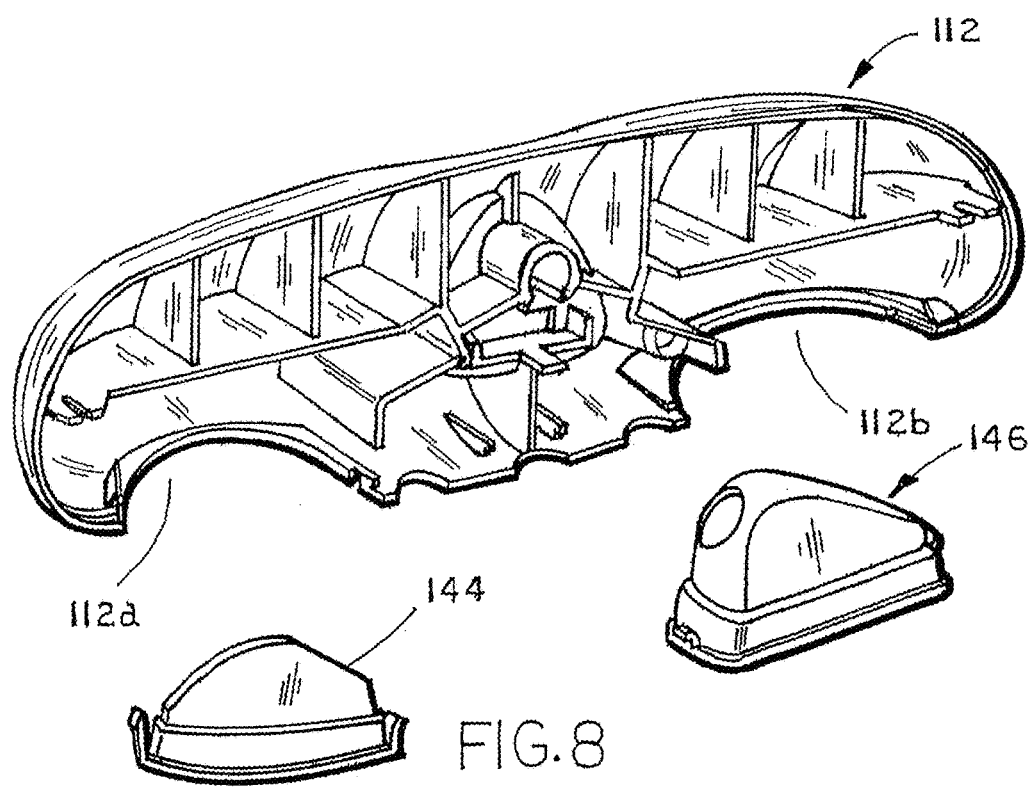
FIG. 8 is an exploded perspective view of the mirror casing and light surrounds of FIG. 7.

Referring to FIGS. 7 and 8, casing 112 includes a pair of openings 112a and 112b through which light from light source modules 116 is directed. In this application given the angular orientation or mounting of light source modules 116, mirror assembly 110 may include reflectors 140 and 142 so the light from light source modules 116 is directed, for example downwardly through openings 112a and 112b. In addition, mounted in openings 112a and 112b are surrounds 144 and 146, which are provided for aesthetic reasons. Alternately or in addition, surrounds 144 and 146 may include optical surfaces for directing the light from light source modules 116 in desired light patterns. Alternately, light sources 132 may be oriented on circuit board 134 such they emit light in a desired light pattern.

It can be appreciated from the foregoing description that the light source module of the present invention may be packaged to provide a one-for-one replacement for a variety of different incandescent light sources. In addition, for further details of other accessories or devices that may be incorporated into mirror assembly 110 and, the following mirror assemblies described below, reference is made to the first embodiment.

Referring to FIGS. 10-14, the numeral 210 generally designates another embodiment of a mirror assembly that incorporates a non-incandescent light source unit/module 216 of the present invention. Similar to the previous embodiments, interior rearview mirror assembly 210 includes a mirror casing 212 and a reflective element assembly 214. In contrast, mirror assembly 210 does not include a carrier for its electrical components; instead, the components are hardwired to a connector 226, described below.

In the illustrated embodiment, reflective element assembly 214 comprises a prismatic reflective element, which is moved between day and night view positions by a toggle 218. For further details of toggle 218 references made herein to U.S. Pat. No. 5,673,994, which is incorporated by reference in its entirety. For examples of suitable reflective elements for reflective element assembly 214, reference is made to the previous embodiments.

Figure 11:
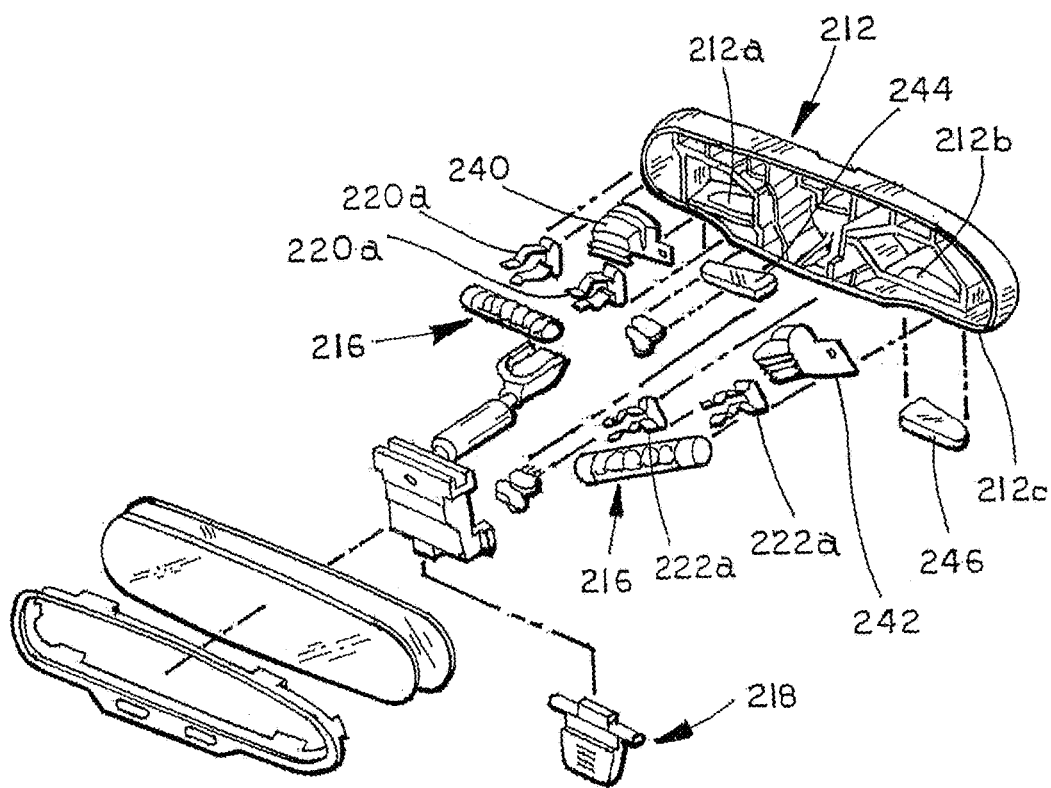
FIG. 11 is an exploded perspective view of the mirror assembly of FIG. 10.
Figure 12:
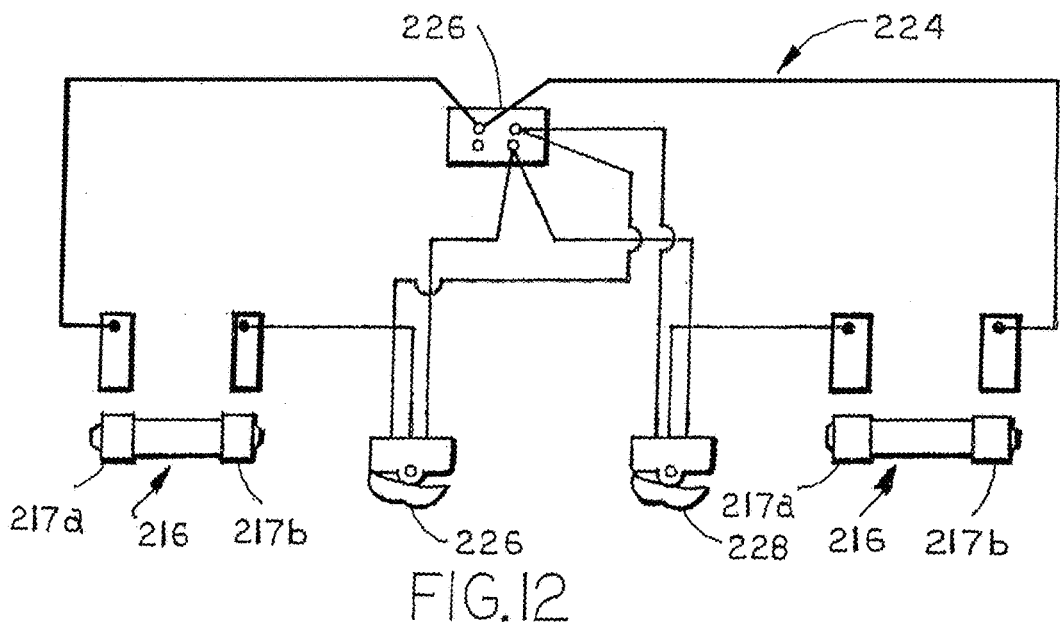
FIG. 12 is a schematic drawing of the incandescent light source circuit of the mirror assembly of FIGS. 10 and 11.
Figure 14:
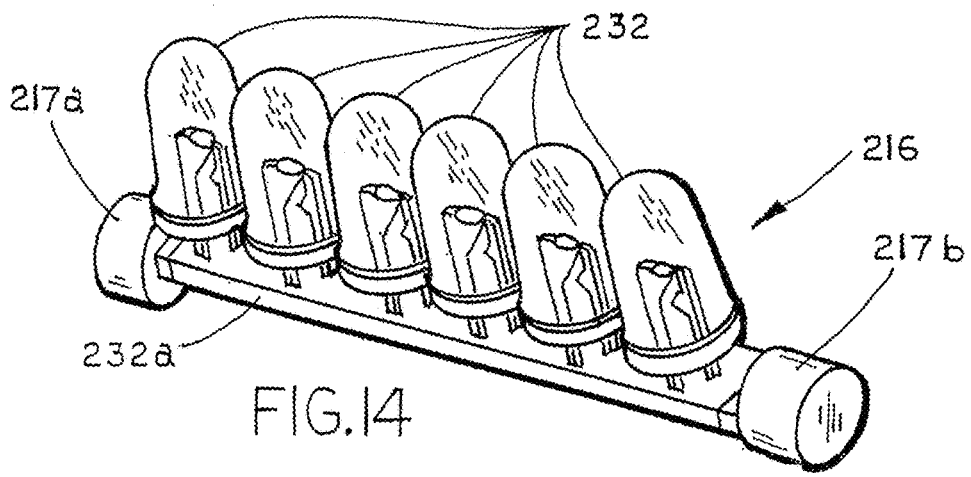
FIG. 14 is an enlarged view of another embodiment of the non-incandescent light source unit/module of the present invention.
Figure 14A:
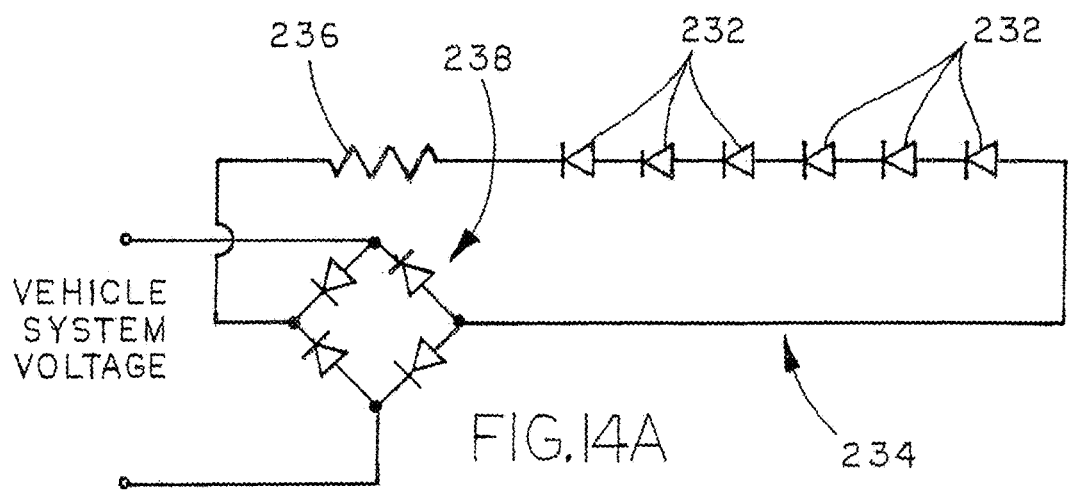
FIG. 14A is a schematic view of the non-incandescent light source circuit of the light source unit of FIG. 14.
Figure 13:
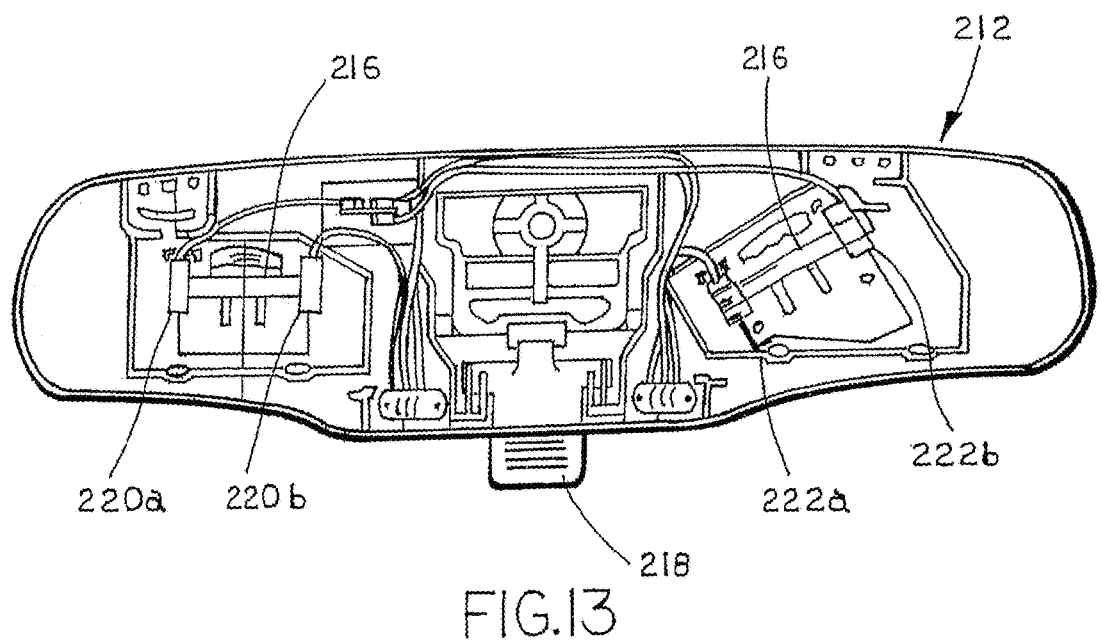
FIG. 13 is a front elevation view of the mirror assembly of FIG. 10 with the reflective element and bezel assembly removed for clarity.

As best seen in FIG. 11, casing 212 includes a pair of openings 212a and 212b in a bottom wall 212c. In addition, mounted to casing 212 are two sets of bulb holders 220a, 220b and 222a and 222b. Bulb holders 220a, 220b, 222a and 222b are connected to an incandescent light source power supply circuit 224, which is formed using a conventional wire harness. Circuit 224 includes power supply plug 226 for connecting to the vehicle electrical system. Power plug 226 is also hard wired to a pair of user actuatable buttons 226 and 228 which are optionally provided to control light source modules 216.

In the illustrated embodiment, each light source module 216 comprises a cartridge style module with an elongate body and contacts 217a and 217b formed or provided at opposed ends of the module. Similar to the previous embodiments, light source module 216 includes one or more non-incandescent light sources 232, such as LEDs, which are electrically coupled so that their total forward operating voltage is approximately equal to the ignition voltage of the vehicle, such as 12 volts. In the illustrated embodiment, light sources 232 are mounted to a carrier 232a, such as circuit board. Alternately, light sources 232 may be connected by a circuit 234 which includes current limiting element 236, such as a resister or diode or the like. In this manner, the total forward turn-on voltage of the light sources 232 may range from about 2 to 16 volts, as described in reference to the previous embodiments. Circuit 234 also optionally includes a polarity rectifier 238, which eliminates the polarity of light source module 216. For example, polarity rectifier 238 may comprise a diode bridge rectifier. In this manner, light source modules 216 may be inserted into bulb holders 220a, 220b, 222a, and 222b in reversed positions.

In the illustrated embodiment, mirror assembly 210 includes a pair of surrounds 240 and 242 which straddle light source modules 216. Surrounds 240 and 242 are optional and may be provided merely for aesthetic reasons. In addition, mirror assembly 210 includes surrounds 244 and 246 which are positioned over openings 212a and 212b in bottom wall 212c of mirror casing 212. Again, surrounds 244 and 246 may be clear surrounds without optical surfaces or elements and may be provided for aesthetic reasons only. Optionally, surrounds 240 and 242 may comprise surrounds with optical features, such as refractive or reflective surfaces, such as described in U.S. Pat. No. 5,673,994, which is herein incorporated by reference in its entirety. However, it should be understood that given the directionality of the LEDs comprising light sources 232 of light source module 216, reflective surfaces are merely optional.

Similarly, surrounds 244 and 246 may include optical surfaces in order to achieve a desired light pattern. For further details optional optical surfaces, for surrounds 244, 246, references made to U.S. Pat. No. 5,673,994, which is incorporated by reference in its entirety.

It should be understood that the light source modules of the present invention may be incorporated into a wide variety of interior mirror assemblies, which are tooled for incandescent light sources. For example, the non-incandescent light source module of the present invention may be incorporated into the mirror assemblies disclosed in U.S. Pat. Nos. 5,649,756; 5,669,698; 5,813,745; or 5,671,996, which are herein incorporated by reference in their entireties. In addition, as will be more fully described below, the light source modules of the present invention may be incorporated into exterior mirror assemblies which are tooled for incandescent light sources.

For example, referring to FIG. 15, an exterior rearview mirror assembly 310 incorporating a non-incandescent light source module 316 (FIG. 17) is illustrated. Mirror assembly 310 includes a mirror casing 312 and a reflective element assembly 314. Reflective element assembly 314 may comprise a glass metallic-coated reflective element, such as those disclosed in U.S. Pat. No. 5,179,471 (the entire disclosure of which is herein incorporated by reference), or a variable reflectance element, such as described in reference to the previous embodiments. In the illustrated embodiment, mirror casing 312 includes a neck 318 which connects to a sail 320. Sail 320 incorporates into a forward portion of the vehicle side window assembly and mounts mirror assembly 310 to the door of a vehicle. Optionally, neck 318 may comprise a fixed support or may incorporate a powerfold connection or a break-away connection, such as disclosed in U.S. Provisional Application filed Aug. 14, 2000, Ser. No. 60/225,128.

Mirror casing 312 is preferably a molded housing formed from a plastic material and, more preferably, formed for a polypropylene or glass nylon filled material. For example, mirror casing 312 may incorporate a skull cap design or may be formed from other suitable materials, such as a polypropylene, and painted or coated with a decorated finish, such as described in U.S. patent application Ser. No. 09/348,083, filed Jul. 6, 1999, now U.S. Pat. No. 6,150,014; and Ser. No. 09/489,322, filed Jan. 21, 2000, which are herein incorporated by reference in their entireties. In addition, mirror casing 312 may incorporate wind noise reduction features, such as disclosed in U.S. patent application Ser. No. 09/482, 199, filed Jan. 12, 2000, now U.S. Pat. No. 6,419,300, which is herein incorporated by reference in its entirety.

In the illustrated embodiment, reflective element 314 is mounted on an actuator 340, which provides multi-axis positioning of reflective element assembly 314. Actuator 340 may comprise electric actuator, a manual actuator, or a Boden cable actuator. For examples of suitable actuators, references made to U.S. Pat. No. 6,037,689 and application Ser. No. 09/520,868, filed Mar. 7, 2000, now U.S. Pat. No. 6,362,548, which are herein incorporated by reference in their entireties.

Figure 17:
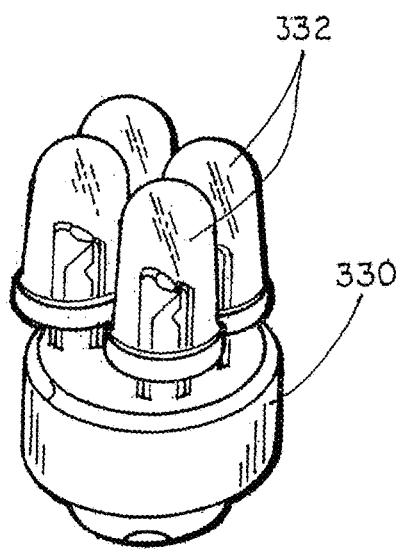
FIG. 17 is an enlarged view of the non-incandescent light source unit/module of FIG. 16.

Referring to FIGS. 16 and 17, mounted in bottom wall 312a of mirror casing 312 is a light module 342. Light module 342 is removably positioned in casing 312 and includes a signal light assembly 344, which includes one or more light sources 346, such as light emitting diodes. In addition, light module 342 includes a security light 348, which incorporates non-incandescent light source unit or module 316. Security light assembly 348 includes a socket type connection 350, which is coupled via a switched line to the electrical system of the vehicle through wiring 352. Socket 350 is tooled and wired to receive an incandescent light source. In addition, security light assembly 348 includes a reflector 354, which at least partially surrounds light module 316. However, as fully described above, given the directionality of light source module 316, reflector 354 may be omitted. For further details of light module 342, reference is made to U.S. Pat. No. 5,879,074, the entire disclosure of which is incorporated herein in its entirety.

In the illustrated embodiment, non-incandescent light source module 316 includes one or more non-incandescent light sources 332, such as LEDs, which are connected by a non-incandescent light source circuit 334 so that their total forward turn-on voltage is approximately equal to the voltage supply of the vehicle electrical ignition system, typically 12-volts. Alternately, the total forward turn-on voltage may be in a range of 2 volts to 16 volts, with circuit 334 incorporating a current limiting element or device, such as a series resistor or a diode, with a voltage drop in a range of 0.5 to 14 volts, and optionally a heat sink to dissipate any heat built-up. For example, light sources 332 may be mounted to a circuit board, with light sources 332 electrically connected by circuit 334. In addition, circuit 334 may include a polarity rectifier, such as a diode bridge rectifier, which eliminates the polarity of light source module 316. In addition, in the illustrated embodiment, light source module 316 includes a base 330, which is similar to a conventional bulb, so that it can be inserted into socket 350 for a one-to-one replacement of a conventional incandescent bulb.

Figure 18:
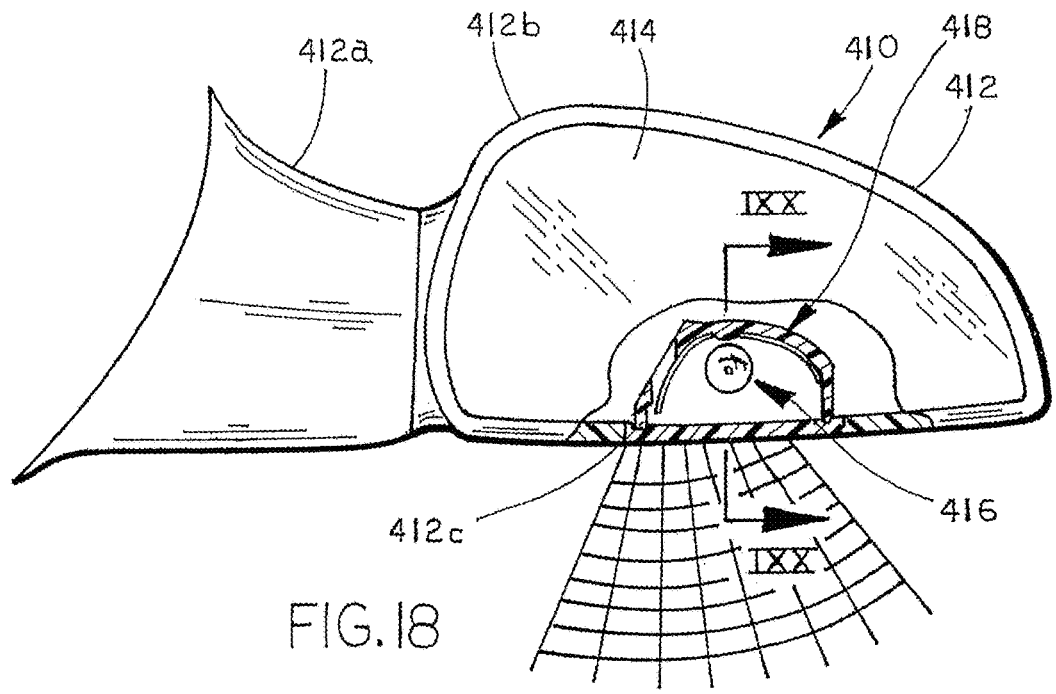
FIG. 18 is a front elevation partial fragmentary view of another embodiment of an exterior rearview mirror assembly incorporating a non-incandescent light source unit/module of the present invention.

Referring to FIG. 18, a non-incandescent light source unit/module for 416 of the present invention is incorporated into a security light module for 418 of exterior rearview mirror assembly 410. Exterior rearview mirror assembly 410 includes a mirror casing 412 and a reflective element assembly 414. Mirror casing 412 includes a fixed portion 412*a* and a movable portion 412*b* which is mounted to fixed portion 412*a* by a break-away connection or powerfold connection, as previously described. In the illustrated embodiment, security light module 418 is mounted in movable portion 412*b* and positioned in an opening 412*c* of lower wall 412*d* of mirror casing 412.

Figure 19:
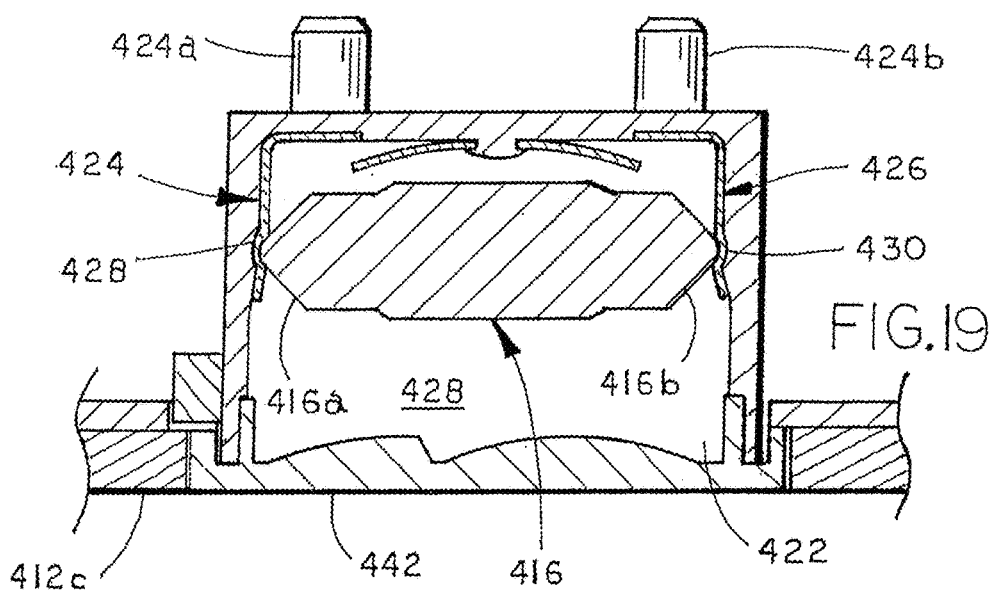
FIG. 19 is a cross section view taken along the line XIX-XIX of FIG. 18.

Referring to FIG. 19, security light module 418 includes a generally domed-shaped housing 420, which defines a cavity 428 and an opening 422 through which light source unit/module 416 directs light. Positioned in cavity 418 is a pair conductive contacts 424 and 426. Conductive contacts 424 and 426 are preferably brass stampings and include a pair of arms 428 and 430 for supporting a conventional festoon incandescent light source.

In the illustrated embodiment, light source unit 416 includes frusto-conical contacts 416*a* and 416*b*, which make electrical contact with arms 428 and 430 of conductive contacts 424 and 426 when light source unit 416 is inserted into the socket formed by arms 428 and 430. Conductive contacts 424 and 426 include projecting connector portions 424*a* and 424*b*, which extend exteriorly of housing 420 for connecting to the vehicle electrical system via a switched line. Security light module 418 optionally includes a reflector 440 which straddles light source unit 416. However, it should be understood that reflector 440 may be omitted since light source module 416 incorporates directional light sources, such as LEDs.

Figure 20:
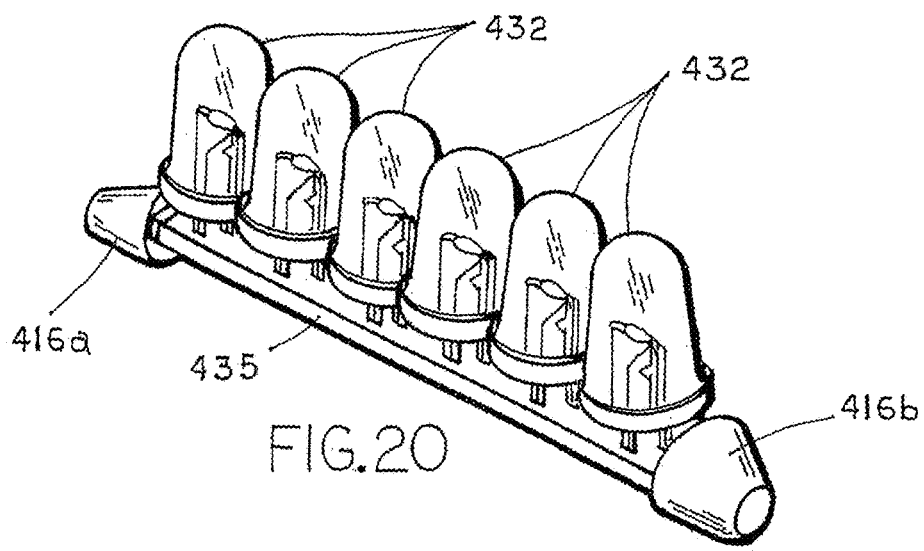
FIG. 20 is an enlarged view of the non-incandescent light source unit of FIG. 19.
Figure 21:
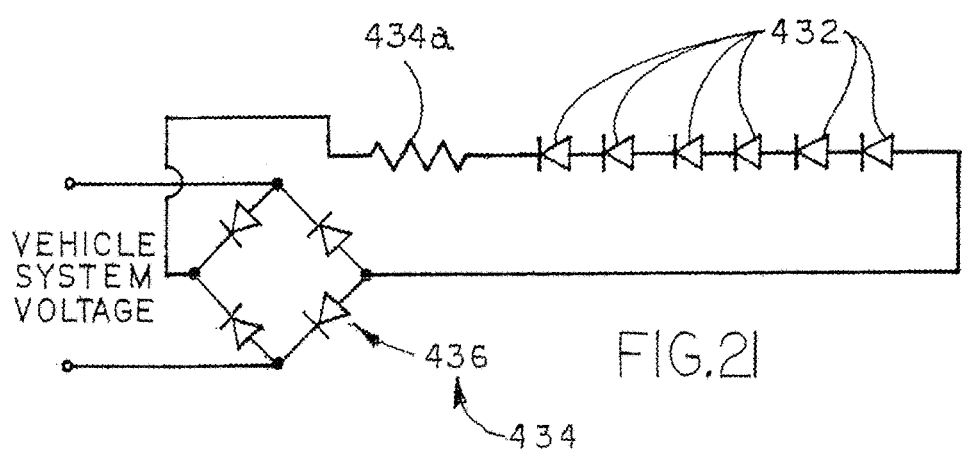
FIG. 21 is a schematic drawing of the non-incandescent light source circuit of the light source unit of FIG. 20.

Referring to FIG. 20, light source unit 416 includes one or more light sources 432, such as LED's, which are arranged and electrically coupled by a non-incandescent light source circuit 434 illustrated in FIG. 21. Referring to FIG. 21, light sources 432 are interconnected by circuit 434 in series such that their total forward turn-on voltage is generally equal to the voltage supply of the electrical system of the vehicle, such as 12 volts. Optionally, circuit 434 may include a current limiting element or device 434*a*, such as a resister or diode, in which case the total forward turn-on voltage of light sources 432 may range, for example, from about 2 volts to 16 volts, as noted in reference to previous embodiments. Also, circuit 434 may include a polarity rectifier 436, such as a diode bridge rectifier, which eliminates the polarity of light source module 416, or may include a polarity indication element such as an indent or mark to guide correct installation in the mirror assembly. As previously described, light sources 432 may be commonly mounted with circuit 434 on a circuit board 435 (FIG. 20) and may be packaged or formed using surface mount technology.

Referring again to FIG. 18, security light module 418 includes a surround 442 which may include optical surfaces 444 (FIG. 19) for directing light from light source module 416 in a desired pattern. However, as previously noted, given the directionality of light sources 432, surround 442 may comprise a non-optical surround, with the light pattern generated by the orientation of light sources 432.

Figure 22:
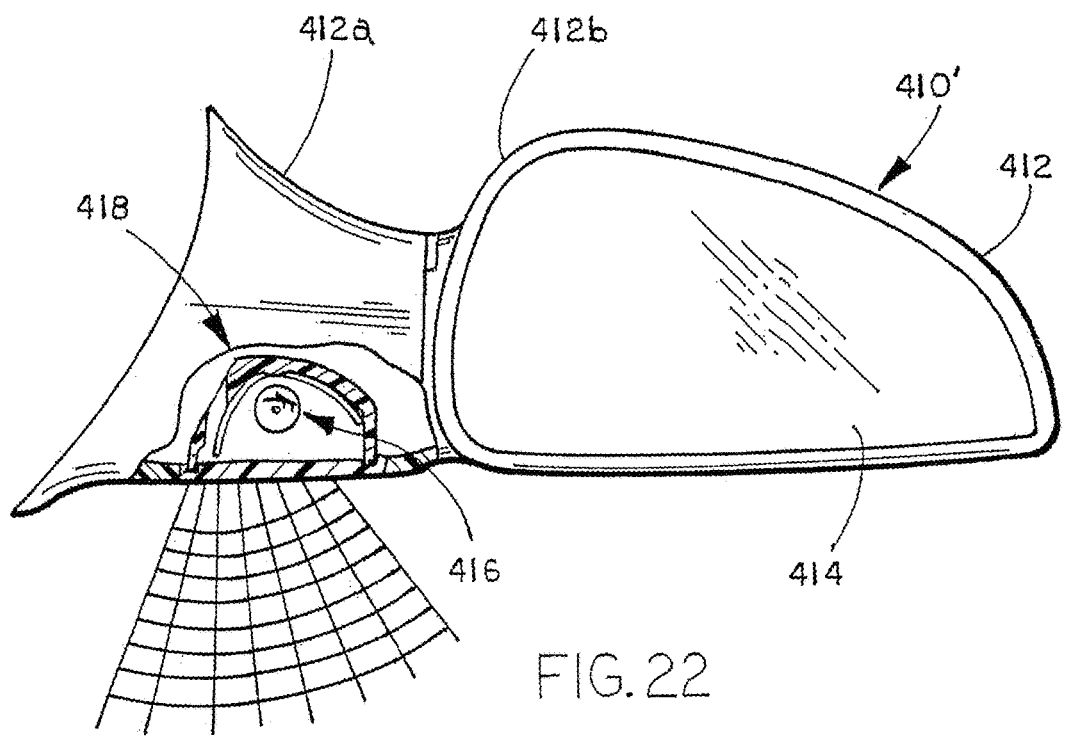
FIG. 22 is a front elevation, partial fragmentary view of an another exterior rearview mirror assembly that incorporates a non-incandescent light source unit/module of the present invention.

Referring to FIG. 22, security light module 418 (that functions as a ground illumination light) may be incorporated into fixed portion 412*a* of mirror assembly 410'. For further details of security light module 418, reference is made to U.S. Pat. No. 5,823,654, which is incorporated herein by reference in its entirety.

As previously noted, the light assembly of the present invention may incorporate one or more high intensity LED's. Referring now to FIGS. 23-35, the present invention also provides a vehicular lighting system, and in particular, a lighted vehicular mirror system that utilizes a lighting assembly comprising, preferably, no more than three light emitting diode light sources (more preferably, no more than two light emitting diode light sources, and most preferably, a single light emitting diode light source) to provide intense illumination (preferably with a light intensity of at least about 3 lux, more preferably at least about 25 lux, most preferably at least about 50 lux) over a zone of area at least about 1 square foot in dimension, more preferably at least about 3 square feet in dimension, and most preferably at least about 5 square feet in dimension. Such a zone of intense (and preferably uniform) illumination provided by the present invention preferably comprises the lap area of a front seat occupant of a vehicle (such as that of a driver of the vehicle or of a front passenger of the vehicle), with the lighting assembly of the invention being positioned as part of an interior mirror assembly (attached to a front windshield of the vehicle or to a header of the vehicle, as known in the automotive mirror art, such as described in U.S. Pat. Nos. 6,139,172; 6,042,253; 5,938,321; 5,813,745; 5,673, 994; 5,671,996; 5,649,756; 5,178,448; 4,807,096; 4,733,336 and 4,646,210, all of which are hereby incorporated herein by reference. Alternately, such a zone of intense (and preferably uniform) illumination provided by the present invention preferably comprises a ground area adjacent a front door (and, more preferably, a front door and a rear door) exterior to and at a driver-side of the vehicle or exterior to and at a passenger-side of the vehicle, with the lighting assembly of the invention being positioned as part of the exterior mirror assembly mounted to the side of the vehicle at which the ground is being illuminated in order to establish a lighted security zone at that side and adjacent the exterior of the vehicle when it is parked and when approached by a person desiring to enter the vehicle, such as disclosed in U.S. Pat. Nos. 6,280,069; 6,276,821; 6,176,602; 6,152,590; 6,149,287; 6,139,172; 6,086,229; 5,938,321; 5,671,996; 5,669,699 and 5,497,305; and U.S. patent application Ser. No. 09/866,398, filed May 25, 2001, now U.S. Pat. No. 6,416,208; and Ser. No. 09/690,048, filed Oct. 16, 2000, now U.S. Pat. No. 6,568,839, all of which are hereby incorporated herein by reference.

The present invention includes use of a direct current (DC) step-down voltage conversion element in order to allow a single LED and, preferably, a single high-intensity power LED (or at most two or three individual LEDs connected electrically in series or a plurality of individual LEDs connected electrically in parallel) to be efficiently powered with maximum power transfer efficiency between the powering DC source (typically the vehicle battery or ignition system) and the LED being powered, and with minimum need to dissipate power as heat in a resistive element (such as a series power resistor capable of dissipating power of the level of about 1 watt and higher, and sometimes in conjunction with a heat sink/heat dissipater) and/or to use the like of pulse width modulation or similar circuitry to vary the duty cycle being applied to the individual LED being powered. An individual LED typically is powered at a forward DC voltage of less than about 5 volts whereas vehicle battery/ignition powering sources used in automobiles and the like typically are at a significantly higher DC voltage level, such as the 12 volt level now common in automobiles and the 42 volt level planned for future vehicles. Many non-power LEDs in use in automotive products such as lighted interior and lighted exterior mirror assemblies are powered at about 2 to 3 volts and individually pass a forward current today of less than about 75 milliamps (and less than about 50 milliamps being common).

Figure 23:
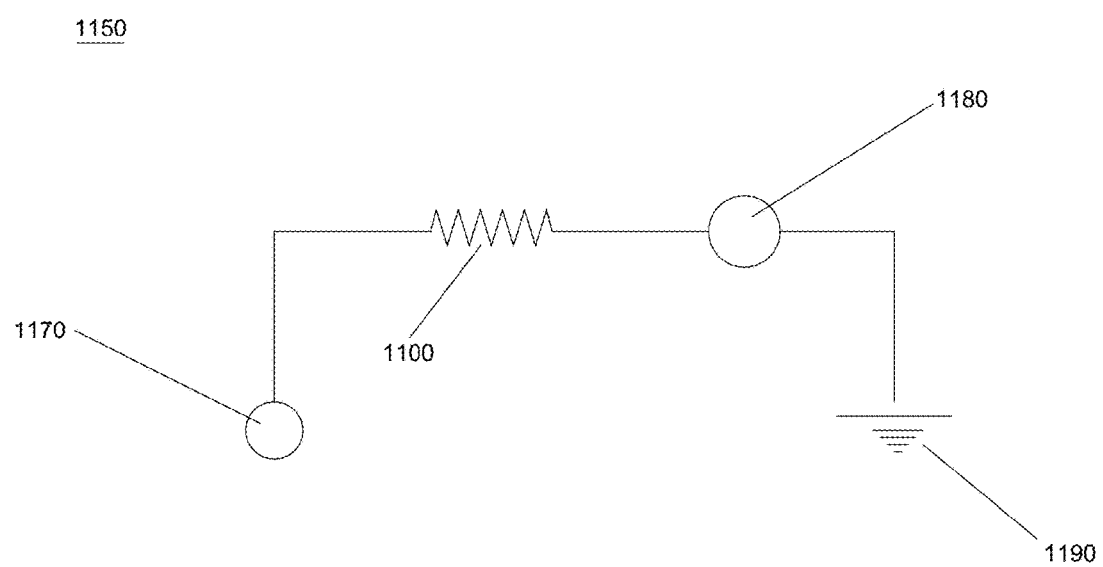
FIG. 23 is a schematic of a powering system useful with the present invention.

Referring to FIG. 23, a conventional, known LED powering system 1150 comprises a voltage dropping series power resistor 1100 connected in series with LED light source 1180. The vehicle battery/ignition voltage source 1170 (typically around 12 volts nominal, though in the future possibly 42 volts nominal) is connected to ground 1190 across the series combination of resistor 1100 and LED 1180. The power (in watts) dropped by resistor 1100 is dependent on the difference of the voltage level of vehicle battery/ignition voltage source 1170 (typically about 12 volts) and the forward voltage of LED 1180 (typically about 2-3 volts or thereabouts for LEDs currently in use) multiplied by the forward current passing through LED 1180 (and through series resistor 1100). For example, for a forward electrical current of 25 milliamps and a forward voltage across LED 1180 for powering of 2 volts, and connected to a 12 volt vehicle battery/ignition voltage 1170, the power dissipated by series resistor 1100 is 0.25 watts.

Figure 24:
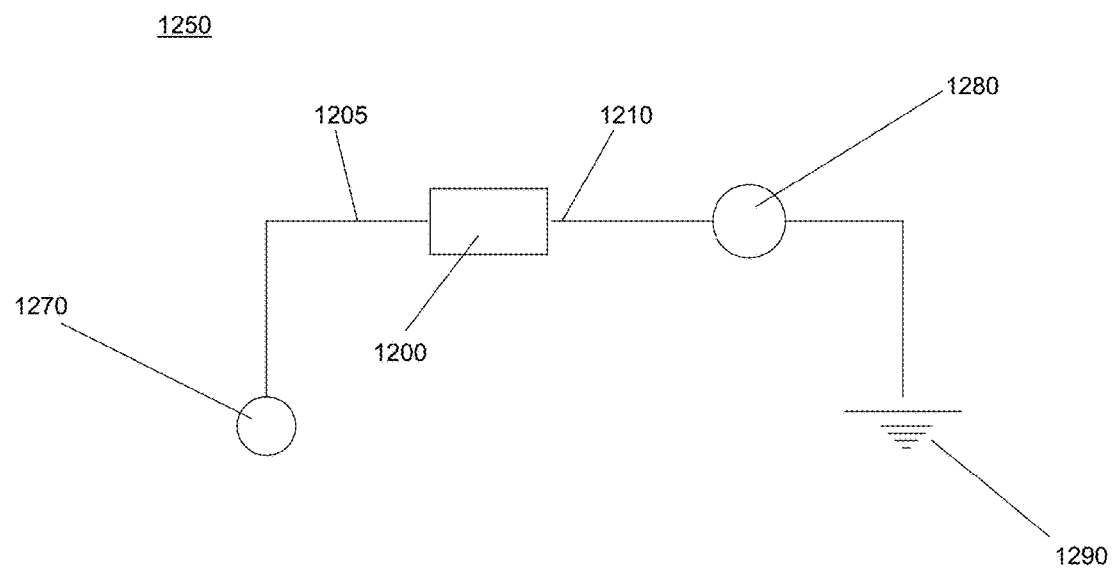
FIG. 24 is a schematic of an alternate powering system useful with the present invention.

An improvement upon this is shown in FIG. 24. Improved LED powering system 1250 comprises a direct current (DC) step-down voltage conversion element 1200 connected with an LED light source 1280. A vehicle battery/ignition voltage source 1270 (typically around 12 volts nominal, though in the future possibly 42 volts nominal) is provided as DC power input 1205 to direct current (DC) step-down voltage conversion element 1200. Direct current (DC) step-down voltage conversion element 1200 processes this input voltage 1205 and converts it to a lower output voltage 1210 (for example, the conversion element converts a 12 volt input to a 2 volt output and hence has 6:1 (6 to 1) step-down ratio). Whereas the voltage (in volts) on output 1210 is lower (by a step-down ratio such as, for example, 6:1) than the voltage on input 1205 of direct current (DC) step-down voltage conversion element 1200, the electrical current (in amps) on output 1210 is correspondingly higher (by a step-up ratio such as, for example, 6:1) than the current on input 1205 of direct current (DC) step-down voltage conversion element 1200. The power (in watts) dropped by direct current (DC) step-down voltage conversion element 1200 is significantly lower than that dropped by resistor 1100 of powering system 1150, discussed above. The step-down ratio of direct current (DC) step-down voltage conversion element 1200 is dependent on the ratio of the voltage level of vehicle battery/ ignition voltage 1270 (typically about 12 volts currently, but in some future vehicles, about 42 volts) to the forward voltage of LED 1280 (typically about 2-3 volts or thereabouts for LEDs currently commercially available). For example, for a forward current of 25 milliamps passing through LED 1280 and a forward voltage across LED 1280 for powering of 2 volts, and connected to a 12 volt vehicle battery/ignition voltage 1270, the step-down voltage ratio of direct current (DC) step-down voltage conversion element 1200 is about 6:1 and the corresponding step-up current ratio is about 6:1 (with about 4 milliamps at 12V entering direct current (DC) step-down voltage conversion element 1200 at input 1205 and about 2 volts at about 24 milliamps exiting at output 1210).

A direct current (DC) step-down voltage conversion element and associated circuitry suitable to utilize to power a single high-intensity power LED of the present invention (or a series couple of such LEDs or a series triplet of such LED and/or a parallel plurality of such LEDs) is disclosed in commonly assigned U.S. patent application Ser. No. 09/347,807, filed Jul. 2, 1999, now U.S. Pat. No. 6,317,248, the entire disclosure of which is hereby incorporated by reference herein. Switching regulators preferably used in the DC:DC step down power supplies for high efficiency LEDs of the present invention preferably have a quiescent current drain of less than about 100 milliamps, more preferably, less than about 75 milliamps, and most preferably, less than about 50 milliamps. For example, an LED light source powering circuit can include a National LM78S40 switching regulator chip available from National Semiconductor of Santa Clara, Calif. or a MAX 1627 switching regulator available from Maxim Company, Sunnyvale, Calif. Also, DC to DC converter control circuits suitable to power a high-intensity power LED light source such as when used in a lighted mirror assembly as described in this present invention are available from Motorola of Schaumburg, Ill. under the trade name MC34063A series of monolithic control circuits. Such DC to DC converters include an internal temperature compensated reference, a comparator, a controlled duty cycle oscillator with an active current limit circuit, a driver, and a high current output switch. Operation is from 3 volts input to 40 volts input; output voltage is adjustable; there is a low standby current and an output switch current to 1.5 amps; frequency operation to 100 kHz; and a 2% precision reference.

Such direct current (DC) step-down voltage conversion elements operate by a variety of circuitry means. For example (and without being bound by theory), an incoming DC signal can be electronically chopped to transform into an alternating current (AC) signal, that in turn can be stepped down in voltage utilizing the inductive coupling phenomena present in an electrical AC transformer (and/or by use of capacitors), and the now stepped down AC signal can be rectified or otherwise converted back to a DC signal. In such a DC to DC voltage reduction, the voltage is mainly reduced not by ohmic resistive drops but by inductive transformation.

Also, within the context of the present invention, a single high-intensity power LED comprises a single LED light source in a compact package or as an individual chip or circuit element (and with a diagonal size less than about 14 mm diagonal cross-sectional dimension when viewed from the light emitting side; more preferably less than about 8 mm; and most preferably, less than about 5 mm) that illuminates to emit a light beam when (powered at about 25 degrees Celsius or thereabouts) at least about 100 milliamps passes (i.e., conducts) through the LED element (more preferably when at least about 225 milliamps passes through the LED element and most preferably when at least 300 milliamps passes through the LED element), and with a luminous efficiency of at least about 1 lumen/watt, more preferably at least about 3 lumens/watt, and most preferably at least about 7 lumens/watt. Such high-intensity power LEDs, when normally operating, emit a luminous flux of at least about 1 lumen, more preferably at least about 5 lumens and most preferably at least about 10 lumens. For certain applications such as ground illumination from lighted exterior mirror assemblies and interior mirror map lights, such high-intensity LEDs preferably conduct at least about 250 milliamps forward current when operated at a voltage in the about 2 volts to about 5 volts range, and emit a luminous flux of at least about 10 lumens, more preferably at least about 15 lumens, even more preferably at least about 20 lumens, and most preferably at least about 25 lumens, preferably emitting white light.

The improved LED lighting system of the present invention has many applications inside the interior cabin and on the exterior body of a vehicle. For example, improved vehicular lighting is provided by the present invention for illumination purposes and the like, and especially for reading lights such as map reading lights, mirror-mounted turn-signal warning lights, mirror-mounted ground illumination/security lights, instrumentation/console lighting and the like. For example, the present invention can be used in any of the video mirror assemblies, rearview mirror assemblies, camera assemblies and/or accessory modules (and/or in other vehicular accessories such as an exterior mirror assembly-mounted ground illumination/security light or in an exterior mirror assembly-mounted turn indicator or brake indicator signal light) such as are disclosed in U.S. patent application Ser. No. 09/793,002, filed Feb. 26, 2001, by Schofield et al., now U.S. Pat. No. 6,690,268, which is hereby incorporated herein by reference. Also, the present invention can provide high-intensity LED light sources for cargo lighting, such as in the bed of a pick-up truck, and whereby, when the owner of a pick-up truck approaches his/her pick-up truck, the rear cargo bed can be illuminated remotely, such as by transmission of a signal from the driver to the vehicle (using a keyless entry door lock/unlock system such as is known in the automotive art), in order to actuate high-intensity LEDs (and/or other lighting such as non-incandescent and incandescent strips and other lighting). Also, the driver can activate such cargo lighting from the cabin of the vehicle and/or when a door opens in order to provide lighting for illumination of the cargo bed area to assist use of this cargo bed when at night.

Single high-intensity power LEDs suitable to use in the present invention include high-intensity, high-current capability light emitting diodes such as the high-flux LEDs available from LumiLeds Lighting, U.S., LLC of San Jose, Calif. under the SunPower Series High-Flux LED trade name. Such high-intensity power LEDs comprise a power package allowing high-current operation of at least about 100 milliamps forward current, more preferably at least about 250 milliamps forward current, and most preferably at least about 350 milliamps forward current, through a single LED. Such high-current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high-intensity LEDs are available in blue, green, blue-green, red, amber, yellow and white light emitting forms, as well as other colors. Such high-intensity LEDs can provide a wide-angle radiation pattern, such as an about 30 degree to an about 160 degree cone. Typically, such high-intensity LEDs are fabricated using Indium Gallium Nitride technology. To assist heat dissipation and maintain the LED junction below about 130° Celsius (and more preferably below about 100° Celsius and most preferably below about 70° Celsius), a heat sink can be used. Preferably, such a heat sink comprises a metal heat dissipater (such as an aluminum metal heat sink) with a surface area dissipating heat of at least about 1 square inch, more preferably of at least about 2.5 square inches, and most preferably of at least about 3.5 square inches. When used as, for example, a map light assembly mounted in an interior rearview mirror assembly (such as in the mirror housing or in a pod attaching to the mirror mount to the vehicle), a single high-intensity power LED (for example, a single white light emitting LED passing about 350 mA and emitting light, and preferably white light or any other color, with a luminous efficiency of at least about 3 lumens per watt, and with a light pattern of about 120° or so) can be combined with a reflector element and a lens to form a high-intensity power LED interior light module capable of directing an intense light beam of light from an interior mirror assembly mounted to a windshield or header region of the vehicle to the lap area of a driver or a front-seat passenger in order to allow a reading function such as a map reading function and/or to provide courtesy or theatre lighting within the vehicle cabin. Also, a single high-intensity power LED (for example, a single white light emitting LED or a red light emitting or any other colored light emitting diode passing about 350 mA and emitting light, preferably white light or any other color, with a luminous efficiency of at least about 3 lumens per watt, and with a light pattern of about 120° or so) can be combined with a reflector element and a lens to form a high-intensity LED security light module capable of directing an intense light beam of light (or any other color) from an exterior mirror assembly to illuminate the ground adjacent an entry door of the vehicle in order to provide a security lighting function. Also, a single high-intensity power LED (for example, a single white light emitting LED or a red light emitting or any other colored light emitting diode passing about 350 mA and emitting white light with a luminous efficiency of at least about 3 lumens per watt, and with a light pattern of about 120° or so) can be combined with a reflector element and a lens (and optionally with high-intensity and/or conventional near-IR light emitting diodes), and be used in conjunction with a reversing or forward parking camera mounted on the exterior of a vehicle (such as at a license plate holder) in order to provide illumination for the, for example, reverse-aid camera when reversing at night.

In addition, lighting provided in any of the rearview mirror assemblies or vehicle accessories in accordance with the present invention, including the video display assemblies, accessory modules, pods, compass modules, exterior mirror security lighting assemblies, exterior mirror turn signal assemblies or the like, may incorporate a removable non-incandescent light source unit, such as described above.

Suitable LEDs for the light source unit of the present invention include a white light emitting light emitting diode.

Preferably, and as discussed above, the circuitry used to power the accessories that include such a high-intensity, high-current (>100 milliamps) power LED (or that includes a plurality of such LEDs) utilizes a direct current (DC) step-down voltage conversion element such as described herein.

Figure 25:
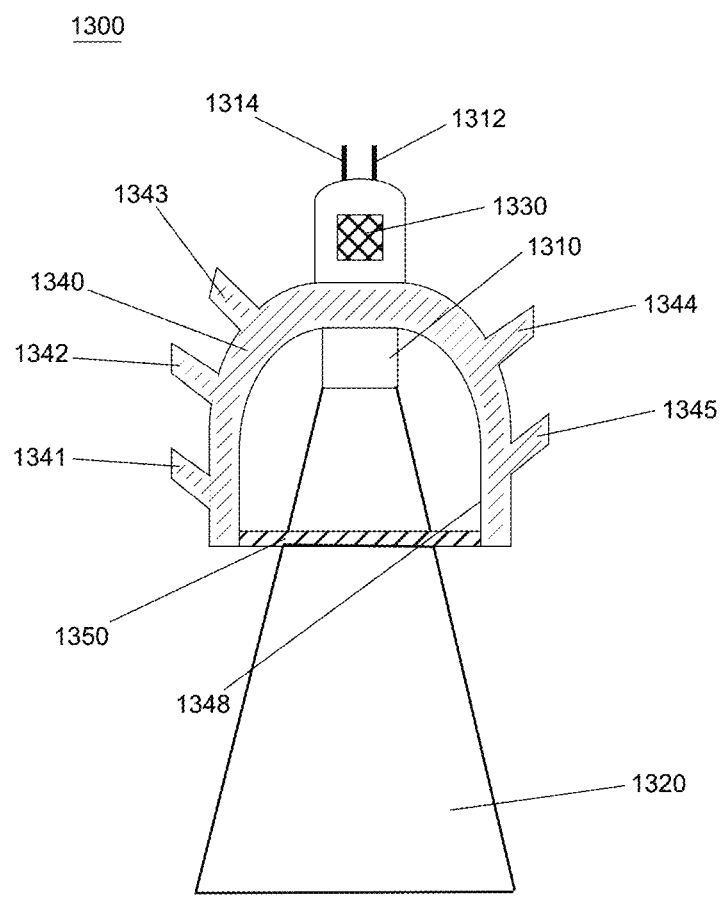
FIG. 25 is a side elevation and partial sectional view of a light module in accordance with another embodiment of the present invention.
Figure 26:
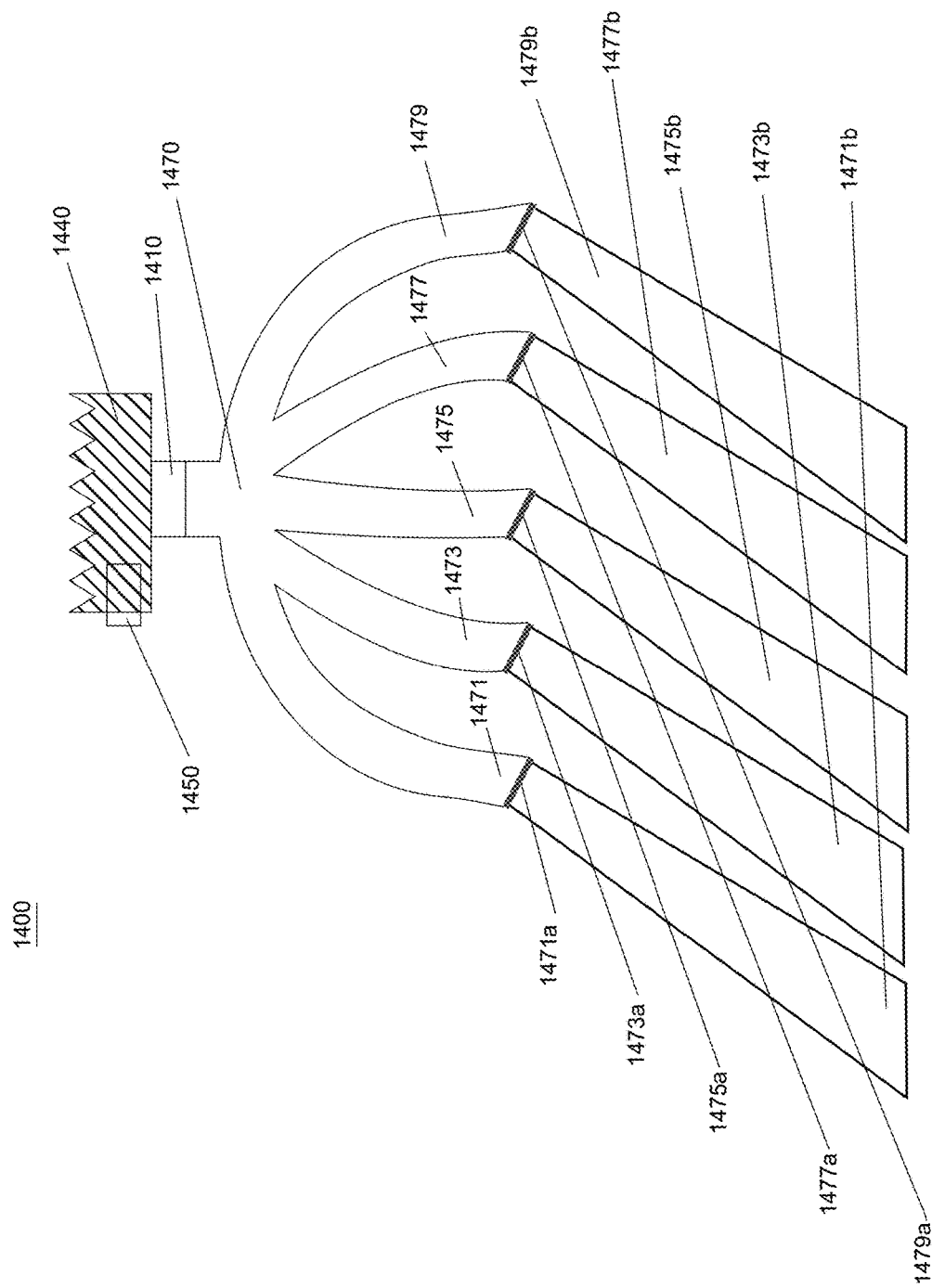
FIG. 26 is a side elevation and partial sectional view of an exterior mirror turn signal module in accordance with the present invention.

A high-intensity power LED light module 1300 of the present invention is shown in FIG. 25. Module 1300 comprises a high-intensity LED light source 1310 that emits a beam of light 1320, and preferably emits a beam of white light, when powered, such as when a vehicle battery voltage (such as 12 volts nominal or 42 volts nominal) or a vehicle ignition voltage is applied to terminal 1312 and when terminal 1314 is grounded. Terminals 1312, 1314 are in circuit connection with a direct current (DC) step-down voltage conversion element 1330 which steps down the applied vehicle battery/ignition voltage level to the forward powering voltage (typically around 2-3 volts or thereabouts) required to cause power LED light source 1310 to emit light efficiently and intensely. The stepped down output voltage of direct current (DC) step-down voltage conversion element 1330 is applied to LED light source 1310 to cause it to emit light beam 1320, and preferably with a luminous efficiency of at least about 3 lumens/watt. When its powering circuit is operated at about 25 degrees Celsius or thereabouts, LED light source 1310 preferably passes at least about 100 milliamps, more preferably at least about 250 milliamps, and most preferably at least about 325 milliamps, when emitting with a luminous efficiency of at least about 1 lumen per watt, more preferably at least 4 lumens per watt, and most preferably at least about 7 lumens/watt. LED 1310 is mounted to combined heat sink/reflector 1340 which serves the dual role of being both a heat sink/heat dissipater for heat generated at the light emitting diode junction of LED light source 1310 and a reflector element to direct and shape light beam 1320. Optionally, and preferably, a heat sink compound, as known in the electronics art, can be used to thermally couple LED light source 1310 to heat sink/reflector 1340. Heat sink/reflector 1340 includes heat dissipating elements 1341, 1342, 1343, 1344, 1345 (such as fins, ribs or other elements that increase radiative surface area and/or facilitates convective heat exchange). Heat sink/reflector 1340 preferably comprises a metal material with a high heat conductivity (such as copper or a copper alloy, aluminum, brass or the like). The inner surface 1348 of heat sink/reflector 1340 is contoured and reflective to light (diffusely reflective and/or specularly reflective, and preferably highly specularly reflective, such as can be achieved by polishing to a mirror-like finish and/or by coating with a thin film mirror-reflector coating, such as by vacuum metalizing or by electroplating, of silver, aluminum, silver alloy, aluminum alloy, or the like) so as to help direct/shape light beam 1320. Light beam 1320 passes through a lens 1350 (that may be a diffractive and/or refractive optical element, and that may comprise, for example, a Fresnel optic, a binary optic, a diffusing optic, a holographic optic, a sinusoidal optic, or the like) where, preferably, it is further shaped/directed. Note that other locations for lens 1350 in module 1300 are contemplated. For example, lens 1350 can be at (and preferably abutting) LED light source 1310 at the apex region of the cavity formed by the walls of heat sink/reflector 1340.

Power LED light source 1310 preferably comprises a Luxeon™ Star Power LXHL-MW1A white light emitting LED having (at a 25° Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and available from Lumileds Lighting LLC of San Jose, Calif. Such high-intensity power LED sources are mounted onto a metal-core (such as aluminum core) printed circuit board, allowing for ease of assembly, optimum cooling and accurate light center positioning, per the manufacturer's date sheet. Also, a Lambertian (low dome) or Batwing light (high dome) distribution pattern is available and illumination is fast when powered (less than 100 nanoseconds). Total included viewing angle (the total angle at which about 90% of the total luminous flux is captured) is in the range of from about 110 degrees to about 160 degrees for such Luxeon™ Star Power light sources. High-intensity power LEDs in this series built with Aluminum Indium Gallium Phosphide (AlInGaP) emit red, red-orange or amber light beams; those built with Indium Gallium Nitride (InGaN) emit white, cyan, green or blue light beams.

LED light module 1300 preferably forms a unitary light module that is sealed against, and is impervious to, the outdoor elements (such as rain, road splash, dust, dirt, debris and the like). Thus, for example, LED light module 1300 can function as a removable map or reading light in a lighted interior mirror assembly such as is described in U.S. Pat. No. 4,733,336, which is hereby incorporated herein by reference. Alternately, LED light module 1300 can function as a security light module positioned in either the fixed portion of a breakaway ground illumination exterior mirror assembly or in the movable portion that houses the exterior mirror reflective element, and as described in U.S. Pat. No. 6,276,821, which is hereby incorporated herein by reference.

Lighted exterior mirrors that utilize several LED elements to function as a turn signal indicator to signal to adjacent and approaching drivers an intent to turn and/or change lanes are common, such as described in U.S. Pat. Nos. 6,280,069; 6,276,821; 6,176,602; 6,152,590; 6,139,171; 6,280,068; 6,149,287; 6,139,172; 6,086,229; 5,671,996 and 5,497,305; and U.S. patent application Ser. No. 09/866,398, filed May 25, 2001, now U.S. Pat. No. 6,416,208; and Ser. No. 09/690,048, filed Oct. 16, 2000, now U.S. Pat. No. 6,568,839, all of which are hereby incorporated herein by reference. An improved exterior mirror turn signal module 1400 of the present invention shown in FIG. 26. Exterior mirror turn signal module 1400 includes a single high-intensity power LED light source 1410, which is configured to optically couple with a light pipe element 1470. Light pipe element 1470 comprises a plurality of five individual light pipes 1471, 1473, 1475, 1477, 1479; each of which terminates in a respective angled terminal portion 1471a, 1473a, 1475a, 1477a, 1479a, which project a plurality of individual light beams 1471b, 1473b, 1475b, 1477b, 1479b when single high-intensity power LED light source 1410 is powered. Light pipe element 1470 is preferably constructed of an optical polymer material, such as polycarbonate, acrylic or CR-39, with a refractive index of about 1.4 to about 1.6 or thereabouts.

LED light source 1410 thermally couples with a heat sink 1440 in order to dissipate heat generated at the LED junction of LED light source 1410 when it is powered. Heat sink 1440 is preferably fabricated of a metal material, such as described above with respect to heat sink 1340, of high thermal conductivity. Optionally, heat sink 1440 includes an electrically resistive portion 1450 that is connected in series with LED light source 1410, such that when a battery or ignition voltage of the vehicle is applied across this series combination, electrically resistive portion 1450 functions as an electrical current limiter/voltage dropper for LED light source 1410. Electrically resistive portion 1450 can comprise a metallic or a non-metallic resistive element/resistor, preferably of resistance less than about 150 ohms, more preferably less than about 100 ohms, and most preferably in the range of from about 20 ohms to about 70 ohms. By including electrically resistive portion 1450 as a portion of heat sink 1440 (either as an appendage thereto or incorporated therein), heat sink 1440 (that preferably has heat dissipating fins such as are described above with respect to heat sink 1340) can act as a heat sink both for power dropped by LED light source 1410 itself as it passes its forward current to emit light and can act as a heat sink for the power dropped by any circuit element (such as resistive element 1450) connected between the vehicle power feed (usually 12 volts or thereabouts nominal battery voltage or around 13.8 volts nominal ignition voltage (i.e., usually a 12-volt nominal battery/ignition voltage) and LED light source 1410.

Light module 1400 can be placed behind, and be movable with and viewable through, the exterior mirror reflective element in an exterior side view mirror assembly, such as is described in U.S. Pat. Nos. 6,257,746; 6,045,243; 5,788,357; 5,355,284 and 5,014,167, which are hereby incorporated herein by reference, so as to function as a rear-facing (i.e. toward the rear of the vehicle to which the exterior mirror assembly is mounted) turn signal indicator that warns the driver of another vehicle overtaking the subject vehicle of the intent by the driver of the subject vehicle to initiate a lane change. In this regard, the angled terminal portions 1471*a*, 1473*a*, 1475*a*, 1477*a*, 1479*a* that project a plurality of individual light beams 1471*b*, 1473*b*, 1475*b*, 1477*b*, 1479*b* when high-intensity LED light source 1410 is powered may be arranged in a particular pattern (such as an arrow pattern) so that when the reflective element of the turn-signal-behind-the-reflective-element-equipped exterior mirror assembly is viewed such as by the driver of an overtaking vehicle in a side lane, an illuminated geometric or defined pattern is viewed, such as an arrow pointing away from the body side of the subject vehicle that indicates/warns of a turn or lane change event in progress. Alternately, light module 1400 can be fixedly incorporated into the exterior mirror assembly separate from, and not be movable with nor viewable through, the exterior mirror reflective element, such as is described in U.S. Pat. Nos. 6,280,069; 6,276,821; 6,176,602; 6,152,590; 6,250,783; 6,149,287; 6,139,172; 6,086,229; 5,938,321; 5,671,996 and 5,497,305; and U.S. patent application Ser. No. 09/866,398, filed May 25, 2001, now U.S. Pat. No. 6,416,208; and Ser. No. 09/690,048, filed Oct. 16, 2000, now U.S. Pat. No. 6,568,839, all of which are hereby incorporated herein by reference, so as to function as a rear-facing (i.e. toward the rear of the vehicle to which the exterior mirror assembly is mounted) turn signal indicator that warns a driver of another vehicle overtaking the subject vehicle of the intent by the driver of the subject vehicle to initiate a lane change.

LED light source 1410 preferably comprises a Luxeon™ Star Power LXHL-ML1A amber light emitting power LED having (at a 25 degree Celsius junction temperature) a minimum forward voltage of 2.25 volts, a typical forward voltage of 2.85 volts, a maximum forward voltage of 3.27 volts, a dynamic resistance of 2.4 ohms and a forward current of 350 milliamps and available from Lumileds Lighting LLC of San Jose, Calif., or comprises a Luxeon™ Star Power LXHL-MD1B red light emitting LED having (at a 25 degree Celsius junction temperature) a minimum forward voltage of 2.31 volts, a typical forward voltage of 2.95 volts, a maximum forward voltage of 3.39 volts, a dynamic resistance of 2.4 ohms and a forward current of 350 milliamps, and available from Lumileds Lighting LLC of San Jose, Calif.

Also, a direct current (DC) step-down voltage conversion element (not shown in FIG. 26) can be used in conjunction with, or as a substitute for, electrically resistive portion 1450 of light module 1400, in order to reduce heat dissipation. Also, pulse width modulation can be used in the circuitry powering LED light source 1410, also to reduce heat dissipation. Preferably, module 1400 is provided as a sealed, water impervious unitary module that is sealed against water incursion such as might occur should an exterior mirror assembly equipped with module 1400 pass through a car wash or be exposed to road splash or be used in rain.

Note also that the present invention, including an LED light module such as module 1400 or any of the high-intensity power LEDs described above and herein, can be used to light, and to provide lighting from, an exterior door handle assembly on a vehicle, such as is disclosed in U.S. provisional Application, Ser. No. 60/302,099, filed on Jun. 30, 2001, by Huizenga, which is hereby incorporated herein by reference.

Figure 27:
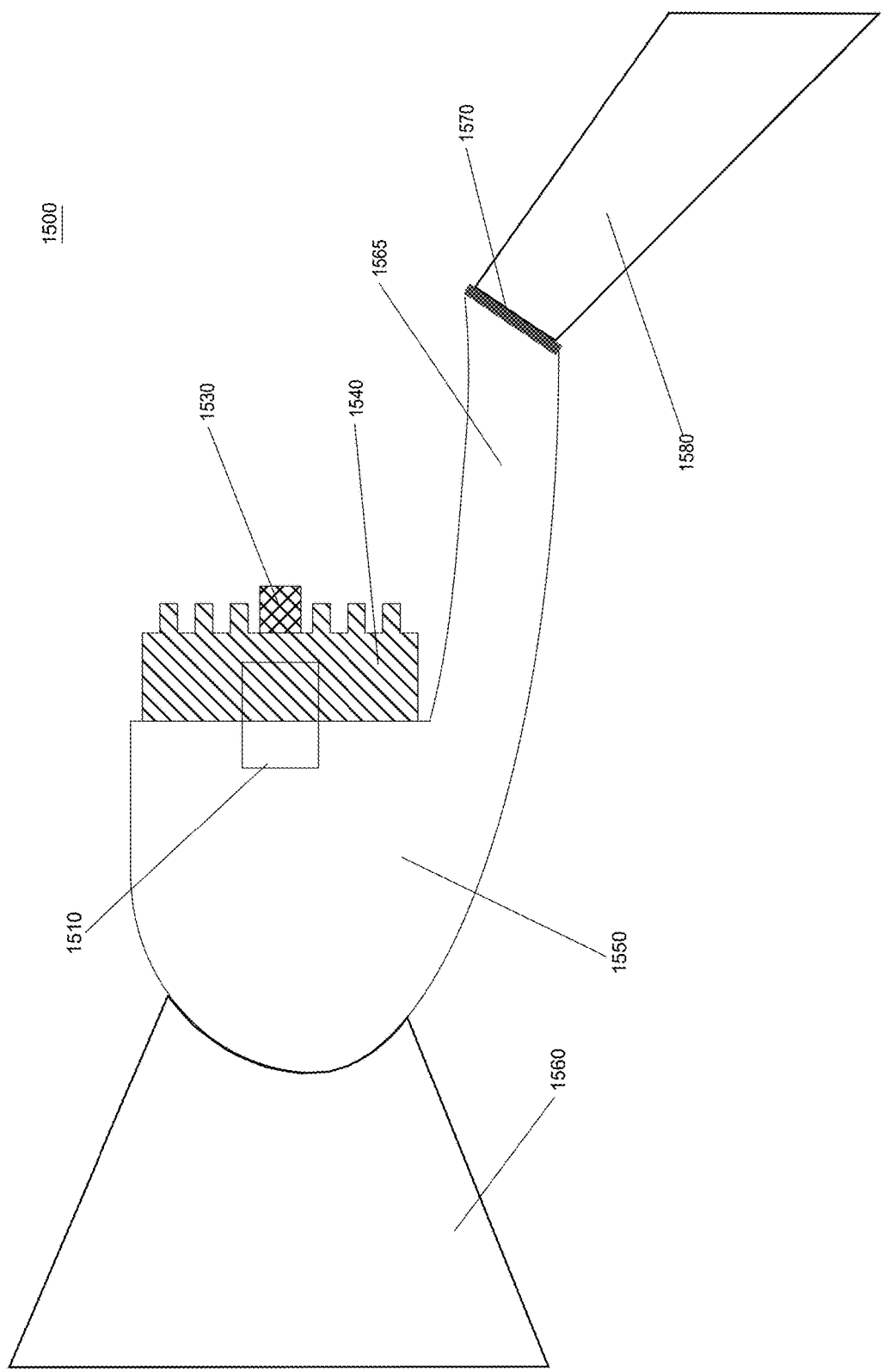
FIG. 27 is a side elevation and partial sectional view of an alternate embodiment of an exterior mirror turn signal module in accordance with the present invention.

A further embodiment of the present invention is shown in FIG. 27. An exterior mirror assembly turn signal module 1500 includes a single high-intensity power LED light source 1510 (such as Luxeon™ Star Power LXHL-MD1 red light emitting LED or, preferably, the Luxeon™ Star Power LXHL-ML1A amber light emitting LED described above) that emits light into, and preferably optically couples with, a light conduit member 1550. Module 1500 is adapted to be incorporated into an exterior mirror assembly, such as is disclosed in U.S. Pat. Nos. 6,280,069; 6,276,821; 6,176,602; 6,152,590; 6,149,287; 6,139,172; 6,086,229; 5,938,321; 5,671,996 and 5,497,305; and U.S. patent application Ser. No. 09/866,398, filed May 25, 2001, now U.S. Pat. No. 6,416,208; and Ser. No. 09/690,048, filed Oct. 16, 2000, now U.S. Pat. No. 6,568,839, all of which are hereby incorporated herein by reference, and is adapted for connection with a turn signal circuit of the vehicle in order to emit a warning light to other road users of intent to make a turn/change a lane by a driver who actuates a turn signal switch/stalk in the subject vehicle equipped with module 1500 in at least one of (and preferably both of) its exterior side view driver-side and passenger-side mirror assemblies.

Light conduit member 1550 is fabricated of a light-transmitting optical polymer such as polycarbonate or acrylic, and it is physically and optically configured to direct a light beam 1560 forward of the vehicle (and so as to constitute a turn signal indicator signal visible to drivers approaching the vehicle from the front (i.e. traveling in a direction opposite to the direction in which the subject vehicle equipped with module 1500 is traveling)). Member 1550 also includes a portion 1565 that is physically and optically configured to direct a light beam 1580 rearward of the vehicle (and so as to constitute a turn signal indicator signal visible to a driver approaching/overtaking the vehicle from the rear (i.e. traveling in the same direction in which the subject vehicle equipped with module 1500 is traveling)) such as in a blind spot of the reflective element of the particular exterior mirror assembly in which member 1500 is included. In this regard, portion 1565 terminates at angled terminal portion 1570 adapted to direct light beam 1580 generally rearwardly and laterally away from the body side of the vehicle equipped with module 1500, and so as not to be substantially visible to the driver of the subject vehicle equipped with module 1500.

Module 1500 may further include a heat sink 1540 and a DC step-down voltage conversion element 1530, which are preferably similar to heat sink 1340 and conversion element 1330, discussed above.

Figure 28:
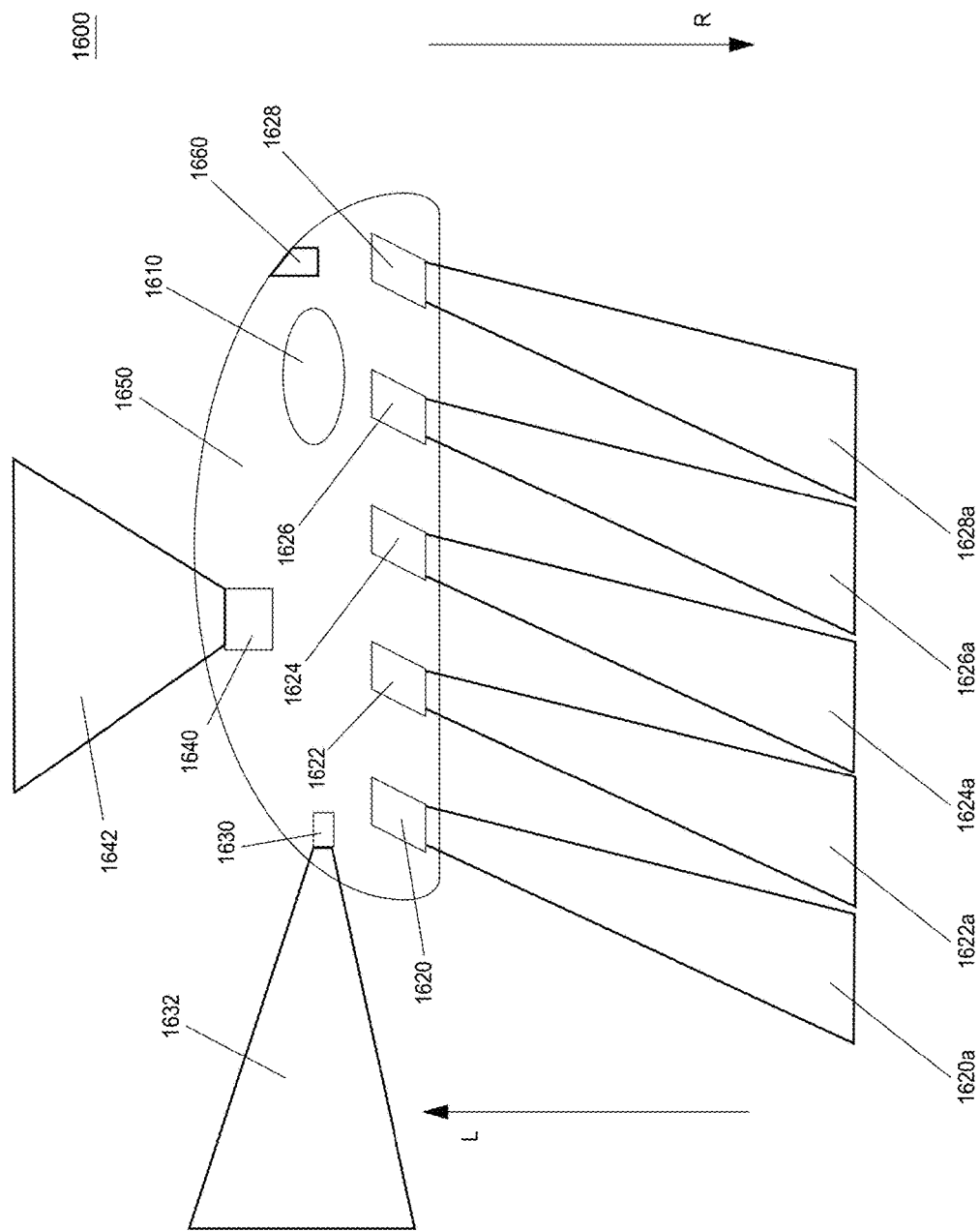
FIG. 28 is a front elevation of a combined ground illumination/turn-signal indicator system in accordance with the present invention.

FIG. 28 describes a combined ground illumination/turn-signal indicator system 1600 suitable to use in an exterior mirror assembly of an automobile, and especially in smaller-sized exterior mirror assemblies, such as are used on, for example, a MY2002 Honda Accord or a MY2002 Toyota Camry or a MY2002 Acura Legend or a MY2002 Ford Taurus/Mercury Sable, and similar-sized passenger sedan vehicles. A lighting module 1650 comprises a plurality of five individual non-power LEDs 1620, 1622, 1624, 1626, 1628 (and that each, preferably, pass less than about 75 milliamps forward current when powered, more preferably each less than about 50 milliamps, and most preferably each less than about 30 milliamps) configured to emit angled light beams 1620a, 1622a, 1624a, 1626a, 1628a generally rearwardly, horizontally and laterally away from the body side of the vehicle equipped with module 1650, and so as not to be substantially visible to the driver of the subject vehicle equipped with module 1650, and constituting a turn signal indicator signal visible to a driver approaching/overtaking the vehicle from the rear (i.e. traveling in the same direction in which the subject vehicle equipped with module 1650 is traveling) such as in a blind spot of the reflective element of the particular exterior mirror assembly that module 1650 is included in. Such an arrangement is disclosed in U.S. Pat. No. 5,669,705, which is hereby incorporated herein by reference. Note that beams 1620a, 1622a, 1624a, 1626a, 1628a project from the exterior mirror assembly generally horizontally to the road surface upon which the vehicle equipped with module 1650 is traveling. Module 1650 is optionally, and preferably, equipped with LED light source 1630 that is adapted to project light beam 1632 generally horizontally and directed away from the body side of the vehicle (and so function as a side-marker turn signal) and/or is equipped with LED light source 1640 that is adapted to project light beam 1642 generally horizontally and forwardly in the direction of travel of the vehicle equipped with module 1650 (and so function as a front turn signal).

Figure 29:
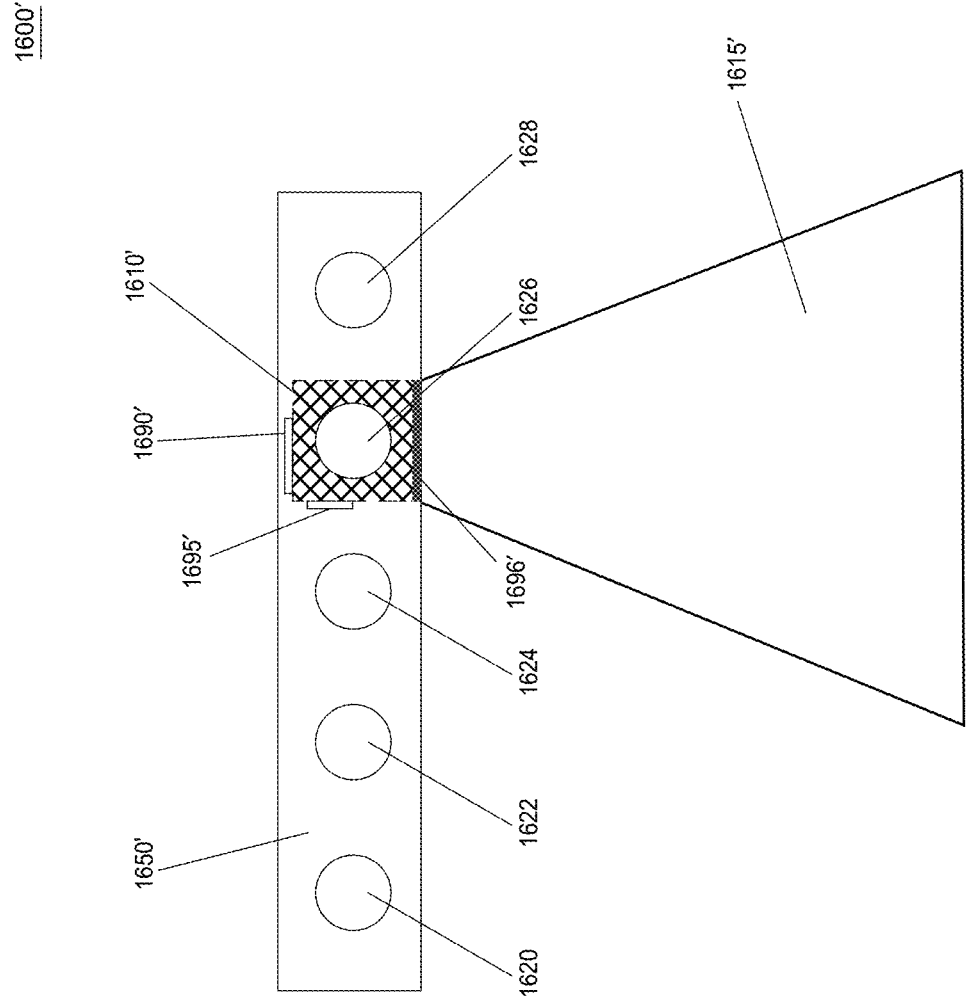
FIG. 29 is a top plan view of the ground illumination/turn-signal indicator system of FIG. 28, with a security light assembly.

Module 1650' further includes a security light unit 1610'. As best seen in FIG. 29, security light assembly 1610' projects a light beam 1615' that is directed generally downward and at least generally rearward from the bottom of the driver-side or passenger-side exterior mirror assembly equipped with module 1650' when mounted on the exterior of a vehicle (so as to illuminate the ground adjacent at least the front door and preferably adjacent the front and rear door of the side of the vehicle on which the exterior mirror assembly equipped with module 1650' is mounted, in order to create a lighted security zone adjacent that side of the vehicle). Security light assembly 1610' preferably comprises a single high-intensity power LED light source, and preferably a single high-intensity white light emitting LED light source such as the Luxeon™ Star Power LXHL-MW1A white light emitting diode described above, and preferably includes a heat sink and/or a reflector 1690' and/or a lens 1696', such as described above in connection with LED light module 1300. An electronic element 1695' (that can comprise a load-dropping series power resistor and/or a direct current (DC) step-down conversion element and/or pulse width modulation circuitry) can be included in module 1610' to allow connection of the preferred single LED light source in security light assembly 1610' to the vehicle battery/ignition power supply (typically 12 volts DC nominal). Electronic element 1695' preferably comprises an MC34063A control circuit or a National LM78S40 switching regulator or a MAX 1627 switching regulator.

Module 1650 preferably includes a unitary connector 1660 (FIG. 28) that allows connection of turn signal indicator LEDs 1620, 1622, 1624, 1626, 1628 and security light assembly 1610 to the vehicle wiring (so as, for example, to bring in the vehicle battery/ignition line and ground line to the electrical/electronic elements of module 1650) as a single-point-of-connect, thus facilitating electrical hook-up to the vehicle (such as by a single multi-pin plug/socket connection).

Figure 30:
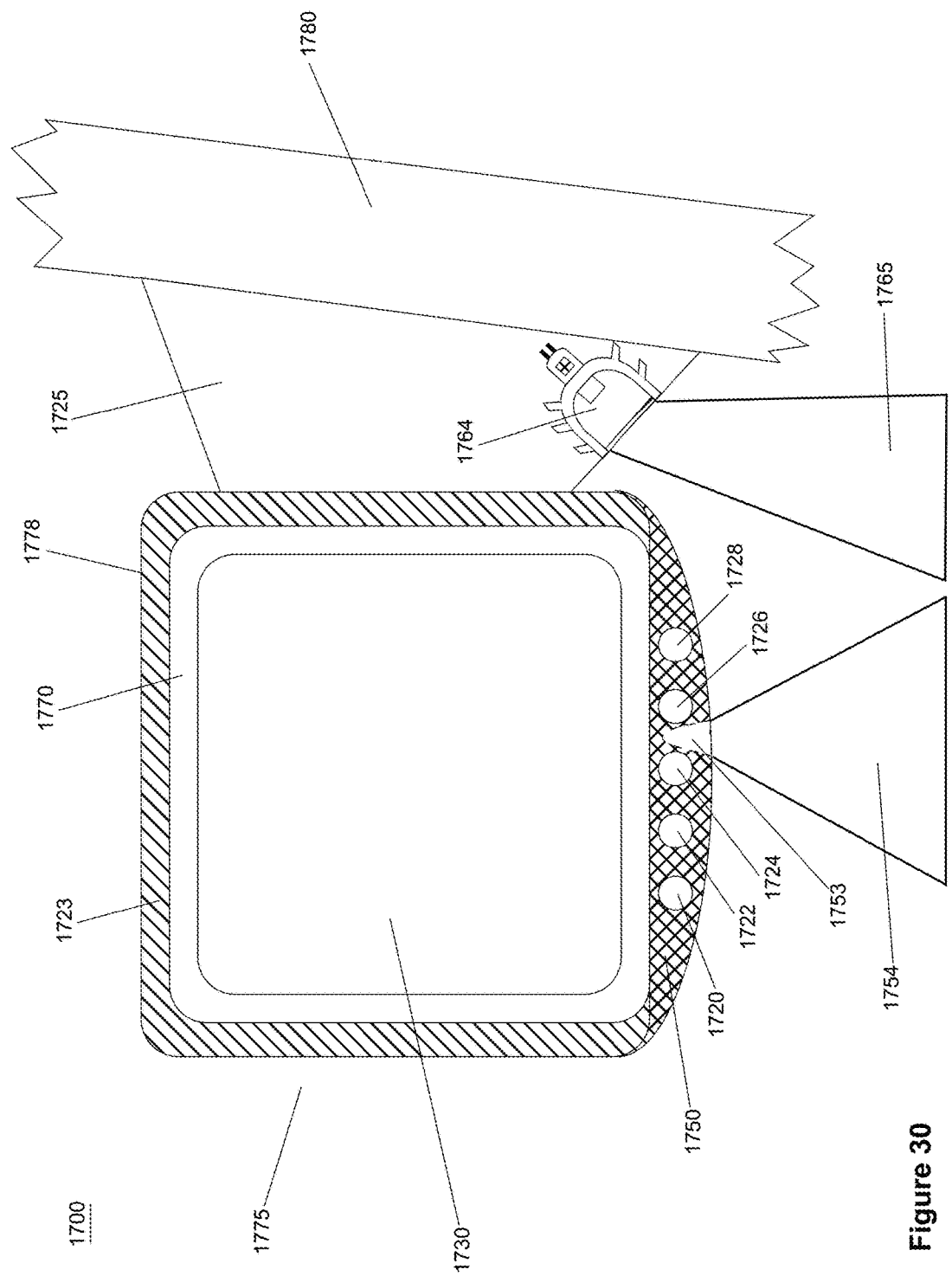
FIG. 30 is a view looking forwardly in the direction of travel of the vehicle of a lighted exterior mirror system in accordance with the present invention.

Module 1650 is preferably incorporated into an exterior mirror assembly as shown at 1750 in FIG. 30 (and such as disclosed in U.S. Pat. Nos. 6,276,821 and 5,669,705, which are hereby incorporated herein by reference). A lighted exterior mirror system 1700 comprises a lighted exterior mirror assembly 1775 that includes a fixed portion 1725 adapted for attachment to vehicle exterior body portion 1780 and a movable portion 1778 that, preferably, includes a break-away joint to fixed portion 1725 (such as is disclosed in U.S. Pat. No. 5,371,659, which is hereby incorporated herein by reference). Movable portion 1778 includes a housing portion 1723 that includes an exterior mirror reflective element 1730 (and preferably an electrochromic mirror reflective element, such as disclosed in U.S. Pat. Nos. 6,245,262; 6,154,306; 6,002,511; 5,910,854; 5,724,187; 5,668,663; 5,611,966; 5,500,760; 5,424,865; 5,239,405 and 5,233,461, all of which are hereby incorporated herein by reference) that is mounted on an electrically-operated actuator (not shown) and that is located in a cavity 1770 formed by the walls of housing 1723. Module 1750 attaches to a lower portion of movable portion 1778 and comprises individual LED turn signal indicators 1720, 1722, 1724, 1726, 1728 (that each project a light beam generally horizontally and laterally away from body portion 1780 when the driver actuates a turn signal circuit of the vehicle, and that each, preferably, pass less than about 75 milliamps when powered, more preferably each less than about 50 milliamps and most preferably each less than about 30 milliamps) and further comprises a single high-intensity power LED security light assembly 1753 that projects a ground illumination light beam 1754 generally downwardly and at least rearwardly in order to create a lighted security zone, as described above with respect to security light assembly 1610'. Optionally, instead of single high-intensity power LED security light assembly 1753 (or in addition to), a single high-intensity power LED light module 1764 (preferably such as described in connection with module 1300 and that emits a ground illumination beam 1765 when powered in order to create a lighted security zone at entrances/exits to the vehicle equipped with assembly 1775) can be included in fixed portion 1725 of exterior mirror assembly 1775.

Note the use of an all-LED lighting system such as in module 1650 and module 1750 and in particular the combination of a plurality of individual lower-intensity (typically emitting less than 0.75 lumens and, more typically less than 0.5 lumens), lower current (less than 50 mA typically) non-power LEDs to form a turn signal indicator assembly and a compact (preferably less than about 20 mm cross-sectional diameter, more preferably less than about 15 mm, and most preferably less than about 10 mm) single high-intensity (luminous efficiency typically greater than about 1 lumen/watt, more preferably greater than about 3 lumens/watt, and most preferably greater than about 7 lumens/watt), high current (greater than 200 milliamps typically) power LED security light assembly in a common housing and forming a unitary sealed module is particularly well suited for exterior mirror assemblies of restricted size, and is particularly well suited for use in exterior mirror assemblies on mid-sized and compact sedan vehicles, where the width of the part of the mirror assembly that houses the exterior mirror reflective element has a width less than about 7.5 inches, more preferably less than about 6.5 inches, and most preferably less than about 5.5 inches. Also, in order to provide a compact combined turn signal/security light module for incorporation into an exterior mirror assembly, the combination of single high-intensity power LED source behind a linear row of lower-intensity individual non-power LED turn signal indicators, as best can be seen in FIG. 28, is advantageous.

Note also that a single high-intensity power LED turn signal assembly, such as those described above in connection with system 1400 and system 1500 can be combined with a single high-intensity power LED security light assembly (such as described in connection with module 1300) into a compact, sealed, unitary module that can be incorporated into an exterior mirror assembly.

Figure 31:
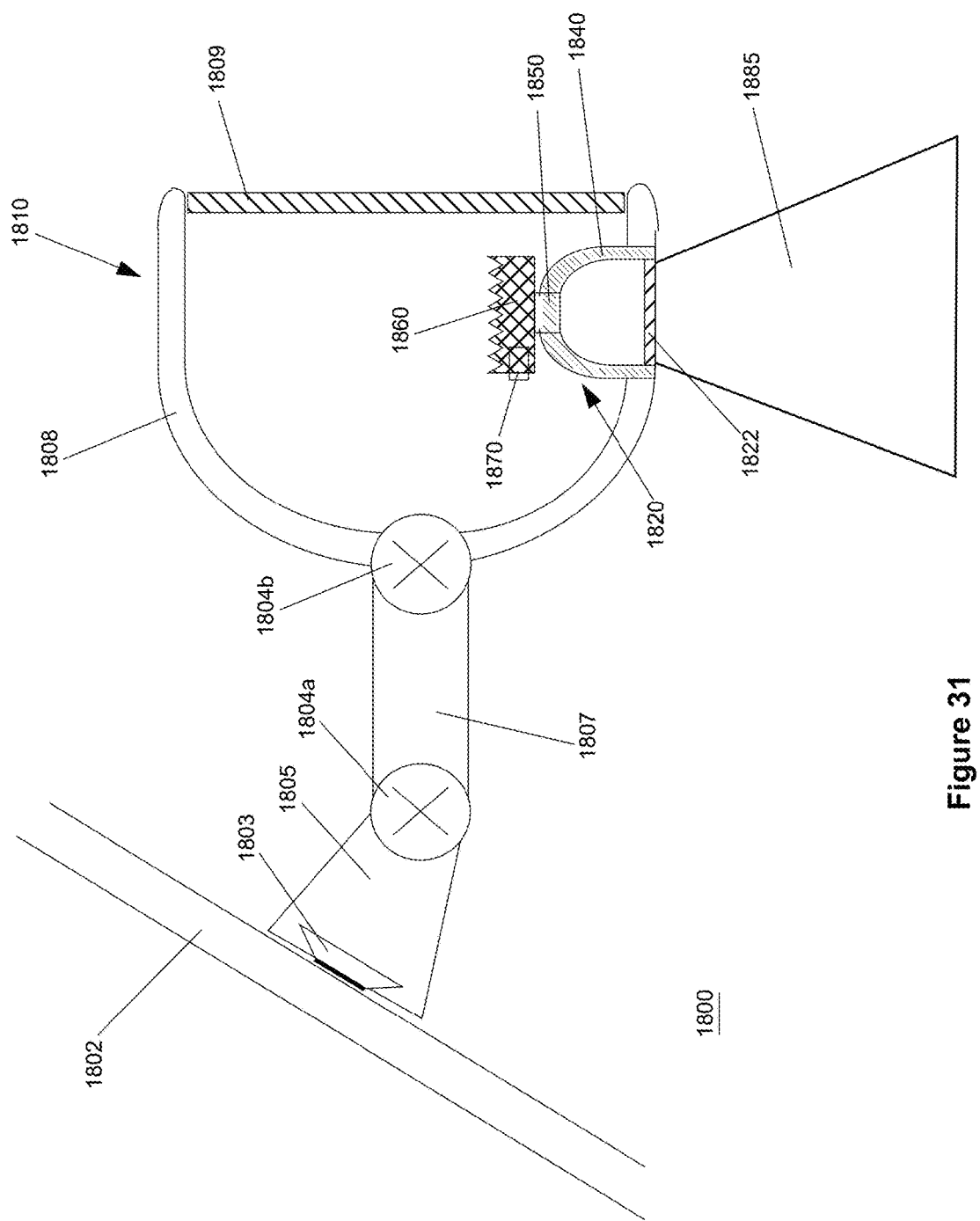
FIG. 31 is a side elevation and partial sectional view of a lighted interior mirror system in accordance with the present invention.

A single high-intensity power LED lighting system 1800 suitable to use in the interior of a vehicle is shown in FIG. 31. An interior mirror assembly 1810 comprises a mirror housing 1808 that includes an interior mirror reflective element 1809 (preferably, an electrochromic reflective element). Mirror housing 1808 is pivotally adjustable about mirror support 1807 that is a two-ball support comprising two pivot joints 1804a, 1804b and a mirror mount 1805 that attaches via mirror mounting button 1803 to windshield portion 1802. A high-intensity single LED light module 1820 is included in the interior cavity formed by the walls of housing 1808 (and located at least partially behind reflective element 1809). Light module 1820 preferably includes a single high-intensity power LED light source 1850 that preferably is a white light emitting high-intensity LED such as the Luxeon™ Star Power LXHL-MW1A white light emitting diode described above. Light emitted by LED source 1850 (when powered) is shaped and directed by reflector 1840 and/or lens 1822 (as described above with respect to module 1300) to form light beam 1885 that preferably is of an intensity such as to illuminate a roughly 1 foot by 1 foot zone (such as at a lap area of a driver or front seat passenger in a vehicle in which mirror assembly 1810 is mounted) at a distance of about 20-40 inches and to an averaged light intensity of at least about 30 lux, more preferably at least about 50 lux, and most preferably at least about 75 lux. Such a high intensity single LED can function as a map light or reading light or courtesy light for a front seat occupant of the vehicle. LED light source 1850 is in thermal contact with a heat sink 1860 (fabricated of materials and preferably with heat dissipating elements, as previously described with respect to heat sink 1340). Vehicle battery/ignition power is provided to light source 1850 via a series power resistor 1870 that preferably has a power rating of at least about 2 watts, more preferably at least about 3 watts and most preferably at least about 4 watts. Preferably, heat sink 1860 functions as a heat sink/heat dissipater for heat generated within series power resistor 1870. Optionally, a direct current (DC) step-down voltage conversion element (such as an MC34063A control circuit or a National LM78S40 switching regulator or a MAX 1627 switching regulator) can be used as an alternate to, or in addition to, series power resistor 1870.

Figure 32:
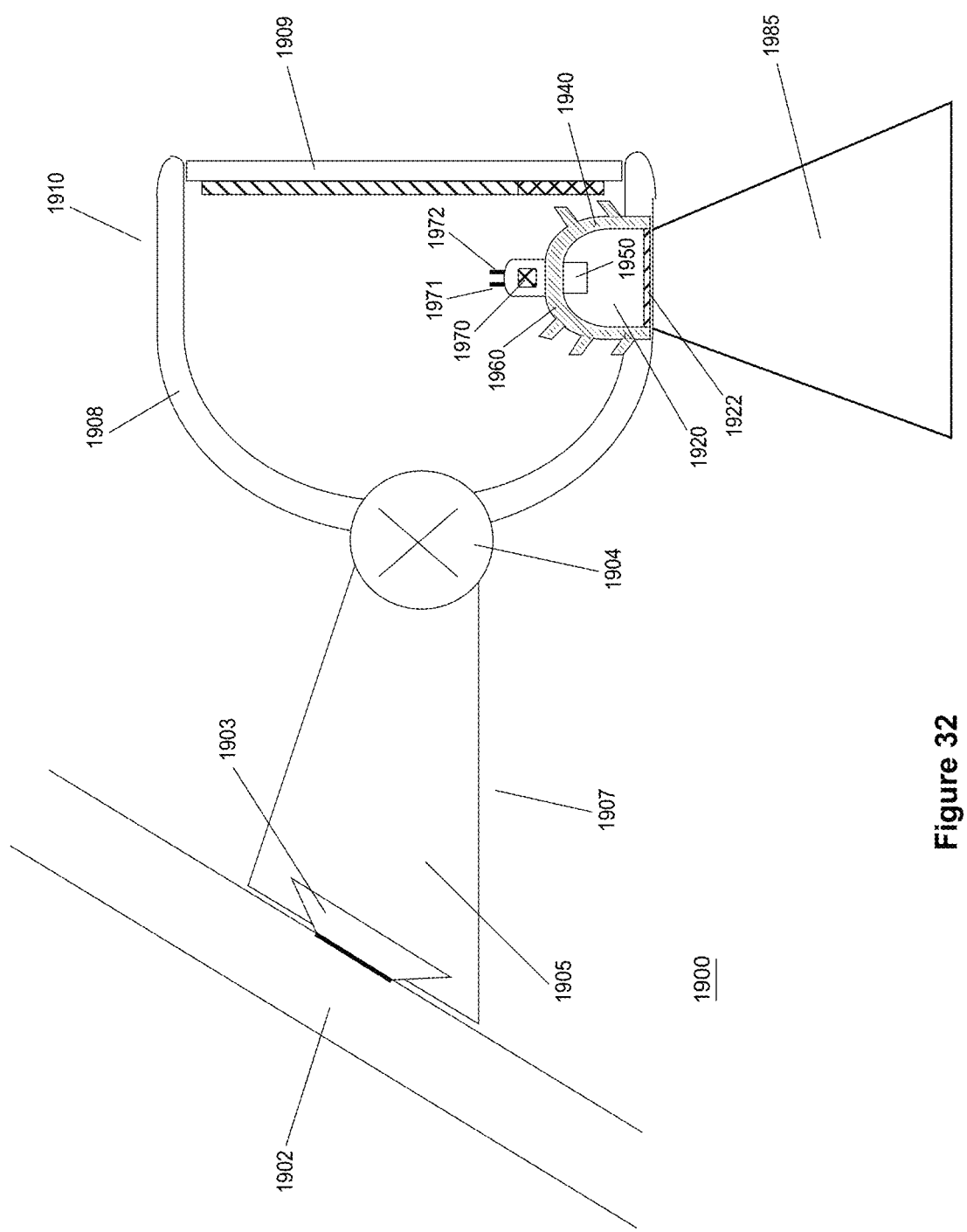
FIGS. 32 and 33 are side elevation and partial sectional views of alternate embodiments of lighted interior mirror systems in accordance with the present invention.

A single high-intensity power LED lighting system 1900 suitable to use in the interior of a vehicle is shown in FIG. 32. An interior mirror assembly 1910 comprises a mirror housing 1908 that includes an interior mirror reflective element 1909 (preferably, an electrochromic reflective element). Mirror housing 1908 is pivotally adjustable about mirror support 1907 that is a single-ball support comprising a single pivot joint 1904 and a mirror mount 1905 that attaches via a mirror mounting button 1903 to a windshield portion 1902. Note that, alternately, a header mounting to a header portion of the vehicle interior above the front windshield, as known in the automotive mirror art, can be used, without affecting the scope of the present invention. A single high-intensity LED light module 1920 is included in the interior cavity formed by the walls of housing 1908 (and preferably located at least partially behind reflective element 1909). Light module 1920 preferably includes a single high-intensity power LED light source 1950 that preferably is a white light emitting high-intensity LED such as the Luxeon™ Star Power LXHL-MW1A white light emitting diode described above. Light emitted by LED source 1950 (when powered) is shaped and directed by reflector 1940 and/or lens 1922 (as described above with respect to module 1300) to form light beam 1985 that preferably is of an intensity such as to illuminate a roughly 1 foot by 1 foot zone (at a lap area of a driver or front seat passenger in a vehicle in which mirror assembly 1910 is mounted) to an averaged light intensity of at least about 30 lux, more preferably at least about 50 lux, and most preferably at least about 75 lux. Such a high intensity single LED can function as a map light or reading light or courtesy light for a front seat occupant of the vehicle. LED light source 1950 is in thermal contact with a heat sink 1960 (fabricated of materials and preferably with heat dissipating elements as previously described with respect to heat sink 1340) that is combined with reflector 1940. Vehicle battery/ignition voltage and power is provided to light source 1950 via plug terminals 1971, 1972 that connect to a direct current (DC) step-down voltage conversion element 1970 (such as an MC34063A control circuit or a National LM78S40 switching regulator or a MAX 1627 switching regulator) that in turn connects to and feeds power (at a voltage typically in the about 1.5-5 volts range and at a current greater than about 100 milliamps, more preferably at least about 200 milliamps, and most preferably at least about 300 milliamps) to high-intensity LED light source 1950.

Figure 33:
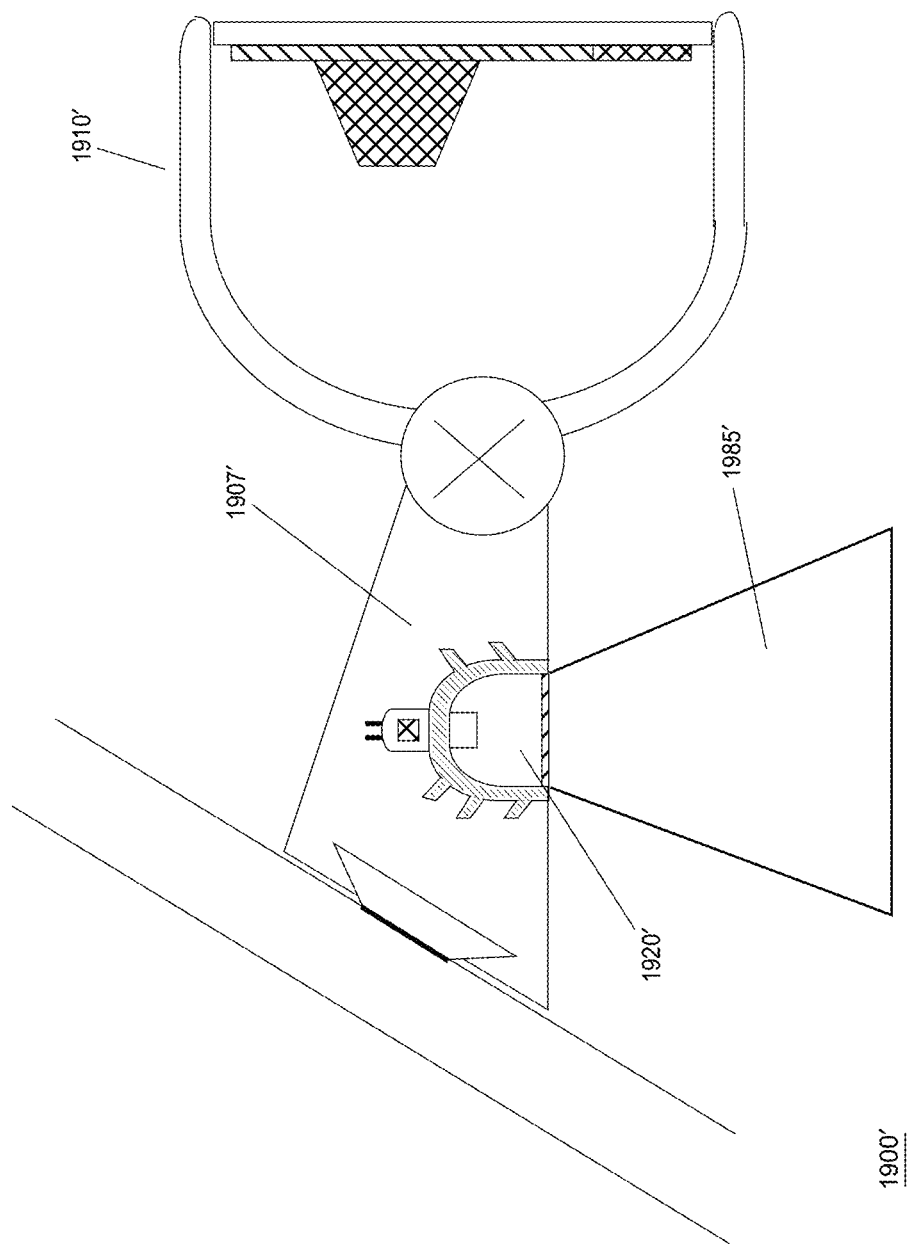

The system 1900' shown in FIG. 33 is similar to that shown in FIG. 32, but with the high-intensity LED light module 1920' of system 1900' positioned in the mirror support 1907' (sometimes referred to as the mirror bracket) of interior mirror assembly 1910', and adapted to project an intense beam 1985' of, preferably, white light down towards a lap area of an occupant of a front seat occupant of the vehicle.

Note that an LED light module such as described above could be included in a pod attaching to the interior mirror assembly or in an accessory module, such as are disclosed in U.S. Pat. Nos. 5,708,410; 5,576,687; 5,255,442; 4,930,742 and 4,807,096; and U.S. patent application Ser. No. 09/793,002, filed Feb. 26, 2001, now U.S. Pat. No. 6,690,268, which are hereby incorporated herein by reference.

It should be understood from the foregoing that the present invention provides an improved non-incandescent light source unit/module suitable for use in a vehicle accessory, such as a lighted interior mirror assembly or a lighted exterior mirror assembly, including a ground illumination exterior mirror assembly, and in other interior lighting applications such as dome lights, rail lights, reading lights, or vanity lighting in a sun visor. The unit is provided as a single or modular assembly that, preferably, can be directly and releasably mounted in the vehicle accessory, such as those disclosed in U.S. provisional Applications Ser. No. 60/263,680, filed Jan. 23, 2001; and Ser. No. 60/243,986, filed Oct. 27, 2000, the entire disclosures of which are hereby incorporated by reference herein.

It should be understood from the foregoing that the present invention provides a high-intensity non-incandescent light source unit/module that, optionally, provides a one-for-one replacement for an incandescent light source in a vehicle accessory, such as a lighted interior mirror assembly or a lighted exterior mirror assembly, including a ground illumination exterior mirror assembly, and in other interior lighting applications such as dome lights, rail lights, reading lights, or vanity lighting in a sun visor. The high-intensity LED lighting unit is provided as a single or modular assembly that can be directly and releasably plugged into a socket of an incandescent light source circuit, and be powered thereby, or can otherwise be incorporated into the vehicle accessory. Alternately, the light source unit/module of the present invention can be connected into other circuits that are connected to the vehicle ignition voltage supply. Furthermore, since LEDs do not typically generate the heat associated with incandescent light sources, more sensitive electronics which have either been heretofore relegated to exterior locations of the interior rearview mirror assembly, or to less desirable locations within the mirror assembly, may be located at more optimal positions within the mirror casing. Moreover, the mirror casing space proximate to the light source unit may be used to house heat sensitive devices, such as electronics.

Also, the present invention can be used for lighting for illumination purposes and the like, and especially for reading lights such as map reading lights, or for instrumentation/console lighting, provided in video mirror assemblies, rearview mirror assemblies, camera assemblies and/or accessory modules (and/or in other vehicular accessories, such as an exterior mirror assembly-mounted ground illumination/security light or in an exterior mirror assembly-mounted turn indicator or brake indicator signal light). Such accessories may include the high-intensity, high-current capability light emitting diodes such as the high-flux LEDs available from LumiLeds Lighting, U.S., LLC of San Jose, Calif. under the SunPower Series High-Flux LED trade name described above.

Suitable LEDs for the light sources of the present invention include a white light emitting light emitting diode, such as described in U.S. provisional Applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Jul. 21, 2000; Ser. No. 60/218,336, filed Jul. 14, 2000; and Ser. No. 60/186,520, filed Mar. 2, 2000; and U.S. patent application Ser. No. 09/793,002, filed Feb. 26, 2001, now U.S. Pat. No. 6,690,268; and Ser. No. 09/585,379, filed Jun. 1, 2000, all of which are hereby incorporated herein by reference in their entireties, including a thermostable LED, which emits the same color light even when the temperature varies. Thus, regardless of the interior or exterior temperature of the vehicle and/or of the accessory equipped with the thermostable non-incandescent light emitting diode source, the same color light is radiated. Such a thermostable white light emitting non-incandescent light emitting diode source can incorporate a trio of red, green, and blue fluorescent materials that together create white light when struck by 380 nm wavelength light from a gallium-nitride LED, and is available from Toyoda Gosei Co. and Toshiba Corp of Nagoya, Japan.

One suitable white light emitting diode (LED) that is thermostable is available from Toshiba America Electronic Components, Inc. of Irvine, Calif., Part Number: TLWA1100. The thermostable white-light LED integrates multiple colored phosphors and a short peak wavelength (preferably, approximately 380 nanometers (nm) in peak spectral output intensity) light-emitting diode junction in a phosphor-mixed transparent resin package to achieve a high luminosity, low power consumption light source. Such thermostable LEDs adopt a technological approach differing from that used in conventional LEDs. Light emission in the visible wavelength band is controlled by excited phosphors, not by using temperature changes in the LED to achieve a change in color output. The fact that the LED emission does not directly determine the color brings advantages in overall controllability and wavelength stability. Incorporated in vehicular accessories such as those disclosed above, the thermostable diode achieves improved tonic reproduction and enhanced color durability during temperature shifts. Such thermostable LEDs utilize a short wavelength light source by reducing the indium in an indium-doped GaN emission layer. This excites red, green, and blue (RGB) phosphors in the transparent resin of the device package to output white light. The RGB balance of the phosphor layer determines the output color, and different colored output can be achieved through modified phosphor balance. The emission light from the LED itself does not directly contribute to the white color. The phosphors used in the new LED offer excellent performance in terms of operating temperature range and color yield. Specifications of such thermostable white LEDs include a compact package (3.2×2.8 millimeter), provided in a Surface Mount Device (SMD). Luminosity is typically about 100 millicandela (mcd) at 20 mA and luminous flux/electrical watt is about 4.5-5.0 lumens per watt at 20 mA. Correlated color temperature is about 6,500-9,000K. Operating temperature is about −40 degrees Celsius-100 degrees Celsius and storage temperature is about −40 degrees-100 degrees Celsius.

Depending on the application, LEDs emitting a colored light can be used, such as high-intensity amber and reddish orange light emitting diode sources, such as solid state light emitting diode LED sources utilizing double hydro junction AlGaAs/GaAs Material Technology, such as very high-intensity red LED lamps (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue can be used, or a combination of individual different colored diodes, such as red, blue, white, green, amber, orange etc. can be used with color mixing thereof to form a desired color or to deliver a desired local intensity of illumination as noted above. Other suitable white emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, filed Nov. 24, 1999, now U.S. Pat. No. 6,329,925, and Ser. No. 09/244,726, filed Feb. 5, 1999, now U.S. Pat. No. 6,172,613, the entire disclosures of which are hereby incorporated by reference herein. A variety of constructions are used including GaAsP on GaP substrate, gallium aluminum phosphide, indium gallium nitride, and GaN on a SiC substrate. Optionally, a plurality of LEDs, such as a cluster of two, three, four, six, eight or the like LEDs (each of the same color or the cluster comprising different colored LEDs), can be used to target and illuminate a local area for higher illumination at that area, such as may be useful in a map light or as a reading light or as an interior light or as an illumination source for an interior vehicle cabin-mounted and monitoring camera (most preferably illuminating the target area with white light). Such a cluster of high efficiency LEDs can be mounted at the mirror mount so as to project an intense pattern of light generally downwardly into the vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. Pat. No. 6,152,590, the entire disclosure of which is hereby incorporated by reference herein.

As described above in connection with system 1400, it is sometimes desirable to mount a signal light behind the exterior mirror reflective element in the exterior mirror assembly, and such as is described in U.S. Pat. Nos. 6,166, 848; 6,257,746; 6,045,243 and 5,788,357, which are hereby incorporated herein by reference. Such incorporation of a signal light assembly such that the turn signal indicator light beam passes through the reflector of the reflective element (either by creating a local high transmission window in the reflector coating of the reflector of the exterior reflective element or by using a dichroic reflector) has the disadvantage of requiring a specialized reflective element specially adapted for this purpose. This approach is particularly disadvantageous for electrochromic exterior mirror reflective elements as dimming of the electrochromic medium in response to detected glare can also attenuate the intensity of the signal light beam(s) passing through the electrochromic medium.

Figure 34:
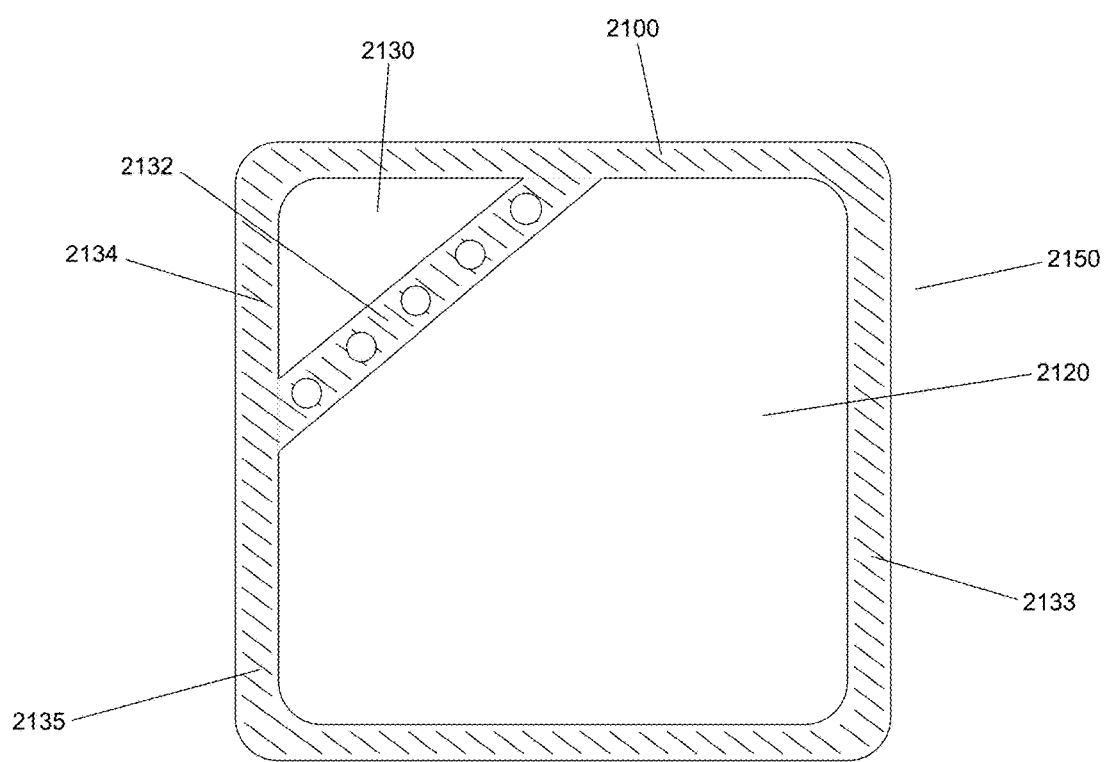
FIG. 34 is a view looking forwardly in the direction of travel of the vehicle of an exterior mirror system having a turn signal in accordance with the present invention.

An improved system 2000 whereby a turn signal element can be included in an exterior mirror reflective element assembly without the above disadvantages is shown in FIG. 34. An exterior mirror reflective element assembly 2150 comprises a bezel frame element 2100 (that typically comprises a molded polymeric structure, such as of a polypropylene material or an ABS material or an ASA material or a nylon material or the like). Exterior mirror reflective element assembly 2150 further comprises a principal exterior mirror reflective element 2120 (that provides the driver principally with a rearward field of view of other vehicles approaching from the rear in the side lane adjacent to the side of the vehicle that the exterior mirror assembly equipped with assembly 2150 is mounted to) and an auxiliary reflective element 2130 adapted to provide the driver with a field of view that extends laterally beyond that provided by reflective element 2120, and so as to function as a blind-spot mirror element. Exemplary constructions and materials suitable to use in assembly 2150 are disclosed in U.S. patent application Ser. No. 09/478,315, filed Jan. 6, 2000, by Lynam et al., now U.S. Pat. No. 6,522,451; and Ser. No. 09/745,172, filed Dec. 20, 2000, now U.S. Pat. No. 6,717, 712, which are hereby incorporated herein by reference.

Figure 35:
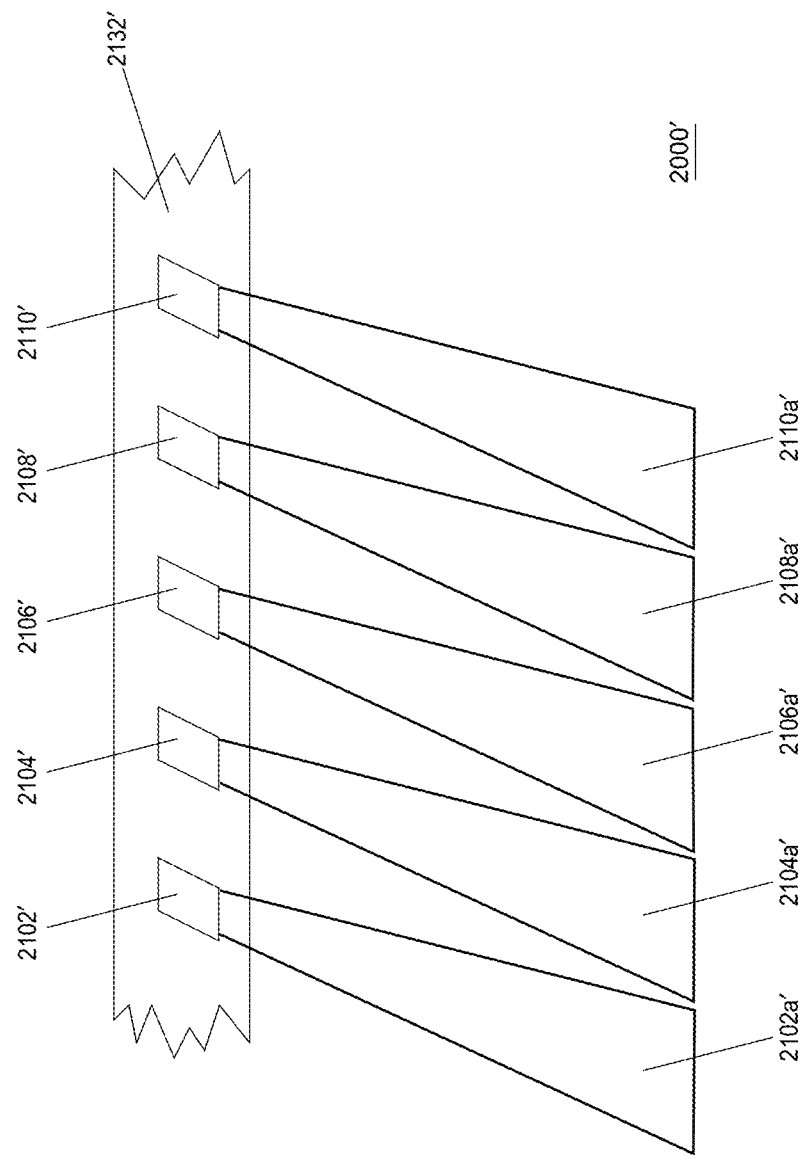
FIG. 35 is a top plan view of a portion of the mirror system of FIG. 34.

Bezel frame element 2100 further includes a plurality of turn signal indicator elements 2102', 2104', 2106', 2108', 2110', preferably located at a bezel frame element portion 2132 that separates and demarcates auxiliary reflective element 2130 (that preferably comprises a wide-angle mirror element and comprises a convex or aspheric metallic-reflective element, such as a chromium coated, bent glass or plastic substrate) from principal reflective element 2120 (that may be a flat, convex or aspheric mirror element, and that preferably comprises an electrochromic mirror element). Turn signal indicator elements 2102', 2104', 2106', 2108', 2110' preferably comprise individual red light-emitting or amber light emitting LEDs such as those disclosed in U.S. Pat. Nos. 6,276,821 and 5,371,659, the entire disclosures of which are hereby incorporated by reference herein. Turn signal indicator elements 2102', 2104', 2106', 2108', 2110' are preferably mounted in bezel element 2100 at an angle so that the light beams emitted (beams 2102a', 2104a', 2106a', 2108a', 2110a' as shown in FIG. 35) are directed horizontally and laterally away from the side of the vehicle (preferably at an angle of at least about 15 degrees to the longitudinal axis of the vehicle) to which the exterior mirror assembly equipped with assembly 2150 is mounted, and so as not to be substantially visible to the driver of the subject vehicle (and so distract when operated at night), but be visible to a driver of another vehicle overtaking the subject vehicle from the rear.

Assembly 2150 is preferably supplied to an exterior mirror assembly manufacturer by a mirror reflective element manufacturer as a sealed module that includes the mirror reflective element(s), any load dropping resistor used in conjunction with the LED turn signal light source(s), any heater pad(s) used in association with the reflective element(s), any interconnection wiring and connector(s), and any backing plate element that attaches to a mirror adjustment mechanism such as an electrically-operated actuator, as is conventional. Thus, a unitary module can be supplied that allows an automaker choose to include a turn signal indicator into an exterior mirror assembly while impacting substantially only the mirror reflective element that detachably attaches to a mirror-adjustment mechanism.

As an alternate to using a plurality of lower-intensity, lower-current individual non-power LEDs as described above, a single high-intensity, high-current power LED can be used along with light piping, heat sinking and low heat-dissipation circuitry such as are described above. Also, turn signal indicator light sources can optionally be placed in alternate, or additional, locations in bezel frame 2100, such as portion 2133, 2134 or 2135 or elsewhere around bezel frame 2100. Further, a portion (such as portion 2132) or all of bezel frame element 2100 can be fabricated of a colored (such as red or amber), light-transmissive material (such as is conventionally used for automotive exterior brake and turn lights), and with the turn signal light sources located in the bezel element radiating from behind and through this colored, light-transmissive material. Also, instead of the dual reflective element assembly shown in FIG. 34, a single reflective element assembly (such as an electrochromic reflective element and assembly disclosed in U.S. Pat. No. 5,151,824, the entire disclosure of which is hereby incorporated by reference herein) can be used, and with the individual turn signal light sources being located in the bezel that holds the reflective element into the reflective element assembly.

Figure 37:
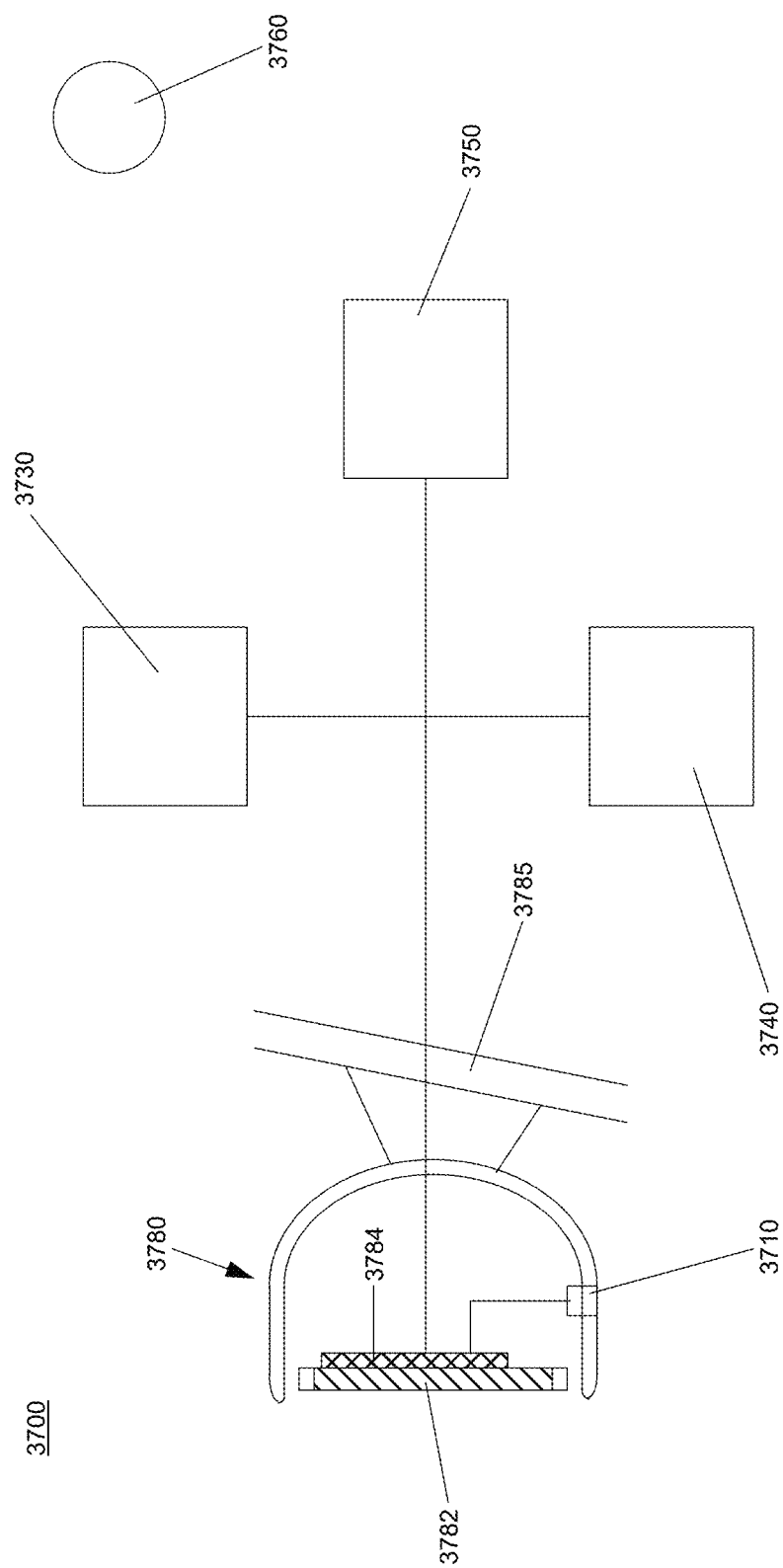
FIG. 37 is a schematic of an improved exterior mirror lighting configuration of the present invention.

Also, where a heater pad (such as is disclosed in U.S. Pat. Nos. 5,446,576 and 5,151,824, the entire disclosures of which are hereby incorporated by reference herein) is used in connection with an exterior rearview mirror reflector in an exterior mirror assembly equipped with a Luxeon™ Star Power high-intensity, high-current power LED system as disclosed herein, at least a portion of the resistive path/heater element that is comprised in such exterior mirror heater pads (that are typically used for defrosting ice and the like accumulated on the exterior of the mirror reflector during sub-zero temperatures) can be electrically connected in series with the high-intensity power LED used so that the heater pad serves as a voltage-dropping element for the power LED and so that any heat being dissipated is beneficially used to heat the exterior mirror reflector. In this regard, and referring to FIG. 37, improved lighted exterior mirror system 3700 comprises exterior mirror assembly 3780 (that attached to vehicle side body portion 3785). Exterior mirror assembly 3780 includes a ground illumination light source 3710 and a mirror reflective element 3782 that is heated by heater element 3784 (typically a PTC heater pad). Ground illumination light source 3710 illuminates when actuated by control 3750 (that is located in the vehicle) but only if not locked-out by lock-out 3730. Control 3750 actuates light source 3710 upon receipt of a signal from actuator 3760 (that, for example, may be a hand-held key fob that wirelessly communicates, such as by RF or IR communication, with control 3750 and such as is disclosed in U.S. Pat. No. 5,371,659, the entire disclosure of which is incorporated by reference herein; or it may be an actuator responsive to the proximity of approach of a person to the vehicle when parked or in response to actuation of a passive entry system of the vehicle). Once actuated by control 3750 (and assuming not locked-out by lock-out 3730 so as to prevent inadvertent actuation when the vehicle is being normally operated on a highway and not parked), light source 3710 illuminates to create a lighted security zone adjacent at least the front door on the vehicle side to which assembly 3780 is mounted until timeout 3740 times out (a timeout period of about 20 to 60 seconds typically, or longer if desired). Preferably, light source 3710 comprises a light emitting diode and preferably, a high-intensity, high-current capability power light emitting diode such as a high-flux LED available from LumiLeds Lighting, U.S., LLC of San Jose, Calif. under the Sun Power Series High-Flux LED trade name. Such high intensity LEDs comprise a power package allowing high current operation of at least about 100 milliamps forward current, more preferably at least about 250 milliamps forward current, and most preferably at least about 350 milliamps forward current through a single LED. Such high current/high intensity LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. For applications such as ground illumination from exterior mirror assemblies and map/reading lighting from interior mirror assemblies or from windshield-mounted accessory modules such as windshield electronic modules or for ground illumination/camera-field-of-view illumination in association with video-based reverse-aids systems or park-aid systems or tow hitch-aid systems, it is preferable to use a single high-intensity power LED source having a luminous efficiency of at least about 7 lumens/watt; more preferably at least about 15 lumens/watt; and most preferably at least about 20 lumens/watt, with such single high efficiency power LED light source preferably being provided in a module that includes a heat sink/heat dissipater and most preferably, that further includes a power regulator such as a series power resistor and most preferably, a DC to DC voltage converter. Such high efficiency power LEDs are available from LumiLeds Lighting, U.S., LLC of San Jose, Calif. under the Sun Power Series High-Flux LED trade name, for example. Preferably LED light source 3710 is connected in electrical series with heater element 3784 such that when vehicle battery voltage/vehicle ignition voltage (currently about 12V nominal but in future vehicles, about 42V nominal or a division thereof) is applied across the series combination, the difference between the desired forward voltage desired to operate light source 3710 and vehicle battery/ignition voltage is applied across heater element 3784 (or a portion thereof) such that heater element 3784 functions as a voltage divider and as a power dissipater that ballasts the application of vehicle battery/ignition voltage to light source 3710. By way of illustration, assume light source 3710 comprises a Luxeon™ Star Power white light power LED with a forward operating voltage of 2.5 volts and passing a forward current of 350 milliamps when operating. With such a light source, and with a 12V vehicle battery, the resistance of heater element 3784 (or a portion thereof) in series electrical connection with the LED light source is chosen to be 30 ohms so that when 350 milliamps is passed by the white light LED (and being in series therewith, also passed by the heater element or portion thereof), a voltage of 10.5 volts is dropped by the heater element (or portion thereof) that functions as a ballast to the high current white light LED. Consequently, power of 3.675 watts is dissipated by the heater element, which power can beneficially heat the mirror reflective element 3784 that heater element 3784 thermally contacts to heat (such as is desirable to remove condensation or frost or the like). Note that such an arrangement when used in a security lighting/ground illumination system such as disclosed in the '659 Pat. incorporated above has the advantage of providing a deicing/defrosting/heating of an exterior mirror reflective element before the driver enters the vehicle and/or the ignition is turned on (conventionally, such heater elements are actuated when the driver enters the vehicle and turns on the ignition). Thus, in the present invention, a driver approaching his or her vehicle can remotely, and at a distance, actuate the security lights in the exterior mirror assemblies on the vehicle, and for as long as these lights are actuated, the heater pads attached to the exterior mirror reflective element assemblies are dissipating energy, and are consequently heating the respective mirror reflective elements and assisting defrosting/demisting thereof. Optionally, heater pad 3784 (or a portion thereof) can be connected with the vehicle battery so that the full vehicle battery voltage is applied thereto (or to a portion thereof) but with such connection and application of the vehicle battery voltage being controlled by control 3750 such that a driver approaching his or her vehicle can remotely, and at a distance, actuate the security lights and/or the heater elements in the exterior mirror assemblies on the vehicle, and for as long as timeout 3740 has not timed-out, the heater pads attached to the mirror reflective elements in the exterior mirror assemblies are dissipating energy, and are consequently heating the respective mirror reflective elements and assisting defrosting/demisting thereof.

It can be appreciated from the foregoing, that the non-incandescent light source unit or module of the present invention provides a one-for-one replacement for an incandescent light source. Therefore, mirror assemblies which have been tooled for incandescent light sources may be upgraded by simply replacing the incandescent light source with the non-incandescent light source unit of the present invention. In addition, the light source unit of the present invention may be configured using a single LED or a single group of light emitting diodes which are arranged in series, or may include two or more groups of light emitting diodes that are arranged in parallel, with each group of LEDs connected in series such that the total voltage drop across the LED is approximately equal to the ignition voltage, typically 12 volts. Optionally, the LEDs can be arranged to have a voltage drop less than in a range of 2 to 16 volts, with a current limiting device, such as resister or another diode or the like, which is connected in series with the group or groups of LEDs. In addition, the non-incandescent light source circuit may include a polarity rectifier that eliminates the polarity of the unit so that it can be plugged in either of the two orientations. Where the light source unit does not incorporate a polarity rectifier, the light source unit preferably includes polarity indicators, such as indentations or bumps, so that an installer will know how to correctly mount the light source unit into the respective electrical receptacle. Furthermore, as previously noted, the LEDs may be integrally molded with socket connectors to ease the assembly process of the light source module. Moreover, the light source module may incorporate a die-on-board or chip upon which junctions are created to form a plurality of discrete LED junctions. Furthermore, the non-incandescent light source unit of the present invention may incorporate a base or configuration suitable for a bayonet type connection, a screw socket, a wedge type connection, cartridge type connection, festoon type connection, ridged loop type connection, or bi-pin connection depending on the application. In addition, as noted previously, the light source unit may include male or female type connectors which cooperate with corresponding female or male connectors of the light source circuit of the mirror assembly. Furthermore, by replacing incandescent light sources with light sources that have directionality, the desired light pattern can be achieved by orienting the light sources—potentially eliminating the need for reflectors and/or optical surrounds. However, for aesthetic reasons, it is desirable to replace the conventional reflectors or optical surrounds with non-reflective or non-optic surrounds to conceal the inside of the mirror assembly.

Also, the non-incandescent light source unit of the present invention can be used in vehicle lighting accessories, such as interior and exterior mirror assemblies, reading lamps, map lamps, interior and exterior lights, and dome lights even when the wiring to the vehicle lighting accessory did not originally anticipate use of an incandescent light source. The provision of the non-incandescent light source unit of the present invention, by including in the unit at least one, and preferably a plurality, of non-incandescent light sources (preferably, LEDs) packaged with a current limiting element, such as a series resistor (and any other associated circuitry such as a pulse width modulation circuit), and with plug-type connectors suitable to mate with a receiving socket of the vehicle accessory (and with vehicle ignition/battery voltage provided across the poles of the receiving socket of the vehicle accessory so that vehicle ignition/battery voltage is applied to the circuitry of the non-incandescent light source unit of the present invention when that unit plugs into the socket of the vehicle accessory) has many advantages, including the ability of a non-incandescent light source unit manufacturer providing a standard non-incandescent light source unit as a unitary, modular unit for use by automakers in various vehicle accessories in and on the vehicle.

As noted in detail in reference to the first embodiment, the concepts of this present invention can be used with interior rearview mirror assemblies (or with accessory module assemblies such as windshield electronics module assemblies) which are equipped with a variety of features and accessories, such as a home access transmitter, garage door opener transmitters, a high/low (or daylight running beam/low) headlamp controller, a hands free phone attachment, a video telephone function, a remote keyless entry receiver, a compass, a seat occupancy detection, map lights or multiple reading lights such as described in commonly assigned U.S. Pat. Nos. 5,669,698; 5,820,245; 5,671,996; 5,813,745; 5,178,448; 4,733,336 and 4,646,210; the disclosures of all of which are herein incorporated in their entireties. Additional features and accessories that may be incorporated into the rearview mirror assemblies (or into accessory module assemblies such as windshield electronics module assemblies) include: antennas, including global positioning system (GPS) or cellular phone antennas, such as disclosed in U.S. Pat. No. 5,971,552, and U.S. Provisional Application Ser. No. 60/187,960, filed Mar. 9, 2000, communication modules or systems, such as disclosed in U.S. Pat. No. 5,798,688, and U.S. Provisional Application Ser. No. 60/199,676, filed Apr. 21, 2000, displays such as shown in U.S. Pat. No. 5,530,240 or in U.S. application Ser. No. 09/244,726, filed Feb. 5, 1999, now U.S. Pat. No. 6,172,613, and application Ser. No. 09/448,700, filed Nov. 24, 1999, now U.S. Pat. No. 6,329,925, blind spot detection systems, such as disclosed in U.S. Pat. No. 5,929,786 or U.S. Pat. No. 5,786,772, transmitters and/or receivers, such as garage door openers, a digital network, such as described in U.S. Pat. No. 5,798,575, a high/low head lamp controller, such as disclosed in U.S. Pat. No. 5,715,093, a memory mirror system, such as disclosed in U.S. Pat. No. 5,796,176, and U.S. patent application Ser. No. 09/572,008, filed May 16, 2000, now U.S. Pat. No. 6,698,905, a hands-free phone attachment, a video device for internal cabin surveillance and/or video telephone function, such as disclosed in U.S. Pat. Nos. 5,760,962 and 5,877,897, a remote keyless entry receiver, map lights, such as disclosed in U.S. Pat. Nos. 5,938,321; 5,813,745; 5,820,245; 5,673,994; 5,649,756; or 5,178,448, microphones, such as disclosed in U.S. patent application Ser. No. 09/361,814, filed Jul. 27, 1999, now U.S. Pat. No. 6,201,642; Ser. No. 09/396,179, filed Sep. 14, 1999, now U.S. Pat. No. 6,278,377; and Ser. No. 09/199,907, filed Nov. 25, 1998, now U.S. Pat. No. 6,717,610, speakers, a compass, such as disclosed in U.S. Pat. No. 5,924,212, seat occupancy detector, a trip computer, an ONSTAR® System or the like, with all of the above referenced patents and applications commonly assigned, the disclosures of which are herein incorporated by reference in their entireties.

Also, the novel non-incandescent lighting means of the present invention can be used to provide lighting for a vanity mirror such as is provided in automotive sun visors and the like. In this regard, and utilizing the "flip-down" mechanisms such as are disclosed in U.S. utility patent application Ser. No. 09/793,002, filed Feb. 26, 2001, now U.S. Pat. No. 6,690,268, and in U.S. utility patent application Ser. No. 09/585,379, filed Jun. 1, 2000, which are hereby incorporated in their entireties herein by reference, a flip-down display assembly affixed such as to the rearview mirror mount (or to accessory module assemblies such as windshield electronics module assemblies) can be provided which may be moved into a position viewable by the driver or passenger from a stored position behind the mirror housing or head, and with the flip-down display assembly including a planar (flat) or curved (convex or concave or multiradius) reflective element (such as a metallized plastic or glass substrate) that provides a mirror function for the purpose of viewing the face of a front seat occupant of the vehicle (such as the driver or front passenger-seat occupant) to monitor appearance, apply lipstick or make up etc. Preferably, and most preferably located in the frame of a housing or frame around the vanity mirror reflective element of the flip-down display assembly, a plurality of white light LEDs (or other colored sources and/or types of illumination) is provided, most preferably with such individual light sources each emitting a beam of light directed away from the eyes of a viewer and towards the area of the face to be monitored (e.g. at the lips for lipstick application). Because of the swivel functionality provided at the flip-down display assembly by such as a pivot joint, the mirror element can be adjusted so as to be directly viewable by either the driver or passenger as required. This can obviate the potentially distracting action of a driver pulling down the sun visor (and thereby obliterating or limiting forward vision) in order to monitor appearance, apply lipstick, tie neckties etc. Note that this concept can include a flip-down vanity mirror assembly (without a concomitant display assembly). Also, a single flip-down mirror-mounted vanity mirror assembly can be used instead of providing dual lighted sun visors (thus saving cost).

Figure 36:
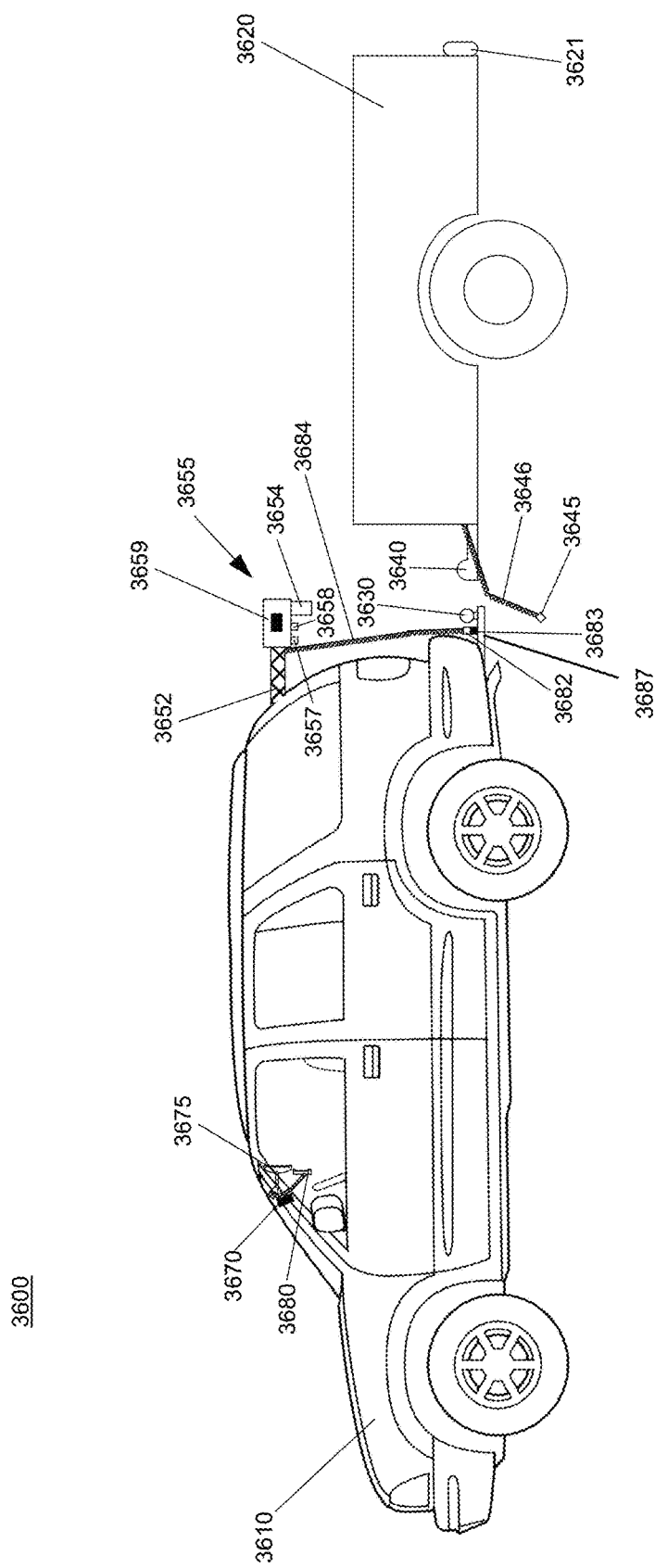
FIG. 36 is a schematic of a vision-based tow hitch aid of the present invention.

Also, the novel non-incandescent lighting of the present invention can be used to provide lighting for vehicular rear back-up vision systems, park-aid vision systems and filed Feb. 26, 2001, now U.S. Pat. No. 6,690,268, and in U.S. utility patent application Ser. No. 09/585,379, filed Jun. 1, 2000, which are hereby incorporated in their entireties herein by reference. For example, at least one (and preferably at least two but no more than four) high-intensity power LEDs (such as LUXEON™ Star Power LEDs described above) can be used in combination with a rear back-up camera systems, as described above. Also, such LED lighting as is described above can be used with a tow hitching vision aid system. In a preferred such system, a video camera module is provided that is attachable to a rear portion of a vehicle (such as at the upper portion of a rear backlite on an SUV-type vehicle or at the rear of the cargo-bed portion of a pick-up truck or at the rear of the rear trunk (and above where the license plate typically attaches) of a sedan car. As shown in FIG. 36 that illustrates a tow hitching vision aid system 3600 of this present invention, video camera module 3655 is adapted for attachment to, and preferably for detachment from, the rear of the vehicle (such as by a suction cup or by suction cups, as known in the art, or by mechanical fasteners and the like) such as by attachment member 3652. The video camera module 3655 includes an imaging sensor 3654 (such as a CCD camera sensor or, preferably due to its low current consumption, a CMOS camera sensor). The video camera module 3655 preferably also includes a wireless transmitter 3659 (such as is available from X10 of Hong Kong, China) that transmits a video image as captured by imaging sensor 3654 by wireless transmission (preferably, by short-range (i.e. less than about 30 meters or thereabouts) wireless radio frequency transmission such as following the BLUETOOTH protocol, or via the IEEE 802.11a wireless local area network standard that preferably uses a 5 Gigahertz frequency band and with a data transfer rate of at least about 10 Mb/sec and more preferably at least about 30 Mb/sec. In this regard, a compact, low-current BLUETOOTH module measuring about 7 mm by 7 mm by 1.8 mm in dimensions, and available from Taiyo Yuden Co. Ltd. of Tokyo, Japan is preferably used. This module is equipped with an RF chip provided by Silicon Wave Inc. that is mounted on a ceramic multi-layer base (having 8 to 9 layers and with inductors or capacitors/condensers embedded in the base) with an installed receiver and using flipchip technology. A wiring pattern is used having thin lines of dimension about 80 microns.) to receiver 3670 located within the interior cabin of vehicle 3610, and preferably located at or adjacent to interior mirror assembly 3675 such as at flip-down video assembly 3680 that, preferably, detachably connects to the mount portion of interior mirror assembly 3675, as described in U.S. patent application Ser. No. 09/793,002, filed Feb. 26, 2001, now U.S. Pat. No. 6,690,268, incorporated herein. The video image as received by receiver 3670 within the interior cabin of the vehicle is preferably displayed on an LCD video screen of flip-down display 3680 (such as is disclosed in U.S. utility patent application Ser. No. 09/793,002, filed Feb. 26, 2001, now U.S. Pat. No. 6,690,268, incorporated above). Note that other display locations are possible for display of the video image wirelessly transmitted from video camera module 3655. For example, a video display located in the front instrument panel can be used, or a video display can be used located in an overhead console. Also, a video display element or screen can be used (such as an LCD display or an emitting display element such as a multi-pixel electroluminescent display or field emission display or light emitting diode display (organic or inorganic)) disposed within the mirror housing of the interior mirror assembly of the vehicle, and located behind the mirror reflective element in the mirror housing, and configured so that the image displayed by the video display element is visible to the driver by viewing through the mirror reflective element. Preferably, and such as is disclosed in U.S. utility patent application Ser. No. 09/793,002, filed Feb. 26, 2001, now U.S. Pat. No. 6,690,268, the mirror reflective element (behind which the video display screen is disposed so that the image displayed is visible by viewing through the mirror reflective element) of the interior mirror assembly preferably comprises a transflective mirror reflector such that the mirror reflective element is significantly transmitting to visible light incident from its rear (i.e. the portion furthest from the driver in the vehicle), with at least about 15% transmission preferred, at least about 20% transmission more preferred and at least about 25% transmission most preferred, while simultaneously, the mirror reflective element is substantially reflective to visible light incident from its front (i.e. the position closest to the driver when the interior mirror assembly is mounted in the vehicle), with at least about 60% reflectance preferred, at least about 70% reflectance more preferred and at least about 75% reflectance most preferred. Preferably a transflective electrochromic reflective mirror element is used (such as is disclosed in U.S. utility patent application Ser. No. 09/793,002, filed Feb. 26, 2001, now U.S. Pat. No. 6,690,268, and in U.S. Pat. Nos. 5,668,663; 5,724,187, the entire disclosures of which are hereby incorporated by reference herein) that comprises an electrochromic medium sandwiched between two substrates. The front (i.e. closest to the driver when the interior mirror assembly is mounted in the vehicle) substrate preferably comprises a glass substrate having a transparent electronic conductive coating (such as indium tin oxide or doped tin oxide) on its inner surface (and contacting the electrochromic medium). More preferably, the front substrate of the twin-substrate electrochromic cell that sandwiches the electrochromic medium comprises a glass substrate having a thickness of about 1.6 millimeters or less; most preferably, about 1.1 millimeters or less. The rear (i.e. furthest from the driver when the interior mirror assembly is mounted in the vehicle) substrate preferably comprises a glass substrate having a transflective mirror reflector on the surface thereof that the electrochromic medium contacts (such a configuration being referred to as a "third-surface" reflector in the electrochromic mirror art). For example, the mirror reflector can comprise a transparent semiconductor/metal conductor/transparent semiconductor multilayer stack such an indium tin oxide/silver/indium tin oxide stack (for example, a third-surface electrochromic mirror reflective element can be used comprising a front substrate comprising an about 1.1 mm thick glass substrate having a half-wave ITO coating of about 12 ohms/square sheet resistance on its inner surface; a rear substrate comprising an about 1.6 mm thick glass substrate having a transflective mirror reflector thereon comprising an about 350 angstrom thick silver metal layer sandwiched between an about 800 angstrom thick indium thin oxide transparent semiconductor layer and another about 800 angstrom thick indium thin oxide transparent semiconductor layer; and with an electrochromic solid polymer matrix medium such as is disclosed in U.S. Pat. No. 6,245,262 (the entire disclosure of which is hereby incorporated by reference herein) disposed between the transflective mirror reflector of the rear substrate and the half-wave indium tin oxide layer of the front substrate. Visible light reflectivity of the transflective electrochromic mirror element is about 60-65%; transmission is about 20-25%. With a TFT LCD video display disposed behind the rear substrate of such a third-surface transflective electrochromic mirror reflective element in a "display-on-demand" configuration, the presence of (and image displayed by) the video display screen is only principally visible to the driver (who views through the transflective mirror reflective element) when the video display element is powered so as to project light from the rear of the mirror reflective element). Preferably, a single high-intensity power LED such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and available from Lumileds Lighting LLC of San Jose, Calif. is used as a backlight for the TFT LCD video screen. Alternately a plurality of such single high-intensity power LEDs (such as an array of two or of four such power LEDs) is placed behind the TFT LCD video screen so that the intense white light projected from the individual single high-intensity power LEDs passes through the TFT LCD element and through the transflective electrochromic element, preferably producing a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes can be used for backlighting and optionally can be used in conjunction with LED backlighting.

When video camera module attached to vehicle 3610 via attachment member 3652, the field of view of imaging sensor 3654 is configured to view ball member 3630 of hitch assembly 3687. Optionally, the field of view of imaging sensor 3654 can be user-adjusted (such as by manually adjusting a swivel/pivot joint of module 3655) once module 3655 is attached to vehicle 3610. At least one light source is provided at module 365 that illuminates generally coaxially with the field of view of imaging sensor 3654 so as to enable viewing of ball member 3630 under low ambient outside lighting conditions such as at night. Preferably two power LED light sources 3657, 3658 are provided for such purpose. More preferably, light sources 3657, 3658 comprise high-intensity power LEDs with a light intensity such as that of the LUXEON™ Star Power LEDs described above, and most preferably comprises white light emitting high intensity LEDs with a light intensity such as that of the LUXEON™ Star Power LEDs described above.

Electrical power to the electronic components of module 3655 (such as imaging sensor 3654, wireless/RF transmitter 3659 and light sources 3657, 3658) can be provided by including a battery power source in module 3655 or by connection to the electrical power system of vehicle 3610. However, and most preferably for Aftermarket uses where wiring to a vehicle power source may be costly or require skill, and/or where the electrical power consumption by the likes of the transmitter 3659 and/or light sources 3657, 3658 might lead to a consumer-dissatisfactory short battery-life, it is preferable that module 3655 be provided with an electrical power lead 3684 that has a connector 3682 (typically a plug terminal 3682) that electrically connects with (typically by plugging into) connector 3681 (typically an electrical socket and often a 7-way standard connector) that is provided on hitch assembly 3687. Connector 3682 of lead 3684 of module 3655 is the same as (or can be equipped with an adapter to become the same as) connector 3654 of lead 3646 that is provided as part of trailer 3620 to allow operation of taillight/stoplight/indicator light 3621 by the battery/ignition power system (and other controls such as the brake pedal, headlight switch and turn signal switch) of vehicle 3610 when trailer 3620 is being towed by vehicle 3610.

Thus, and as an example of system 3600 suitable to use such as in the Aftermarket, the driver of vehicle 3610 purchases a flip-down video display assembly 3680 and a wireless video camera module 3655. When a tow hitch initiation event is contemplated, the driver first reverses the vehicle so that ball member 3630 of vehicle 3610 is close to corresponding hitch member 3640 (sometimes referred to in the art as a trailer tongue) of trailer 3620. The driver then attaches video display assembly 3680 (that includes RF receiver 3670) to interior mirror 3675 (such as by a snap-on connection as disclosed in the above referenced U.S. utility patent application Ser. No. 09/793,002, now U.S. Pat. No. 6,690,268, or alternately, by a detachable attachment member such as a suction cup to the inner surface of the vehicle windshield or to an instrument panel/fascia portion in the front driver/front passenger portion of the interior cabin of the vehicle). Flip-down video assembly 3680 may include its own internal battery for powering and/or can be provided with a power lead that connects into a power-point such as a cigarette-lighter 12V power point provided in the vehicle for powering electrical accessories. The driver next attaches module 3655 to the rear of the vehicle (such as by using a suction cup(s) provided on module 3655). The driver aims the imaging sensor 3654 so that it is generally viewing ball member 3630 of hitch assembly 3687 (and mechanically adjusts if needed). Note that the aiming direction of light sources 3657, 3658 preferably adjust in tandem with any adjustment of the aiming of imaging sensor 3654 so that the light beams emitted by the light sources illuminate the same region being imaged by imaging sensor 3654. Next, the driver plugs connector 3682 of lead 3684 into socket connector 3681 in order to enable powering of module 3655 by the vehicle battery/ignition system. Next the driver sits in the driver's seat of the vehicle, and turns on (if not already on) the vehicle ignition (and if appropriate, turns on the vehicle headlights if such is needed to provide vehicle battery/ignition power to connector 3683 and thereby, to module 3655). The driver can see the image at least of hitch assembly 3687 (and surrounding/adjacent regions) by viewing the video screen of video display assembly 3680 (the video image being captured by image sensor 3654, and being transmitted wirelessly from transmitter 3659 to receiver 3670). Also, light sources 3657 automatically illuminate at least when reverse gear is engaged and preferably all the time when the ignition is on. Note that optionally, video display assembly 3680 can attach such as by a suction cup to the inner surface of the vehicle windshield or to the top of the front instrument panel/fascia. The driver can now reverse and maneuver the vehicle so as to engage ball member 3630 with hitch member 3640 in order to hitch trailer 3620 to vehicle 3610 while viewing the reversing event using video display assembly 3680. Once the hitch joint is correctly established, the driver can exit the vehicle, disconnect plug connector 3682 from socket connector 3683, and connect plug connector 3645 of lead 3646 into socket connector 3683 in order to provide appropriate electrical connection to the trailer while being towed. The driver can then optionally detach module 3655 and flip-down video display assembly 3680, and store for future use. Note that this allows a driver safely hitch a trailer without the need for a second person to act as a "spotter", and with the driver being able to guide successful hitching by viewing the image as presented within the interior cabin while reversing/maneuvering the vehicle. Note the present invention allows this be achieved without a need for "hard-wiring" to the vehicle. It also allows use of an RF transmitter and other electrical/electronic elements in module 3655 of relatively large power/current consumption without concern of running down a local battery source. Note also that optionally, video camera module 3655 may be attachable to (or more preferably incorporated in) hitch assembly 3687. Thus, for example, the manufacturer of hitch assembly 3687 can include a video camera module such as module 3655 as part of hitch assembly 3687, and with the field of view of video imaging sensor 3654 (that may comprise a CMOS or CCD imaging array) directed to view (or adjustable to view) the approach of hitch element or tongue 3640 to ball hitch element 3630 (and preferably illuminated by, for example, a single high-intensity power LED light source such as the LumiLeds parts described above). Used in conjunction with an interior cabin-located video screen that is viewable by the driver (for example, a flip-down DVD-entertainment screen now common in overhead consoles areas, or a navigational display screen in the front instrument panel/fascia, or a display-on-demand video screen behind the interior mirror reflective element, or a flip-down video display assembly attachable to the interior mirror assembly or elsewhere in the cabin of the vehicle), a wired or, preferably, wireless video camera module incorporated into the hitch assembly can be advantageous for original equipment manufacturers' (OEMs') provision of a tow-check feature in vehicles in that the consumer can buy the tow-check camera as part of the tow-hitch assembly itself (or attachable thereto).

Optionally, distance measuring sensors such as ultrasonic distance measuring sensors may be included as part of module 3655 or as part of hitch assembly 3687. For example, two spaced ultrasonic sensors can be utilized on hitch 3687 that detect the distance to and/or the orientation of the vehicle to the trailer that the driver is reversing towards to establish a hitch connection. The distance to and/or orientation information (such as whether the trailer is more to the left or the right of the vehicle) can be displayed at an information display (such as a digital information display of distance or a graphical display of distance or an indicia of orientation/distance, such as an LED coded to indicate whether the trailer is to the left or right) viewable by the driver in the vehicle cabin (such as at the display at the interior mirror or at the driver's side exterior mirror or as a display at a flip-down video screen or as a graphic overlay on an image displayed on the video screen viewable by the driver, such as a flip-down video screen).

Also, the non-incandescent lighting of the present invention can be used in battery-operated accessories, such as the solar-powered rechargeable battery operated added-feature interior mirror assemblies disclosed in U.S. utility patent application Ser. No. 09/793,002, filed Feb. 26, 2001, now U.S. Pat. No. 6,690,268, which is hereby incorporated herein by reference. For example, an electrochromic interior mirror assembly that is battery operated can be provided, and preferably a compass electrochromic interior mirror assembly and most preferably a compass/temperature electrochromic interior mirror assembly. Such battery-powered assemblies can be provided as a "clip-on" assembly that clips-onto (and thus is supported by) an existing interior mirror assembly in the vehicle (typically a low-cost and low-feature prismatic "flip" mirror assembly). In these regards, it can be desirable to utilize, as a battery source the same rechargeable battery power pack used by a cellular phone (such as a Nokia cellular phone or a Motorola cellular phone) or that is used for a similar widely used handheld accessory such as a Palm Pilot PDA (an advantage being that rechargers are commonly available and used). For example, a clip-on EC compass/temp mirror assembly (with the compass/temp display being provided in a "chin-area" region of the bezel) can be provided powered by at least one Lithium-ion battery (such as a Nokia battery used in a Nokia cellular phone), and preferably by at least two connected in series. The clip-on mirror assembly also preferably includes a self-contained charger (or multiple chargers), and most preferably a "cigarette lighter" power cord that allows powering of the battery recharger integrated into the clip-on assembly by connection to a power point (typically 12V) commonly provided at the instrument panel/fascia in automobiles. The clip-on compass/temp mirror assembly includes therewithin a compass sensor such as magnetoresponsive sensor such as a magnetoresistive sensor such as is disclosed in U.S. Pat. No. 5,255,442, the entire disclosure of which is hereby incorporated by reference herein (and preferably with the sensor tilted at an angle of about 10 degrees). The display element of the clip-on compass mirror assembly can be a vacuum fluorescent display element or, preferably due to its low current consumption, a liquid crystal display element. Optionally, a DC to DC converter can be used to convert the voltage output of the battery power pack (for example, about 3.6V for some cellular phone battery packs) to a higher or lower DC voltage level in order to suit the particular circuitry used in the clip-on assembly.

Also, any of the vehicular accessories disclosed above, such as interior rearview mirror assemblies and accessory modules such as windshield electronics modules and having at least a portion with a view through the front windshield of the vehicle, can include ultra small information displays such as are disclosed in U.S. Provisional Application Ser. No. 60/314,457, filed Aug. 23, 2001, the entire disclosure of which is hereby incorporated by reference herein. Such ultra-small displays may be of a transmissive-type or a reflective type. For example, the ultra small liquid crystal display (LCD) available from Kopin Corporation of Taunton, Mass. is a transmissive type. Kopin utilizes silicon-on-insulator SOI wafers to build transmissive displays. Kopin's product and utilizes thin monocrystal silicon thin film transistors Si-TFT of several microns peeled off from the circuit board to filters out light, and employs a field sequential method, which shows images in accordance with sequentially changing red, green, and blue. It has a high degree of transmissivity because it does not need color filters. Image quality depends on color purity of the light emitting diode used as the illumination source.

Figure 38:
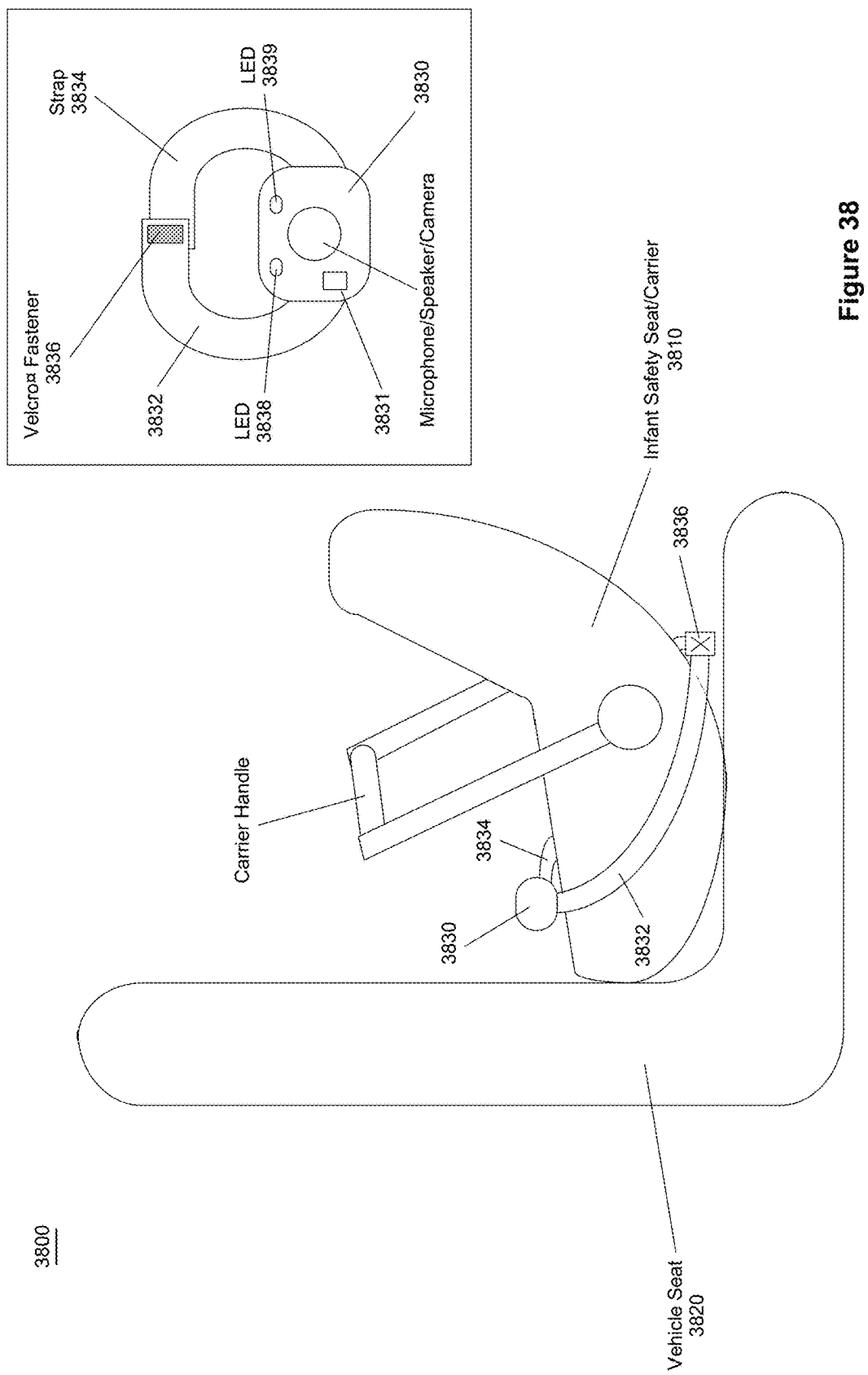
FIG. 38 is a schematic of an improved child monitoring system of the present invention.
Figure 39:
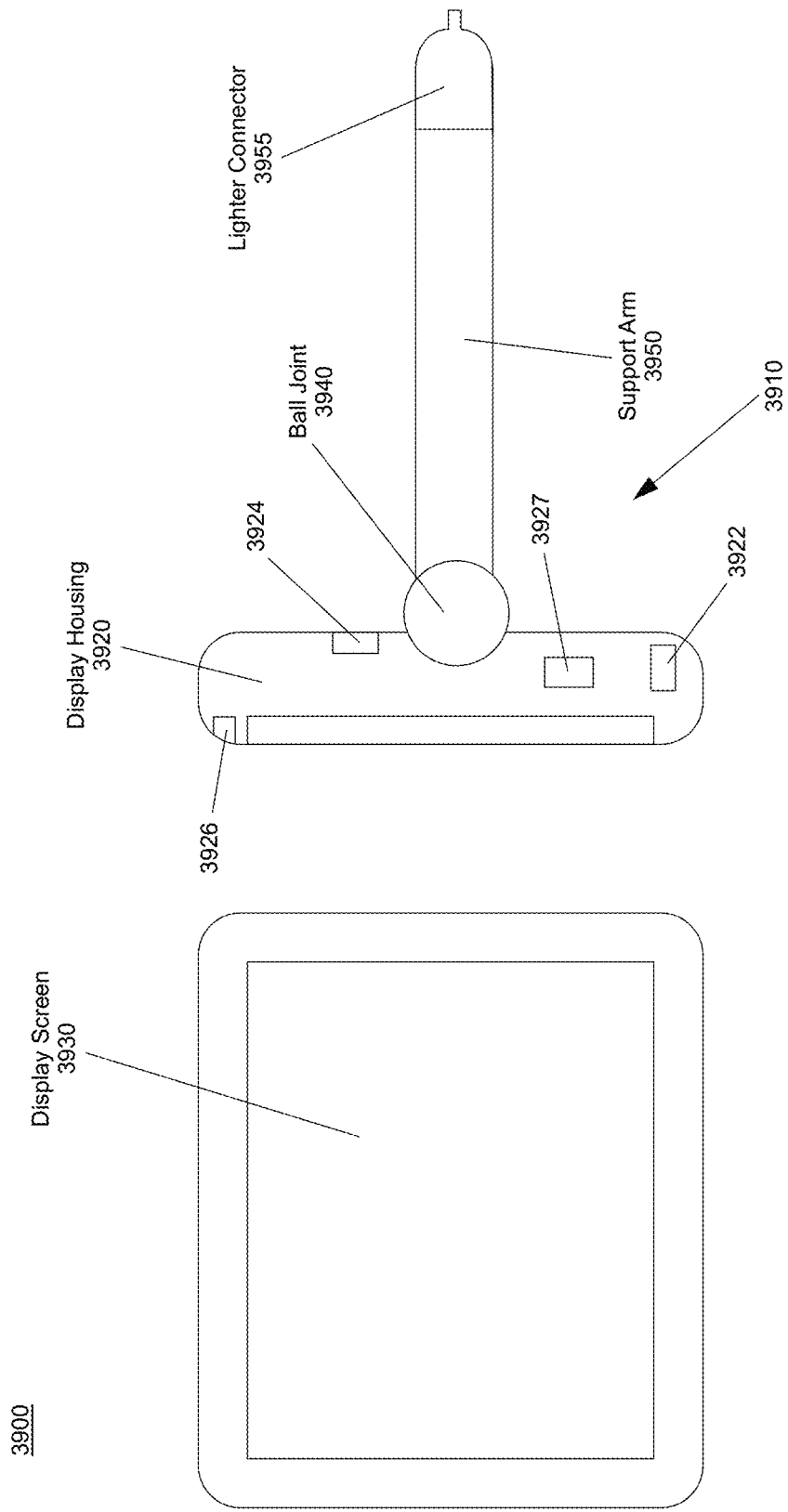
FIG. 39 is a schematic of an improved video display system of the present invention.
Figure 40:
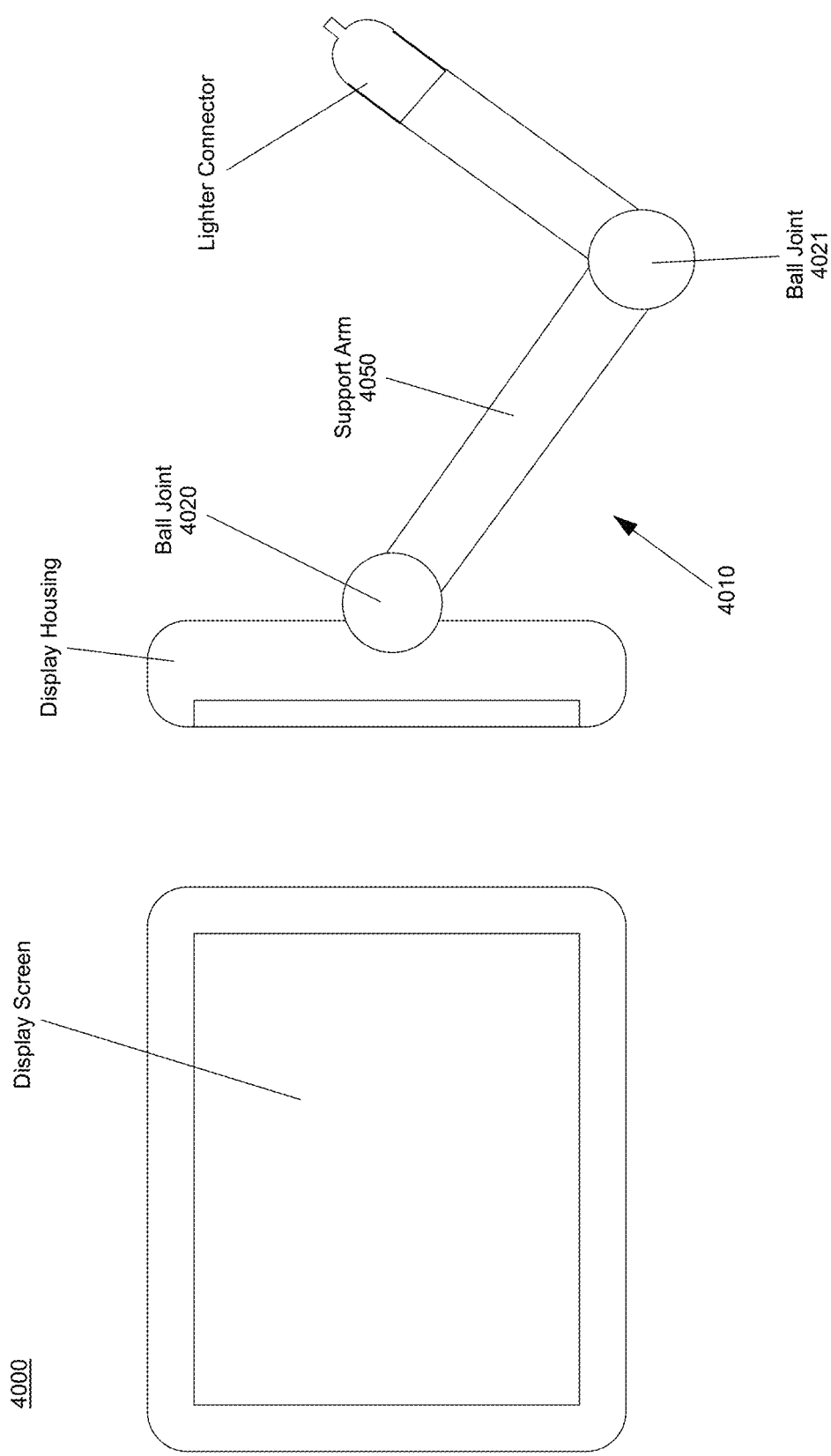
FIG. 40 is a schematic of an improved video display system of the present invention.
Figure 41:
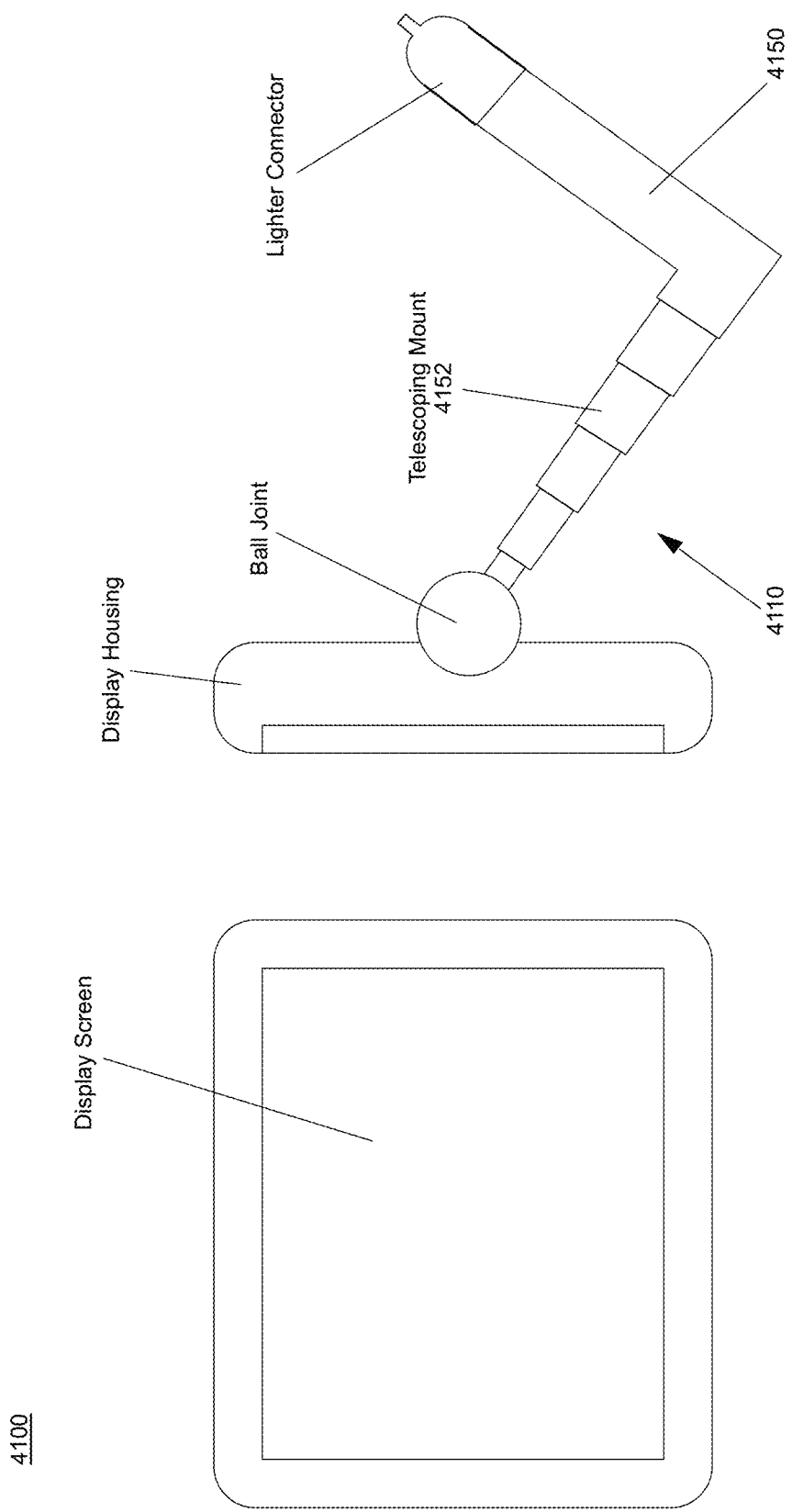
FIG. 41 is a schematic of an improved video display system of the present invention.

Also, the lighting disclosed in the present invention can be used with vehicular interior cabin surveillance and monitoring systems, such as are disclosed in U.S. utility patent application Ser. No. 09/793,002, now U.S. Pat. No. 6,690, 268. For example, and referring to FIG. 38, a child/baby monitoring system 3800 is disclosed including a child seat 3810 placed on a vehicle seat 3820 (typically, a vehicle rear seat). Child monitoring module 3830 is attachable to child seat 3810 (or to seat 3820) using straps 3832, 3834 that join at clasp 3836. Clasp 3836 can comprise a Velcro® fastener or can comprise a buckle-type fastener. Beneficially, module 3830 can be attached to and detached from child seat 3810 (or, optionally, another structure in the vehicle cabin such as vehicle seat 3820) as desired without a need for substantial modification of the vehicle interior; thus, being well-suited for Aftermarket and temporary installations/uses. Module 3830 includes at least one of a camera (that has a field of view that is directed to view a child seated in child seat 3810) and at least one microphone adapted to pick up whatever sound/speech emanates from the child. Module 3830 can also include an amplifier/speaker that would allow, for example a mother driving the vehicle to talk to the baby seated in the rear-seat located baby seat. Module 3830 also preferably includes light sources 3838, 3839 that provide illumination of the baby seated in baby seat 3810. For example, near-infrared illuminating LEDs can be used and/or a single high intensity, high current LED can be used such as a LumiLed Luxeon™ Star Power LED disclosed above. Beneficially, module 3830 is self-contained (for example, it may include its own battery-pack and/or recharger/power cord adapted for plugging into a "cigarette-lighter" power outlet (such as are found in vehicles)), and contains whatever electrical/electronic circuitry is required. Module 3830 may optionally include a wireless transmitter/receiver 3831 (such as an RF transmitter and/or an RF receiver, such as a short-range RF transmitter and/or receiver that follows a BLUETOOTH or a IEEE 802.11a or similar short-range communication protocol). Thus, module 3830 can wirelessly send images and audio/sounds from the baby in car seat 3810 for view and hearing by a driver of the vehicle and/or receive images or sounds from the driver. Alternately, a wiring harness can be provided that physically (and electrically) connects module 3830, such as by a multi-wire ribbon harness, to a display and/or audio system elsewhere in the vehicle (typically in the front driver/passenger area). A display system 3900 suitable for use in conjunction with system 3800 is shown in FIG. 39. Display system 3900 includes video display assembly 3910 that includes an adjustable/moveable housing 3920 (that includes video display screen 3930) that is adjustable in multi-directions about support arm 3950 via swivel/pivot joint 3940 (for example, a ball joint). Support arm 3950 terminates in plug connector 3955 that is adapted to make electrical connection to a standard power outlet located at the instrument panel/fascia portion of the interior cabin of the vehicle (typically, a "cigarette-lighter" power outlet delivering battery/ignition voltage to power accessories) to supply power to circuitry of assembly 3910. Assembly 3910 can include (for example, housed in housing 3920) a microphone 3922 and an audio loudspeaker 3924 that allows the driver audibly communicate with a child seated in a rear seat (such as in a baby seat) and/or hear audible sounds emanating from such a baby. Video display assembly 3910 can include various accessories (such as a camera 3926), and can include a wireless receiver and/or transmitter 3927 that complements what is disclosed above in connection with system 3800. Video display assembly 4010 of system 4000 shown in FIG. 40 is similar to assembly 3910, but includes two pivot joints 4020, 4021. Video display assembly 4110 of system 4100 shown in FIG. 40 is similar to assembly 3910, but support arm 4150 includes a telescoping mount 4152. Systems such as 3800 and 3900-4100 are particularly well suited for Aftermarket installations as the need for "hard-wiring" can be eliminated. Such systems allow a driving mother and her small baby seated in a rear-facing baby seat maintain continuous communication to reinforce each other's presence (sometimes this is inhibited due to the legal requirement to place children in the front or rear facing baby seats with the rear seat behind the mother's back). Module 3830 of system 3800 can, optionally, be provided with a video display screen that displays the image of the driver as captured such as by a camera, for example, on housing 3920 of assembly 3910. Also, placing a microphone and/or a speaker at the front of the vehicle, either in front of the driver-mother's face (such as at an interior mirror assembly) or above her head (such as in a header or overhead console region) or in a side pillar (such as an A-pillar) or other location where a microphone(s) can pick up the mother's voice and where the mother can readily hear noises from the baby is beneficial and, preferably, combining this with a microphone and speaker located in and/or around the vicinity of the baby seat. Communication between locations accessed by the driver-mother and the baby/child in the rear baby seat can be by wired communication (regular cable, coaxial cable fiber optic or modular pulse carrying cable including twisted pair) or by wireless communication (using RF, IR, BLUETOOTH, IEEE 802.11a or another short-range communication method). Cameras, speakers, light sources and/or microphones for such systems can be in a number of locations including built into and/or on or attached to the baby seat; built into the vehicle seat; built into the interior rearview mirror assembly; built into a windshield-located electronics accessory module; built into the A, B, C, or D pillar; and/or built into a dome or side rail lamp. Additionally, and as described above, the module including the camera, light source(s), microphone and/or speaker can be portable with Velcro or flexible means of detachable attachment to the rear or the overhead location for a particular vehicular situation. For example, a speaker with a microphone attached to a Velcro belt can be affixed to a location such as the handle of a child safety seat or the headrest of a car seat, preferably also combined with a camera system. Any type of speaker can be used but particularly good performance is anticipated with a miniature speaker, with a flat speaker type of the solid-state type such as is available from Panasonic of Tokyo, Japan preferred. Where appropriate, such systems can also be combined with ONSTAR® microphones used with ONSTAR®-type mirrors and/or ONSTAR® microphones located elsewhere in a vehicle. Such systems can also be combined with other speakers located in the vehicle such as for the entertainment system build into the vehicle or portable entertainment systems brought into the vehicle by the user. Optionally, when the sound system of the vehicle is muted or turned on only for the driver or passenger to hear, then the sound level/audible pick-up from the baby can be displayed on a video screen visible to the driver in the vehicle via a graphic overlay on a screen in the vehicle. Such systems disclosed above can be combined with a screen visible to the baby, which displays either a live video image of the parent or a fixed/still image of the parent to provide a visual re-enforcement of the presence of the parent to the baby. This could also be accomplished using a "heads-up" display device. Such systems can be combined with systems that monitor a child at a location located outside the vehicle (such as in a picnic situation, soccer game, or home). Such systems can include a hand-held video display device such as a portable TV or PDA such as a Palm Pilot®.

Figure 42:
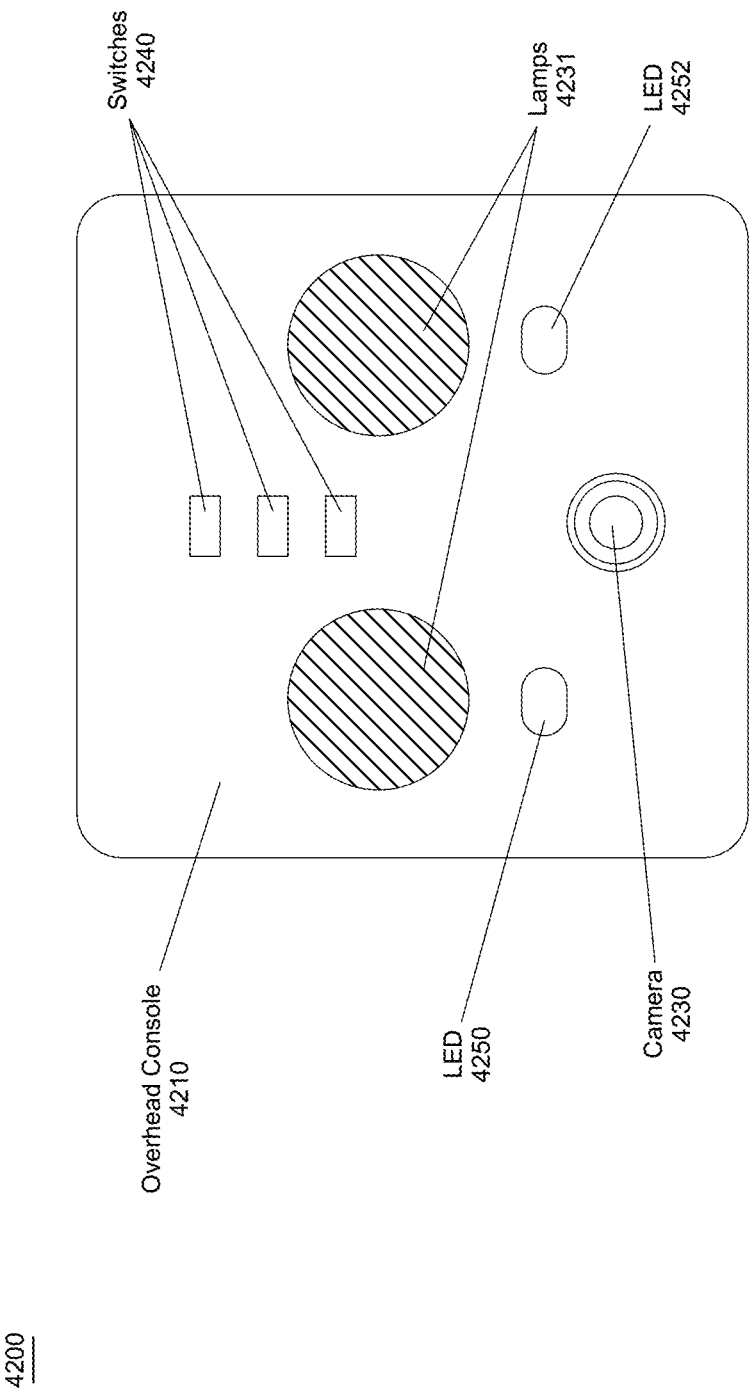
FIG. 42 is a schematic of an improved overhead console/dome light system of the present invention.

Also, the lighting of the present invention can be used with an overhead console system 4200 such as is shown in FIG. 42. Overhead console/dome light assembly 4210 includes at least one light 4231 for general/task illumination that preferably comprises a high current high-intensity LumiLeds Luxeon™ Star Power high-intensity power LED (and heat sink and/or DC to DC converter) as disclosed above. Assembly 4210 also includes switches 4240 and camera 4230. LED light sources 4250, 4252 are provided and are adapted to illuminate the portion of the vehicle interior (such as a baby seat on a rear seat) imaged by camera 4230.

Also, the novel lighting of the present invention can be used in conjunction with tire pressure monitoring systems such as are disclosed in U.S. patent application Ser. No. 09/710,016, filed Nov. 10, 2000, now U.S. Pat. No. 6,445, 287, and disclosed in U.S. patent application Ser. No. 09/513,941, filed Feb. 28, 2000, now U.S. Pat. No. 6,294, 989, the entire disclosures of which are hereby incorporated herein. For example, a high current high-intensity LumiLeds Luxeon™ Star Power power LED (and heat sink and/or DC to DC converter) as disclosed above, and preferably a white light emitting high current high-intensity LumiLeds Luxeon™ Star Power LED (and heat sink and/or DC to DC converter) as disclosed above, can be used as a wheel tire pressure status indicator on the exterior of the vehicle (such as part of an exterior mirror assembly). Also, a high current high-intensity LumiLeds Luxeon™ Star Power LED (and heat sink and/or DC to DC converter) as disclosed above, and preferably a white light emitting high current high-intensity LumiLeds Luxeon™ Star Power LED (and heat sink and/or DC to DC converter) as disclosed above, can be used to provide task lighting (such as map/reading lighting) from an accessory module such is disclosed in U.S. patent application Ser. No. 09/710,016, filed Nov. 10, 2000, now U.S. Pat. No. 6,445,287, and in U.S. utility patent application Ser. No. 09/793,002, filed Feb. 26, 2001, now U.S. Pat. No. 6,690,268, which are hereby incorporated in their entireties herein by reference.

The novel light emitting diode lighting of the present invention encompasses both inorganic LEDs and organic LEDs.

Figure 43:
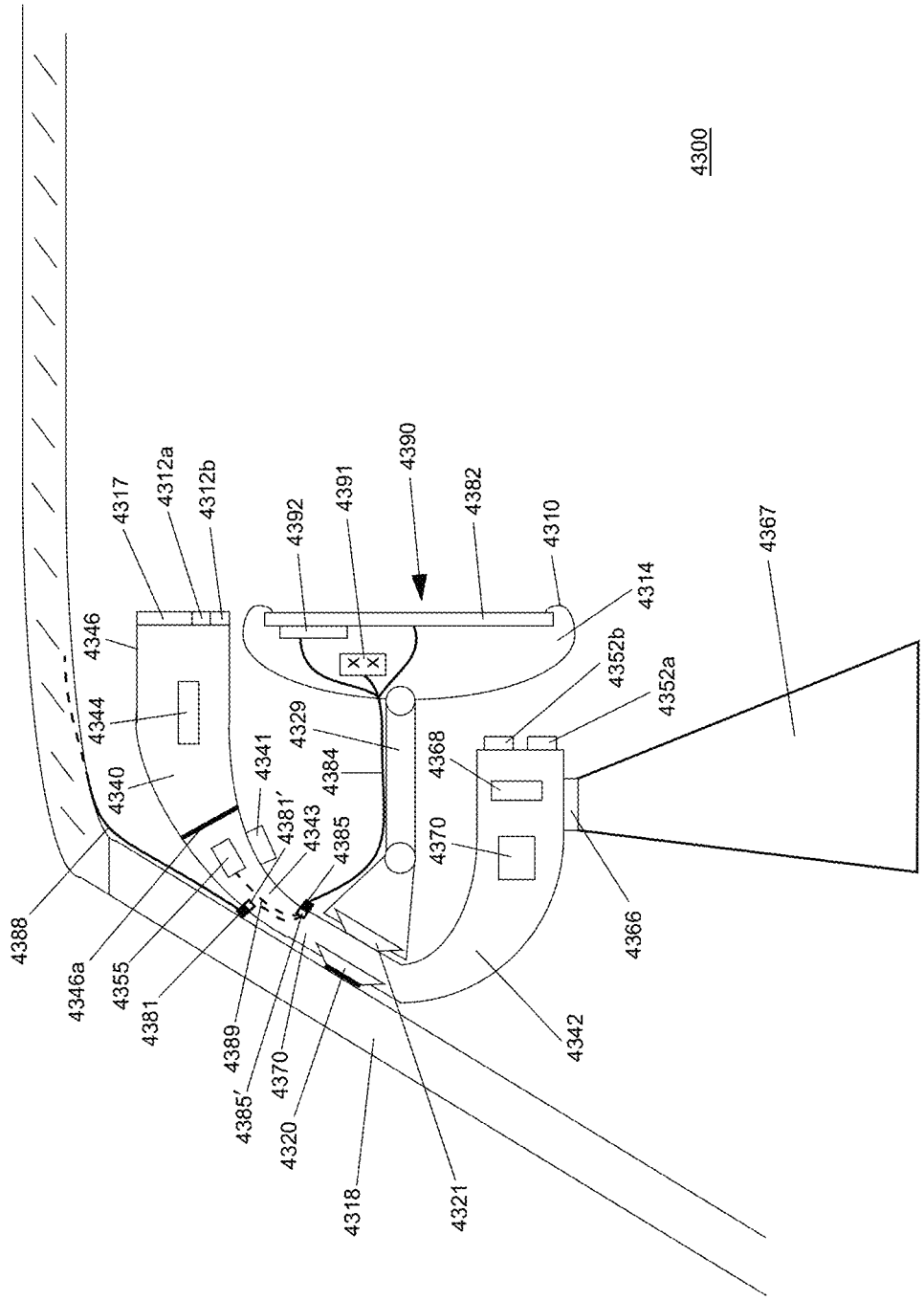
FIG. 43 is a schematic of an improved lighted windshield electronics module system of the present invention.

An accessory module system comprising a lighted windshield electronic module system 4300 is shown in FIG. 43. System 4300 comprises a windshield electronics module assembly 4370 that detachably attaches (such as by a breakaway joint) to attachment member 4320 (preferably, a mirror-mounting button as known in the interior mirror art and as commonly used on the likes of MY2002 General Motors and Ford vehicles such as the Ford Taurus and Cadillac STS) that is attached (typically adhesively via such as a polyvinyl butyral adhesive or a silicone adhesive or a modified epoxy adhesive) to the inner surface of windshield 4318. Module assembly 4370 includes a second attachment member 4321 that preferably is of the same construction and configuration as attachment element 4321, and to which interior mirror assembly 4390 (that may include circuitry/ accessory 4391) detachably attaches (preferably via a breakaway joint). By making attachment members 4320, 4321 the same, mirror assembly 4390 that typically is adapted to mount to attachment member 4320 can now mount to attachment member 4321. Module assembly 4370 includes an upper portion 4340 configured to be viewable and accessible above housing 4314 of mirror assembly 4390. User-actuatable buttons 4312a, 4312b are provided at upper portion 4340 to allow, for example, actuation by the driver of the controls to access a wireless telecommunication system of the vehicle such as a cellular phone system (such as a BLUETOOTH-enabled cellular phone system of the vehicle) or a telematics system such as ONSTAR® or RESCU™ or the like. Optionally, circuitry 4344 associated with such user-access buttons and the like is included in module 4370. Upper portion 4340 also optionally includes a microphone 4371 (or multiple microphones and/or a sound acquisition system as previously described) functional as part of an audio system of the vehicle such as a wireless telecommunication system such as a BLUETOOTH-enabled vehicular cellular phone system or an ONSTAR® system or the like. An information display 4317 (such as a compass display or a PSIR display, as known in the automotive art) can be included in upper portion 4340 of assembly 4370. Optionally, a swivel or pivot joint 4346a can be included to allow orientation of the viewing angle of display 4317 and/or the line-of-access of buttons 4312a, 4312b to suit a driver's and/or front passenger's preference/needs. Alternately, the orientation of upper portion 4340 can be fixedly configured and canted so as to be facing generally towards the driver seated in the driver seat (or, alternately, fixedly configured and preferably canted towards the front seat passenger). Accessory 4355 can be included in module 4370 (for example, a compass sensor or an antenna or a CMOS smart headlamp controller or any of the accessories disclosed above). Optionally, module 4370 includes a lower portion 4342 that, preferably, is generally disposed behind housing 4314 of mirror 4390, and not unduly protruding into the forward line of sight of the driver through windshield 4318 below mirror assembly 4390. Electronic accessories 4370, 4365 (that can be any of those disclosed above such as a contacting or non-contacting rain sensor or a video-based non-contacting rain sensor/fog detector or a HomeLink® trainable garage door opener) can be included in module 4370. User-access buttons 4352a, 4352b can be provided to allow user-actuation of various accessories, including of those housed in module 4370. An interior lighting assembly 4366 (preferably a module comprising a single high-intensity white light emitting power LED, as described above, and preferably including a series power resistor and/or a heat dissipation element and/or a DC to DC voltage converter and/or a pulse-width modulation power source) is included in module 4370, and adapted to project light beam 4367 to illuminate a portion of the vehicle interior below the interior mirror assembly (such as a knee/lap area of the driver and/or front passenger for reading/map reading purposes or a floor/gear shift console area or the like). Using the system shown in FIG. 43, features such as sound acquisition microphones and telematics user-access buttons can be provided in a stand-alone windshield electronics module, and a "standard" and separate interior mirror assembly can be utilized without the need to customize the interior mirror assembly with microphones and/or buttons. Note that the walls of module 4370 are sufficiently rigid such as being fabricated from a reinforced molded polymer such as a glass or mineral-filled nylon or from a metal material (or made sufficiently rigid such as via struts and similar reinforcing/stiffening elements such as metal bars or sheets molded in or attaching to a polymer outer cladding) and/or vibration dampening elements are utilized such that vibration of the mirror reflector in the mirror assembly attaching to module 4370 is minimized or eliminated. Module assembly 4370 received battery/ignition power (as well as, optionally, various control and input/ output communication lines) from the vehicle by accessory module wire harness 4388 in order to provide electrical powering of accessories within module 4370 and/or to provide pass through powering/control of/control by/communication with of any accessory connected to or mounting to module 4370 (such as mirror assembly 4390). Wire harness 4388 can optionally include various control lines and input/output lines from and to various accessories in module 4370 (or attaching to module 4370) and from/to various vehicle accessories (including a fiber optic link carrying data such as video data and the like and/or a connection to a vehicle CAN/LIN system for mutiplexing/networking within the vehicle). Wire harness 4388 connects via plug 4381 to a socket connector 4381' provided at module 4370 (or vice versa). Mirror assembly wire harness 4384 terminates in a socket connector 4385 (such as a 7 or 12-pin connector) that connects with a plug 4385' provided at module 4370. Preferably, plug 4381 is configured/constructed so as to also connect with socket connector 4385. Thus, an automobile manufacturer, or an installer in the Aftermarket, can readily add module 4370 to an existing electrically operated interior mirror 4390. For example, and approaching the vehicle initially with interior mirror assembly 4390 mounted to mirror button 4320 and connected via a joint between plug 4381 into socket 4385 to vehicle wire harness 4388 (that comes out from the vehicle header region), the installer may disconnect plug 4381 from socket connector 4385. The installer next demounts mirror assembly 4390 from mirror mounting button 4320. Next the installer mounts module 4370 to mirror-mounting button 4320. Next, the installer mounts mirror assembly 4390 to module 4370 by mounting onto attachment member 4321 (that is constructed similar to mirror-mounting button 4320). Next, the installer connects plug 4381 of wire harness 4388 to socket connector 4381', and connects socket connector 4385 to plug connector 4385' in order to provide electrical power and input/output control and communication lines to electronic accessories of interior mirror assembly 4390. For example, electrochromic reflective element 4382 can connect via harness 4384 to automatic dimming circuitry 4355 in module 4370 (which automatic dimming circuitry in module 4370 may include a forward facing ambient light sensor viewing via the windshield 4318 and a rear facing glare detecting light sensor that detects glare of headlights of vehicles approaching from the rear). Harness 4384 may connect information display 4392 to, for example, control circuitry in module 4370 (for example, compass display control circuitry including a compass sensor). A single circuitry in module 4370 can control a plurality of functions/accessories of mirror assembly 4390 (for example, variable control of the state of reflectivity of electrochromic mirror reflective element 4382 and display of compass information and/or other information by display element 4392). By including most if not all electronic accessories desired as part of accessory module 4370, an automaker can provide many of the electronic accessories today commonly included in mirror assembly 4390 (for example, a headlamp controller including a CMOS-based smart headlamp controller or an automatic mirror dimming circuitry or a rain sensor or a trainable garage door opener or an antenna or a microphone or a light or a user-actuatable button or a display) as part of windshield electronics module 4370, and then use a base, low feature mirror assembly such as a low-cost non-electronic prismatic mirror assembly or a base electrochromic mirror assembly (with improvement in economy and vibration performance of the mirror assembly). Circuitry and accessories/modules can be included in module 4370 using predefined standard electronic PCB cards, modules and/or packages akin to what is today found, for example, in personal computer equipment., and these can be provided in a "plug & play" manner. At least a portion of the wall structure of module 4370 can be openable/removable to allow access to accessories/PCBs/circuitry housed in and/or attaching to accessory module 4370 (for service, option selection etc.). Note that the mirror assembly attaching to module 4370 can be a two-ball mirror assembly or a single-ball mirror assembly, as such are known in the interior mirror assembly arts. Guides (such as guide walls) can be placed adjacent to the portion of module 4370 where module 4370 mounts to mirror mounting button 4320 to assist guiding alignment of module 4370 for ready receipt by mirror mounting button/windshield attachment member 4320.

Also, where a windshield electronics module assembly is attached to the windshield, and where an interior rearview mirror assembly either attaches to or attaches adjacent to the windshield electronics module (or attaches to the windshield via an aperture in the windshield electronics module such that the interior rearview mirror assembly directly attaches to the windshield through the windshield electronics module) or when the interior rearview mirror assembly attaches to a header at the roof of the vehicle but where a windshield electronics module is used, the windshield electronics module may in certain circumstances occlude, block or impair, the field of view for a forward facing light sensor (such as an ambient light sensor commonly used in an automatic rearview mirror assembly that is part of the interior rearview mirror assembly (such interior-mirror-assembly-forward-facing light sensors typically detects ambient conditions exterior the vehicle and/or on coming headlamp intensities and the like). In such circumstances, the windshield electronics module may include light openings and/or light ports and/or light transmitting portions that provide a field of view forward through the windshield for the likes of an ambient light detector or a CMOS smart headlamp controller that is incorporated in the interior rearview mirror assembly and has a rearward field of view forward of the vehicle in the direction the vehicle is traveling. Optionally, light conduiting elements such as a fiber optic element such as a fiber optic cable may be used to conduit light passing from the outside of the vehicle through the front windshield and impinging the windshield electronics module assembly to a forward facing light detector of the interior rearview mirror assembly.

Accordingly, the present invention provides an improved ground illumination system that includes an exterior mirror assembly, which is adapted for attachment to a side of a vehicle, and a ground illumination light assembly. The mirror assembly includes a mirror casing and a reflective element, which is preferably supported in the mirror casing by an actuator, such as a manual or electrically powered actuator. The reflective element may comprise an electrochromic reflective element having a variable reflectivity, such that its reflectance state can be varied to minimize glare from side or rearward approaching vehicles, as is known in the art. When the mirror assembly is attached to the side of the vehicle, the light assembly provides illumination for at least a ground area adjacent the entrance to the vehicle. The light assembly preferably includes a single non-incandescent light source, such as a single high-intensity power light emitting diode, which has a luminous efficiency of at least about 1 lumen per watt when the power light emitting diode is operated and wherein the power light emitting diode is operated at a forward current of at least about 00 milliamps (more preferably, at least about 250 milliamps; and, most preferably, at least about 350 milliamps). The power light emitting diode may be provided with a heat dissipation element, which is adapted to function as at least as a heat sink or a heat dissipater for the power dissipated by the power light emitting diode when the power light emitting diode is operated. Since power light emitting diodes operate at an operational voltage that is typically less than the battery ignition voltage to which the mirror assembly is adapted to attach, the exterior mirror assembly optionally and preferably includes at least a series power resistor or a direct current (DC) voltage to direct current (DC) voltage converter.

When operated, the power light emitting diode preferably dissipates at least about 0.5 watts of power; more preferably, at least about 1 watt of power; and, most preferably, at least about 1.5 watts of power. In some applications, the power light emitting diode may dissipate at least about 2 watts of power when operated.

For example, the heat dissipation element may comprise a heat sink, such as a metal heat sink, including copper, a copper alloy, aluminum, or brass heat sinks, and includes a heat dissipation surface area of at least about 1 square inch; more preferably, at least about 1.5 square inches; or, most preferably, at least about 2.5 square inches. In some cases, the heat sink may include a heat dissipation surface area of at least about 3.5 square inches. To increase the transfer of heat from the power light emitting diode to the heat sink, the power light emitting diode may be thermally coupled to the heat sink, for example by a heat sink compound.

The illumination system may further include a light-directing member, which directs light emitted from the power light emitting diode toward the ground area.

Optionally, the heat dissipation element may be incorporated as part of the light assembly. In addition, the heat dissipation element may include a reflective surface for reflecting light emitted by the power light emitting diode. Similarly, the light assembly may include the power resistor and/or the voltage converter. Furthermore, the light assembly may include a lens, such as a fresnel-optic lens, a binary-optic lens, a diffusive-optic lens, a holographic-optic lens, and a sinusoidal-optic lens, through which the light from the power light emitting diode passes for illuminating the ground area.

Suitable single high-intensity power light emitting diodes include high-intensity power, high-current capability light emitting diodes, such as high flux LED's available from LumiLed Lighting, USA, LLC of San Jose, Calif. under the Sun Power Series High Flux LED trade name. For example, such high-intensity power LEDs emit at least about 1 lumen; more preferably, at least about 5 lumens; and, most preferably, at least about 10 lumens and are capable of delivering luminous efficiency of at least about 1 lumen per watt; more preferably, at least about 3 lumens per watt; and, most preferably, at least about 5 lumens per watt. In some cases, such high-intensity power light emitting diodes emit at least about 15 lumens and, more preferably, at least about 20 lumens of luminous flux. Furthermore, such high-intensity power LEDs operate at an operational voltage of at least about 1 volt; more preferably, at least about 2 volts; and, most preferably, at least about 3 volts. Preferably, the light emitting diode operates at an operational voltage of less than about 5 volts and, most preferably, in a range of about 2 to 5 volts.

As noted above, the circuitry used to power the high-intensity power light emitting diode preferably utilizes a direct current (DC) step-down voltage converter. The converter optionally has a step-down ratio of at least about 2 to 1 (for example, a 12-volt nominal vehicle battery/ignition voltage is stepped down to 6 volts); more preferably, at least about 4 to 1 (for example, a 12-volt vehicle battery/ignition voltage is stepped down to 3 volts); and, most preferably, at least about 6 to 1 (for example, a 12-volt vehicle battery/ignition voltage is stepped down to 2 volts), with the step down ratio being chosen commensurate with the vehicle battery/ignition voltage, for example, whether 12 volts or 42 volts nominal or other nominal voltage, and the desired operational voltage at the power light emitting diode.

Typically, such high-intensity power light emitting diodes dissipate at least about 0.5 watts of power, at least about 1 watt of power, or at least about 1.5 watts of power when operated. In some cases, the power light emitting diode may dissipate at least about 2 watts of power. As previously noted, the heat generated by the power light emitting diode may be dissipated by the heat dissipation element, such as a heat sink.

As noted above, the circuitry used to power the power light emitting diode may use a direct current step-down voltage conversion element, such that there is provided to the single high-intensity power light emitting diode an operational voltage that is less than a percentage (typically about 50%, 35%, 20% or 15%) of the battery/ignition voltage of the vehicle to which the exterior mirror assembly is adapted to attach. The conversion element, for example, is adapted to convert the battery/ignition voltage, which typically may be in a range of about 12 volts nominal to 42 volts nominal and, more typically, 12 volts nominal or 42 volts nominal, to a reduced voltage commensurate with the operational voltage of the single high-intensity power light emitting diode. Should the conversion element convert the battery/ignition voltage to a voltage that is greater than the operational voltage of the power light emitting diode, the circuitry used to power the power light emitting diode may also include a power resistor. Alternately, the vehicle battery ignition voltage can be across a series connection of the power light emitting diode and a power resistor, such that the series resistor dissipates, for example, at least about 2.5 watts of power; more preferably, at least about 3.0 watts of power; and, most preferably, at least about 3.5 watts of power.

It should also be understood from the foregoing that the light assembly may comprise a light module, including, for example, a seated light module that is moisture resistant and can withstand outdoor weather elements, such as rain, fog, snow, carwash spray, road splashes, or the like. Preferably, the light module may include, for example, the heat dissipation element, the power resistor, and/or the voltage converter. In addition, the light module may include a lens, with the light from the single high-intensity power light emitting diode passing through the lens. Furthermore, when the light module includes the heat dissipation element, the heat dissipation element may comprise a heat sink/reflector for dissipating heat from the single high-intensity power light emitting diode and for directing light from the single high-intensity power light emitting diode.

In another aspect, the present invention provides an improved interior lighting system that includes an interior mirror assembly, which is adapted for attachment to an interior portion of a vehicle, such as a windshield portion or a header portion. The interior mirror assembly includes a mirror reflective element and a light assembly. The light assembly is configured to illuminate an area inside the vehicle where the interior mirror assembly is attached to the interior portion of the vehicle. The light assembly comprises a single non-incandescent light source, such as a single high-intensity power light emitting diode having a luminous efficiency of at least about one lumen per watt when the single high-intensity power light emitting diode is operated and wherein the single high-intensity power light emitting diode is operating at a forward current of at least 100 milliamps (more preferably, at least about 250 milliamps; and, most preferably, at least about 350 milliamps).

Preferably, the light assembly is positioned to project light from a lower portion of the interior mirror assembly and projects the beam of light onto, for example, a console area or a lap area of a passenger in the vehicle.

The lighting system also preferably includes a heat dissipation element, which is adapted to dissipate heat from the single high-intensity power light emitting diode. Furthermore, the lighting system may include a voltage conversion element, which is adapted to step down an applied vehicle battery/ignition voltage to an operational voltage for the single high-intensity power light emitting diode. For example, the operational voltage of the single high-intensity power light emitting diode is preferably in a range of about 1 to 5 volts.

As noted above, when operated, such single high-intensity power light emitting diodes may dissipate at least about 1 watt of power; more preferably, at least about 1.5 watts of power; and more preferably at least about 2 watts of power.

In addition, the light assembly may include the heat dissipation element. For example, the heat dissipation element may include a reflective surface for reflecting light emitted by the single high-intensity power light emitting diode. Optionally, the lighting system may also incorporate a light-directing element, which directs light from the power light emitting diode toward the interior portion of the vehicle. Furthermore, the lighting system may incorporate a lens, with light from the power light emitting diode passing through the lens.

As noted above, in order to dissipate the heat generated by the power light emitting diode, the lighting system preferably includes a heat dissipation element. The heat dissipation element may comprise a heat sink, including a metal heat sink, such as a copper, copper alloy, aluminum, or brass heat sink. Preferably, the heat sink includes a heat dissipation surface area of at least about 1 square inch; more preferably, at least about 2.5 square inches; and, most preferably, at least about 3.5 square inches. Optionally, the light assembly may include the heat sink. In order to improve the heat transfer from the power light emitting diode to the heat sink, the power light emitting diode may be thermally coupled to the heat sink, for example, by heat sink compound. In addition, the heat sink may comprise a reflector, which reflects light from the power light emitting diode.

As noted above, suitable single high-intensity power light emitting diodes operate at an operational voltage of at least about 1 volt, and typically less than about 5 volts, and preferably in a range of about 2 to 5 volts. Battery/ignition voltages are typically in a range of about 12 to 42 volts nominal and, most typically, are about 12 volts nominal or 42 volts nominal. As such, the single high-intensity power light emitting diode operates at an operational voltage that is less than the battery/ignition voltage of the vehicle to which the mirror assembly is adapted to attach, with the percentage of the operational voltage of the power light emitting diode being about 50 percent of the battery/ignition voltage, or about 35 percent of the battery/ignition voltage, or about 20 percent of the battery/ignition voltage.

Optionally, the lighting system may also include a power resistor, which dissipates at least about 3 watts of power; more preferably, at least about 3.5 watts of power; and, most preferably, at least about 3.5 watts of power.

In order to reduce the voltage to the power light emitting diode, the voltage conversion element has a step-down ratio of at least about 2 to 1; more preferably, of at least about 4 to 1; and most preferably of at least about 6 to 1, as noted above.

Similar to the exterior application of the light system of the present invention noted above, the light assembly may include a lens, with the light from the single high-intensity power light emitting diode passing through the lens. For example, the lens may comprise a diffractive optical element or a refractive optical element. Preferably, the lens comprises a fresnel-optic lens, a binary-optic lens, a diffusive-optic lens, a holographic-optic lens, or a sinusoidal-optic lens. In addition, the light assembly may include the power resistor, the voltage conversion element, and/or the heat dissipation element. When the light assembly incorporates the heat dissipation element, the heat dissipation element preferably comprises a heat sink/reflector for dissipating heat from the power light emitting diode and for directing light from the power light emitting diode. Such a heat sink/reflector may comprise a metal reflector having a heat conductivity, such as copper, copper alloy, aluminum, or brass.

Similarly, the light assembly may comprise a reading or map light assembly, including a driver's or passenger's side reading or map light assembly, or a light module, such a reading or map light module, including a driver's or passenger's side reading or map light module. Depending on the application, the single high-intensity power light emitting diode emits at least about 1 lumen; at least about 5 lumens; at least about 10 lumens; at least about 15 lumens; or at least about 20 lumens of luminous flux.

When the light assembly comprises a light module, the module preferably includes the series power resistor, the voltage conversion element, and/or the heat dissipation element. In addition, when the module includes the heat dissipation element, the heat dissipation element preferably comprises a heat sink/reflector for dissipating heat from the single high-intensity power light emitting diode and for directing light from the single high-intensity power light emitting diode.

The lighting system of the present invention may also comprise an accessory module adapted for attachment to an interior portion of a vehicle, preferably a windshield portion; although other interior portions are possible, such as a header portion. The accessory module is configured to illuminate an area inside the vehicle when the accessory module is attached to the interior portion of the vehicle and comprises a single non-incandescent light source. The single non-incandescent light source preferably comprises a single high-intensity power light emitting diode, which emits light for illuminating the area with a luminous efficiency of at least about 1 lumen/watt when the single high-intensity power light emitting diode is operated and wherein the single high-intensity power light emitting diode is operated at a forward current of at least about 100 milliamps. The lighting system also includes a heat dissipation element, which is adapted to dissipate heat from the single high-intensity power light emitting diode, and a power resistor.

The accessory module may be mounted in an interior review mirror assembly, such as in the movable portion, such as the mirror case, in the fixed portion, such as the mirror mounting assembly, or in a pod attached to the mirror assembly.

The area illuminated by the accessory module is preferably at a distance of greater than about 20 inches from the accessory module, more preferably at a distance of less than about 40 inches from the accessory module, and most preferably at a distance in a range of about 20 to 40 inches from the accessory module.

As noted above, the circuitry used to power the high-intensity power light emitting diode utilizes a direct current (DC) voltage to direct current (DC) voltage step-down voltage converter. The converter preferably has a step-down ratio of at least about 2 to 1; more preferably, at least about 4 to 1; and, most preferably, at least about 6 to 1.

Suitable single high-intensity power light emitting diodes include high-intensity power, high current capability light emitting diodes, such high flux light emitting diodes available from LumiLed Lighting, USA, LLC of San Jose, Calif. under the Sun Power Series High Flux LED trade name. For example, such high-intensity power LEDs emit at least about 1 lumen; more preferably, at least about 5 lumens; and, most preferably, at least about 10 lumens and are capable of delivering luminous efficiency of at least about 1 lumen per watt; more preferably, at least about 3 lumens per watt; and, most preferably, at least about 5 lumens per watt. In some cases, such high-intensity power LEDs emit at least about 15 lumens and more preferably at least about 20 lumens. Furthermore, such high-intensity power LEDs operate at an operational voltage of at least about 1 volt; more preferably, at least about 2 volts; and, more preferably, at least about 3 volts. Preferably, the power light emitting diode operates at an operational voltage of less than about 5 volts and, most preferably, in a range of about 2 to 5 volts.

Typically, such high-intensity power light emitting diodes dissipate at least about 0.5 watts of power, at least about 1 watt of power, or at least about 1.5 watts of power when operated. In some cases, the power light emitting diode may dissipate at least about 2 watts of power. As previously noted, the heat generated by the power light emitting diode may be dissipated by the heat dissipation element, such as a heat sink.

As noted above, the circuitry used to power the power light emitting diode may use a direct current step-down voltage conversion element, since the single high-intensity power light emitting diode operates at an operational voltage that is less than a percentage (typically about 50%, 35%, 20% or 15%) of the battery/ignition voltage of the vehicle to which the exterior mirror assembly is adapted to attach. The voltage conversion element, for example, is adapted to convert the battery/ignition voltage, which may be in a range of 12 volts nominal to 42 volts nominal and, more typically, 12 volts nominal or 42 volts nominal, to a reduced voltage. Should the voltage conversion element convert the battery/ignition voltage to a voltage that is greater than the operational voltage of the power light emitting diode, the circuitry used to power the power light emitting diode preferably also includes a power resistor. Alternately, the vehicle battery/ignition voltage may be applied across a series connection of the power light emitting diode and power resistor, such that the series power resistor dissipates, for example, at least about 2.5 watts of power; and, more preferably, at least about 3.0 watts of power; most preferably, at least about 3.5 watts of power.

It should also be understood from the foregoing that the accessory module may comprise a light assembly, including a removable light assembly, and further may be located at a mirror assembly, such as in the mirror casing. In addition, the accessory module may include one or more of the heat dissipation element, the power resistor, and/or the voltage converter. Furthermore, when the accessory module includes the heat dissipation element, the heat dissipation element may comprise a heat sink/reflector for dissipating heat from the single high-intensity power light emitting diode and for directing light from the single high-intensity power light emitting diode.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A rear seat occupant monitoring system for a vehicle, said rear seat occupant monitoring system comprising:
    a video display screen disposed in a cabin of a vehicle equipped with said rear seat occupant monitoring system so as to be viewable by a driver of the equipped vehicle when the driver is operating the equipped vehicle;
    a camera disposed at one of (i) a dome light at a ceiling of the cabin of the equipped vehicle and (ii) an overhead console at a ceiling of the cabin of the equipped vehicle;
    wherein said camera comprises a CMOS imaging array and a lens, said camera having a field of view that encompasses a rear seat area of the equipped vehicle;
    wherein said one of (i) a dome light at a ceiling of the cabin of the equipped vehicle and (ii) an overhead console at a ceiling of the cabin of the equipped vehicle comprises first and second illumination sources that, when operated, illuminate the rear seat area within the field of view of said camera;
    wherein said first illumination source comprises at least one visible-light illumination light emitting diode that principally emits visible light when electrically powered;
    wherein said second illumination source comprises at least one near-infrared illumination light emitting diode that principally emits non-visible light when electrically powered;
    wherein said camera captures image data representative of the rear seat area when the rear seat area is illuminated by at least one of said first and second illumination sources; and
    wherein image data captured by said camera is provided to said video display screen for displaying video images for viewing by the driver of the equipped vehicle.

2. The rear seat occupant monitoring system of claim 1, wherein at least one of said first and second illumination sources comprises a light emitting diode operable to deliver a luminous efficiency of at least 1 lumen/watt.

3. The rear seat occupant monitoring system of claim 2, wherein said one of (i) a dome light at a ceiling of the cabin of the equipped vehicle and (ii) an overhead console at a ceiling of the cabin of the equipped vehicle comprises a DC step-down converter, and wherein said DC step-down converter is adapted for reducing battery/ignition voltage of the equipped vehicle to 5 volts or less.

4. The rear seat occupant monitoring system of claim 2, wherein said one of (i) a dome light at a ceiling of the cabin of the equipped vehicle and (ii) an overhead console at a ceiling of the cabin of the equipped vehicle comprises a light directing element having an inner surface forming a reflector and an outer surface having a plurality of heat dissipating fins, and wherein said reflector is configured to direct illumination emitted by at least one of said first and second illumination sources towards the rear seat area within the field of view of said camera.

5. The rear seat occupant monitoring system of claim 1, wherein illumination by at least one of said first and second illumination sources is controlled by pulse width modulation.

6. The rear seat occupant monitoring system of claim 1, wherein illumination by at least one of said first and second illumination sources has a cone angle of at least 30 degrees.

7. The rear seat occupant monitoring system of claim 1, wherein at least one of said first and second illumination sources comprises an Indium Gallium Nitride light emitting diode.

8. The rear seat occupant monitoring system of claim 1, wherein said video display screen is disposed at an interior rearview mirror assembly of the equipped vehicle.

9. The rear seat occupant monitoring system of claim 8, wherein video images displayed by said video display screen disposed in the interior rearview mirror assembly of the equipped vehicle are viewable through a reflective element of the interior rearview mirror assembly of the equipped vehicle.

10. The rear seat occupant monitoring system of claim 1, wherein said video display screen is part of a module attached at a windshield of the equipped vehicle.

11. The rear seat occupant monitoring system of claim 1, wherein said camera is part of a dome light at a ceiling of the cabin of the equipped vehicle.

12. The rear seat occupant monitoring system of claim 1, wherein said camera is part of an overhead console at a ceiling of the cabin of the equipped vehicle, and wherein said overhead console comprises at least one user-operable switch.

13. The rear seat occupant monitoring system of claim 1, wherein said first illumination source comprises at least one visible-light illumination light emitting diode operable at a forward current of at least 250 milliamps.

14. The rear seat occupant monitoring system of claim 1, wherein said first illumination source comprises at least one visible-light illumination light emitting diode operable to emit at least 5 lumens.

15. The rear seat occupant monitoring system of claim 1, wherein at least one of said first and second illumination sources illuminates responsive, at least in part, to an ambient light level in the cabin of the equipped vehicle.

16. The rear seat occupant monitoring system of claim 15, wherein at least one of said first and second illumination sources, responsive to lower ambient light level, emits illumination at a reduced intensity and, responsive to higher ambient light level, emits illumination at an increased intensity.

17. The rear seat occupant monitoring system of claim 1, wherein the rear seat area includes at least a portion occupied by a child seat.

18. A rear seat occupant monitoring system for a vehicle, said rear seat occupant monitoring system comprising:
- a video display screen disposed in a cabin of a vehicle equipped with said rear seat occupant monitoring system so as to be viewable by a driver of the equipped vehicle when the driver is operating the equipped vehicle;
- a camera disposed in an interior lighting module located within the cabin of the equipped vehicle;
- wherein said camera comprises an imaging array and a lens, said camera having a field of view that encompasses a rear seat area of the equipped vehicle;
- wherein said interior lighting module comprises first and second illumination sources that, when operated, illuminate the rear seat area within the field of view of said camera;
- wherein said first illumination source comprises at least one visible-light illumination light emitting diode that principally emits visible light when electrically powered;
- wherein said second illumination source comprises at least one near-infrared illumination light emitting diode that principally emits non-visible light when electrically powered;
- wherein said camera captures image data representative of the rear seat area when the rear seat area is illuminated by at least one of said first and second illumination sources;
- wherein image data captured by said camera is provided to said video display screen for displaying video images for viewing by the driver of the equipped vehicle;
- wherein illumination by at least one of said first and second illumination sources is controlled by pulse width modulation; and
- wherein the rear seat area includes at least a portion occupied by a child seat.

19. The rear seat occupant monitoring system of claim 18, wherein at least one of said first and second illumination sources illuminates responsive, at least in part, to an ambient light level in the cabin of the equipped vehicle.

20. A rear seat occupant monitoring system for a vehicle, said rear seat occupant monitoring system comprising:
- a video display screen disposed in a cabin of a vehicle equipped with said rear seat occupant monitoring system so as to be viewable by a driver of the equipped vehicle when the driver is operating the equipped vehicle;
- a camera disposed in an interior lighting module located within the cabin of the equipped vehicle;
- wherein said camera comprises an imaging array and a lens, said camera having a field of view that encompasses a rear seat area of the equipped vehicle;
- wherein said interior lighting module comprises first and second illumination sources that, when operated, illuminate the rear seat area within the field of view of said camera;
- wherein said first illumination source comprises at least one visible-light illumination light emitting diode that principally emits visible light when electrically powered;
- wherein said second illumination source comprises at least one near-infrared illumination light emitting diode that principally emits non-visible light when electrically powered;
- wherein said camera captures image data representative of the rear seat area when the rear seat area is illuminated by at least one of said first and second illumination sources;
- wherein image data captured by said camera is provided to said video display screen for displaying video images for viewing by the driver of the equipped vehicle;
- wherein illumination by at least one of said first and second illumination sources is controlled by pulse width modulation; and
- wherein illumination by at least one of said first and second illumination sources has a cone angle of at least 30 degrees.

* * * * *